US009301895B2

(12) United States Patent
Hough et al.

(10) Patent No.: US 9,301,895 B2
(45) Date of Patent: Apr. 5, 2016

(54) MEDICAL SUPPORT APPARATUS

(71) Applicant: Stryker Corporation, Kalamazoo, MI (US)

(72) Inventors: Christopher S. Hough, Kalamazoo, MI (US); John P. Zerbel, Paw Paw, MI (US); Richard A. Derenne, Portage, MI (US); Cory P. Herbst, Shelbyville, MI (US); Collin Ian Ostergaard, Chicago, IL (US); Jill Christine Denna, Chicago, IL (US); Marianne Barbara Grisdale, Chicago, IL (US); Siarhei Murauyou, Santa Clara, CA (US); Christopher Ryan Sweeney, Portage, MI (US); Aaron Douglas Furman, Kalamazoo, MI (US); Daniel Vincent Brosnan, Kalamazoo, MI (US); Scott Herrmann, Houston, TX (US); Matthew A. Cutler, Portage, MI (US)

(73) Assignee: Stryker Corporation, Kalamazoo, MI (US)

( * ) Notice: Subject to any disclaimer, the term of this patent is extended or adjusted under 35 U.S.C. 154(b) by 0 days.

(21) Appl. No.: 14/212,417

(22) Filed: Mar. 14, 2014

(65) Prior Publication Data

US 2014/0265500 A1 Sep. 18, 2014

Related U.S. Application Data

(60) Provisional application No. 61/791,255, filed on Mar. 15, 2013.

(51) Int. Cl.

| | |
|---|---|
| ***A47C 1/00*** | (2006.01) |
| ***A61G 15/00*** | (2006.01) |
| ***B60N 2/00*** | (2006.01) |
| ***B60N 2/02*** | (2006.01) |
| ***A61G 5/14*** | (2006.01) |

(Continued)

(52) U.S. Cl.

CPC ... *A61G 5/14* (2013.01); *A47C 1/00* (2013.01); *A47C 1/024* (2013.01); *A47C 1/032* (2013.01);

(Continued)

(58) Field of Classification Search

CPC ........... A61G 5/00; A61G 5/12; A61G 5/107; A61G 5/14

USPC ................. 297/313, 326, 328, 411.2, 411.36, 297/354.12, 327, DIG. 4, 311, 331, 411.37, 297/411.38, 411.45; 280/647, 250.1; 5/618, 5/613, 612

See application file for complete search history.

(56) References Cited

U.S. PATENT DOCUMENTS 4,555,121 A * 11/1985 Lockard et al. ................. 280/30
4,821,352 A * 4/1989 DiMatteo et al. ............ 5/81.1 C (Continued)

FOREIGN PATENT DOCUMENTS

WO 2014152550 A2 9/2014

OTHER PUBLICATIONS

PCT International Search Report regarding Application No. PCT/US2014/027465 (WO 2014/152550) filed Mar. 14, 2014, a related application to U.S. Appl. No. 14/212,417.

(Continued)

*Primary Examiner* — Chi Q Nguyen

(74) *Attorney, Agent, or Firm* — Warner Norcross & Judd LLP

(57) ABSTRACT

A medical chair includes a base and a pair of arm rests supported relative to the base for movement between a raised position and a lowered position relative to the base. The raised position of at least one of the arm rests is upward and forward of its lowered position to provide support to a patient when exiting the chair. For example, the arm rest may be mounted relative to the base to move between the raised position and the lowered position along a linear path.

25 Claims, 43 Drawing Sheets

(51) Int. Cl.

| | |
|---|---|
| ***A61G 5/10*** | (2006.01) |
| ***A47C 1/024*** | (2006.01) |
| ***A47C 1/032*** | (2006.01) |
| ***A47C 3/20*** | (2006.01) |
| *A61G 5/00* | (2006.01) |
| *A61G 5/12* | (2006.01) |

(52) U.S. Cl.

CPC . *A47C 3/20* (2013.01); *A61G 5/006* (2013.01); *A61G 5/10* (2013.01); *A61G 5/101* (2013.01); *A61G 5/1005* (2013.01); *A61G 5/1021* (2013.01); *A61G 5/1035* (2013.01); *A61G 5/1059* (2013.01); *A61G 5/00* (2013.01); *A61G 5/107* (2013.01); *A61G 5/12* (2013.01); *A61G 2005/122* (2013.01); *A61G 2005/127* (2013.01)

(56) References Cited

U.S. PATENT DOCUMENTS

| | | | | |
|---|---|---|---|---|
| 5,042,487 | A * | 8/1991 | Marquardt | 600/425 |
| 5,346,280 | A * | 9/1994 | Deumite | 297/330 |
| 5,944,338 | A * | 8/1999 | Simpson | 280/650 |
| 6,276,704 | B1 * | 8/2001 | Suiter | 280/250.1 |
| 6,447,064 | B1 * | 9/2002 | Mundy et al. | 297/313 |
| 6,547,330 | B1 * | 4/2003 | Hester | 297/322 |
| 6,558,810 | B2 * | 5/2003 | Garbo | 428/549 |
| 7,040,701 | B2 * | 5/2006 | Tada | 297/318 |
| 8,128,120 | B2 * | 3/2012 | Porcheron | 280/657 |
| 8,544,866 | B2 | 10/2013 | Noonan et al. | |
| 2002/0101103 | A1 * | 8/2002 | Johnston | 297/330 |
| 2005/0046129 | A1 | 3/2005 | Antonishak et al. | |
| 2008/0106060 | A1 | 5/2008 | Knopf | |
| 2012/0174319 | A1 | 7/2012 | Menkedick et al. | |
| 2013/0026737 | A1 | 1/2013 | Pizzi Spadoni | |

OTHER PUBLICATIONS

PCT International Written Opinion regarding Application No. PCT/US2014/027465 (WO 2014/152550) filed Mar. 14, 2014, a related application to U.S. Appl. No. 14/212,417.

* cited by examiner

MEDICAL SUPPORT APPARATUS

The present application claims the benefit of U.S. Provisional Application, entitled MEDICAL SUPPORT APPARATUS, Ser. No. 61/791,255, filed Mar. 15, 2013 (STR03D P410), which is incorporated by reference herein in its entirety.

TECHNICAL FIELD AND BACKGROUND

The present invention relates to a patient support apparatus, and more particularly to a medical recliner chair.

It is well known in the medical field that a patient's recovery time can be improved if the patient becomes more mobile. However, egress and exit from a traditional hospital bed can be challenging. One step on the pathway to becoming more mobile is to have a patient be transitioned to sitting in a chair, for example a reclining chair, for at least part of the time, which generally provides greater ease of egress and exit.

SUMMARY

According to one embodiment, a medical recliner chair includes a base and a pair of arm rests supported by the base for movement between a raised position and a lowered position. One of the arm rests has a raised position that is forward and upward from its lowered position to provide support to the patient when exiting the chair.

Optionally, each of the arm rests has a raised position that is forward and upward from its lowered position to provide support to a patient when exiting the chair.

For example, one or each of the arm rests may be mounted at the base by a slide, such as a linear slide.

In other aspects, each of the arm rests has an arm rest cushion, with the arm rest cushions each having an orientation. The orientations of the arm rest cushions remain generally unchanged when the arm rests are moved between their lowered and raised positions.

In other aspects, the chair may include a pair of locking mechanisms wherein each of the arm rests is lockable in at least one position. Optionally, each of the arm rests is lockable in a plurality of the positions between the lowered and raised positions, including in the raised position.

In further aspect, the chair may also include a manual releases to release the or each locking mechanism. The chair may include a pair of manual releases to release the locking mechanisms.

In any of the above chairs, the chair may include one or more safety releases that are configured to release the or each locking mechanism when the arm rest or arm rests are lowered and encounter an object. Each arm rest may include a safety release which is configured to release a respective locking mechanism when the respective arm rest is lowered and encounters an object of sufficient stiffness to trigger the safety release. For example, each of the safety releases may comprise a mechanical mechanism, such as a rod, supported at a lower end of the arm rests, and optionally may extend along the full length of the respective arm rests.

In any of the above chairs, at least one arm rest includes a spring assist to reduce the apparent weight of the arm rest to facilitate movement. For example, the spring may comprise a constant force spring, including a coiled plate spring. Further, each arm rest may include a spring assist to lower the apparent weight of the arm rest to facilitate movement.

According to yet other aspects, the chair further includes a lift and a chassis that is supported by the lift, wherein the lift is operable to raise and lower the chassis with respect to the base. The chassis supports the arm rest or rests and a seat section.

In any of the above, the base includes a base frame, and optionally a wheeled base frame.

According to yet another embodiment, a medical chair includes a base and an arm rest supported relative to the base for movement between a raised position and a lowered position. The chair further includes a locking mechanism operable to lock the arm rest in at least one of the raised and lowered positions and a safety release mechanism to prevent the locking mechanism from locking when the arm rest encounters an object while it is being lowered.

For example, the safety release mechanism may include a rod at a lower end of the arm rest. Further, the rod may extend along the lower end of the arm rest.

Additionally, the locking mechanism may selectively lock the arm rest in a plurality of positions between the lowered and raised positions.

The chair may also include a manual release to release the locking mechanism. Further, the safety release mechanism may be coupled to the manual release mechanism and actuate the manual release mechanism to release the locking mechanism.

In another embodiment, a medical recliner chair includes a seat section and a lift mechanism for lifting the seat section. A first actuator is provided for tilting the seat section, and a second actuator is provided for the moving the lift mechanism. The chair also includes a control system for controlling the first and second actuators to lift and tilt the seat section generally at the same time to move the seat section to a sit-to-stand position.

In one aspect, the chair also includes a base and a pair of arm rests mounted relative to the base for movement between a raised position and a lowered position, with the arm rests configured to move upward and forward relative to the seat section, for example, in an angled linear path, when the seat is moved to its sit-to-stand position.

In a further aspect, the arm rests may each include a curved arm rest cushion to provide a first lower support surface for a person's arms when seated in the chair when the seat section is in a seated position and a second higher support surface adjacent to the edge of seat section to provide support to a person's arms who is being raised by the seat section when exiting the chair and the seat section is in a sit-to-stand position.

The chair also may include a leg rest pivotally mounted relative to the base and seat sections, with the leg rest tilting inward in unison with the seat section movement when the seat section is moved to its sit-to-stand position.

In another embodiment, a recliner chair includes a wheeled base and a support surface, such as a segmented support surface, that is supported on the wheeled base by two X-frames. The X-frames are interconnected by a cross-member offset from the pivot joint of the X frames, which provides a mount for a cylinder actuator. The actuator is coupled to the cross-member on one end and coupled to the base at its opposed end by a pivotal mount so that when it is extended or contracted it unfolds or folds the X frames about their pivot axes to thereby form a lift mechanism for the support surface. One set of the upper pivot and lower pivot points are fixed while the other set is slidably mounted to avoid binding when being folded or unfolded.

In another embodiment, a medical recliner includes arm rests that are guided on a linear slide and are lockable in several positions by a locking mechanism to accommodate both ingress and egress. Additionally, the arms are mounted so that when they are raised they move forward to provide assistance for ingress and egress. Incorporated into the arm rests are manual releases for the locking mechanisms, which allow the caregiver to raise or lower the arm rests. To assist in raising or lowering of the arm rests, the arm rests also each incorporate a constant force spring, which reduces the force necessary to raise or lower the arm rests. The upper surface of the arm rests can be lowered so that it is generally planar with or below the seat section to facilitate the lateral transfer of a patient supported on the chair when the support surface of the chair is in a horizontal position.

In yet another embodiment, a medical recliner chair includes a leg rest that includes three nesting sections, such as channels, that are joined and guided by rails/tracks mounted to their sides. The sections are extended by a scissor mechanism with linkages that are coupled to each section. The first and innermost section is pivotally mounted to the recliner's support surface support frame by a transverse shaft. The innermost section is pivoted about the shaft by an actuator, which mounts to the inner section at its distal end via a transverse rod, which is mounted to the innermost section. The scissor mechanism is secured to the first section at one end by a pin mounted in a slotted bracket to form a sliding joint. The pin then couples to a link that is fixed to the support surface support frame on its opposed end and has a fixed length such that when the first section is rotated about its hinged connection to the support surface support frame by the actuator (which pushes and pulls on the transverse rod), the link pulls or pushes on the pin to cause the scissor mechanism to extend or contract.

The scissor mechanism may be stabilized by two supports, such as gas springs, that help the mechanism collapse and support the intermediate section while allowing the scissor mechanism to extend and contract.

In another embodiment, a medical recliner chair includes a deployable leg rest that has a built in deployment delay, which may be handled electronically. When the chair is in the upright position and a recline button is pressed, the leg rest will not start deploying immediately. This is to allow the patient to adjust the backrest angle a few degrees for comfort purposes while still in an "upright" chair position. Therefore, the actuator that moves the leg rest is not powered until after the back is lowered to a preselected degree.

In yet another embodiment, a medical recliner chair includes an adjustable arm rest with a locking mechanism that is biased into a locking position and released from its locked position by a handle. For example, the handle maybe coupled to the locking mechanism by a cable so that when the handle is pulled, the cable will release the locking mechanism. The arm rest may also include a mechanical release mechanism, in the form of a rod, such as a U-shaped rod, at its lower end that is also coupled to the locking mechanism so that if an object is below the arm rest is contacted by the rod when the arm rest is lowered, the object will push on the rod which will release the locking mechanism and the arm rest will be free to move up. For example, the rod may extend the full length of the lower end of the arm rest. The arm rest additionally may include a constant force spring that provides an assist to the arm rest so that some of the arm rest weight is borne by the spring.

In yet another embodiment, a medical recliner includes a seat section and a backrest that each have a shell and a foam layer over the shell. In the seat section, the shell forms a recess and a shelf adjacent the recess, which extends laterally under a person's thighs when seated on the seat section. The backrest shell is formed with two forwardly projecting "wings" on either side of the central portion of the backrest shell. The foam is generally uniform in thickness except at the head end of the backrest where it may be thickened to form a rounded head rest.

According to yet another embodiment, a medical recliner chair includes a seat section elevating and tipping forward to help the patient into the upright position. In addition, the arm rests of the arms are curved to provide continuous support to a person when being tilted forward to the egress position. Further, the seat section can be independently raised in a manner that it is higher than the arm rests so that a patient can be more easily rolled, lifted, or otherwise moved from the recliner to a bed, or vice versa. The back, seat and foot sections are also mounted for movement so that they can be arranged generally in a flat or Trendenlenburg position, which can be controlled by a button on the nurse control panel.

In yet another embodiment, a medical chair includes a seat frame, a backrest bracket, an actuator, and a backrest. The backrest bracket is pivotally coupled to the seat frame about a first pivot axis. The actuator is supported on the seat frame and coupled to the backrest bracket, and the actuator is adapted to pivot the backrest bracket about the first pivot axis. The backrest is pivotally coupled to the backrest bracket about a second pivot axis and movable between an upright position and a lowered position. The actuator causes the backrest to pivot about the first pivot axis during a first portion of movement between the upright position and the lowered position, and to pivot about the second pivot axis during a second portion of movement between the upright position and the lowered position.

In other embodiments, the first pivot axis is positioned at a location between a front end of the seat frame and a rear end of the seat frame where a patient's buttocks typically is positioned when a patient is seated on the patient support apparatus. The backrest pivots about the first pivot axis exclusively during the first portion of movement, and the backrest pivots about the second pivot axis exclusively during the second portion of movement in at least one form.

In at least one embodiment, the first portion of movement corresponds to movement between the upright position and an intermediate position, and the second portion of movement corresponds to movement between the lowered position and the intermediate position.

The first pivot axis may be positioned forward of a front end of the backrest, and the second pivot axis may be positioned at a higher height than the first pivot axis.

The actuator may include a first end coupled to the seat frame and a second end coupled to a pin, wherein the pin is configured to ride in an elongated channel defined on the seat frame as the backrest pivots between the upright and lowered positions. The elongated channel is straight and oriented generally horizontally. A pin guide member may be fixedly attached to the backrest bracket wherein the pin guide member includes a pin channel defined therein positioned for the pin to ride in during pivoting of the backrest between the upright and lowered positions. The pin channel may include a first section that is arcuately shaped and a second section that is generally straight. Still further, the pin may ride in the generally straight section of the pin channel when the backrest moves between the lowered position and the intermediate position, while the pin rides in the arcuately shaped section when the backrest moves between the intermediate position and the upright position.

A linkage assembly that includes a plurality of links may be included between the backrest and the backrest bracket. The linkage assembly may include a four bar linkage subassembly. The linkage assembly may include a channel link member having an arcuate channel defined therein and configured to allow the pin to ride therein. The pin remains at a first end of the arcuate channel while the backrest pivots between the intermediate position and the lowered position, and the pin moves to a second end of the pin channel when the backrest pivots from the intermediate position to the lowered position. The arcuate channel may include a shape that is substantially the same shape as the arcuately shaped section of the pin channel of the pin guide member. The arcuate channel and the arcuately shaped section of the pin channel are aligned with each other during movement of the backrest between the upright and intermediate positions. The arcuate channel and the arcuately shaped section of the pin channel become misaligned with each other during movement of the backrest between the intermediate and lowered positions.

In another embodiment, a patient support apparatus, such as a medical chair, including a medical recliner chair, includes a base, at least one wheel coupled to the base, and a seat supported by the base. The apparatus further includes a brake system supported at the base, which includes a cable and a brake pedal coupled to a first end of the cable. A second end of the cable is coupled to a brake associated with the wheel, which is configured such that pushing down on the brake pedal allows the mechanical cable to move closer to the brake, and the movement of the mechanical cable closer to the brake causes the brake to brake the wheel.

Optionally, the brake system further includes a toggle plate adapted to hold the brake pedal in either a braked position or an unbraked position while allowing the brake pedal to move there between when an external force is applied to the brake pedal. For example, the external force may be exclusively a downward force.

In another aspect, the apparatus may include a toothed gear coupled to the wheel and a brake pivot positioned adjacent the toothed gear and adapted to pivot into and out of engagement with the toothed gear, with the brake pivot pivoting into engagement with the toothed gear when the pedal is pressed.

Optionally, a brake spring can be positioned inside each of the brake, which is adapted to exert a force on the cable that urges the mechanical cable toward the brake.

The apparatus may include a generally vertical swivel lock pin positioned inside the brake and a swivel lever positioned inside of each of the brake, which is adapted to urge the swivel lock pin upward when the pedal is pressed.

In yet another aspect, the braking system may include an annular castle member with a generally vertical central axis, which is adapted to remain stationary as the wheel swivels about a generally vertical axis. For example, the annular castle member may include an annular ring of alternating slots and projections. Further, the generally vertical axis and the generally vertical central axis are optionally aligned. Additionally, when a swivel lever is present, the swivel lever may urge the swivel lock pin into engagement with the annular castle member.

In another aspect, a swivel spring may be coupled to the swivel lever, which compresses if the swivel lock pin engages one of the projections on the annular castle member when the brake pedal is pressed. The swivel spring may be adapted to not compress if the swivel lock pin extends into one of the slots on the annular castle member when the brake pedal is pressed.

In any of the above, pressing on the brake pedal may prevent the wheels from both rotating and swiveling.

In any of the above, the apparatus is a recliner and includes a backrest pivotal between an upright position and a lowered position.

In any of the above, the apparatus may include a toggle spring coupled to the brake pedal, which is adapted to urge the brake pedal toward an unbraked position.

In any of the above, the apparatus may include two or more wheels, each with a brake.

According to yet another embodiment, a patient support apparatus, for example, a medical chair, including a medical recliner chair, includes a base with caster wheels and a braking system for braking at least one of the caster wheels. The braking system has an actuator for braking the at least one caster wheel and a manually operable input mechanism configured to actuate the actuator. The apparatus further includes a control system having a user interface configured to actuate the actuator. The braking system is configured to allow either the manually operable input mechanism or the user interface to actuate the actuator to thereby lock the at least one caster wheel and to allow either the manually operable input mechanism or the user interface to disengage the actuator to thereby unlock the at least one caster wheel.

In one aspect, the manually operable input mechanism comprises a pedal.

In another aspect, the user interface comprises an electrical operated button.

In yet a further aspect, the actuator drives the manually operable input to actuate the actuator.

According to yet another aspect, the control system includes a solenoid, which when actuate drives the operable input mechanism to actuate the brake.

Before the embodiments of the invention are explained in detail, it is to be understood that the invention is not limited to the details of operation or to the details of construction and the arrangement of the components set forth in the following description or illustrated in the drawings. The invention may be implemented in various other embodiments and of being practiced or being carried out in alternative ways not expressly disclosed herein. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof. Further, enumeration may be used in the description of various embodiments. Unless otherwise expressly stated, the use of enumeration should not be construed as limiting the invention to any specific order or number of components. Nor should the use of enumeration be construed as excluding from the scope of the invention any additional steps or components that might be combined with or into the enumerated steps or components.

DETAILED DESCRIPTION OF THE EMBODIMENTS

Figure 1:
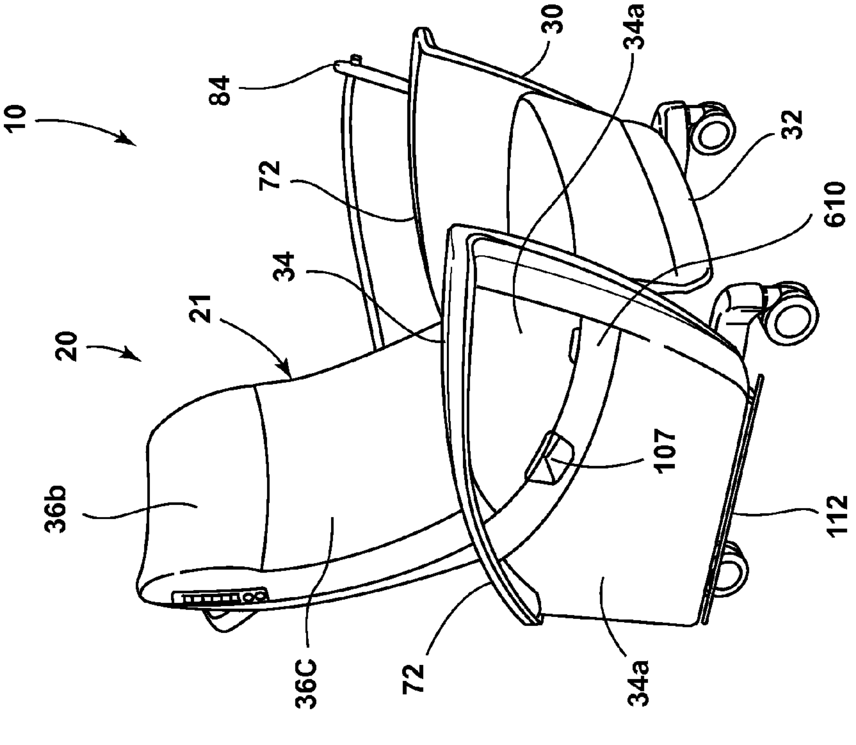
FIG. 1 is a respective view of a patient support apparatus in the form of a medical recliner chair.
Figure 3:
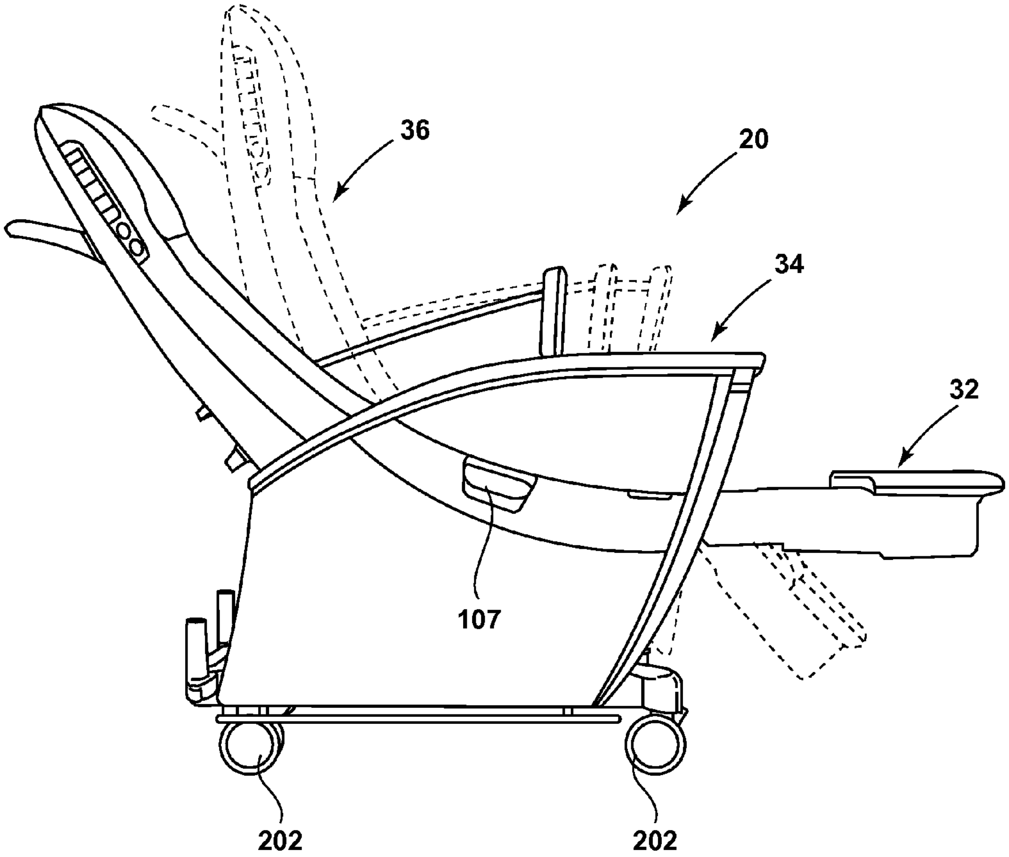
FIG. 3 is a side elevation view of the chair of FIG. 1 showing the chair in a reclined position.

Referring to FIG. 1, the numeral 10 generally designates a patient support apparatus in the form of a recliner chair 20. As will be more fully described below, recliner chair 20 includes a support surface 21, which is configured so that it can be reconfigured from a seated position, such as shown in FIG. 1, to a reclined configuration, such as shown in FIG. 3, and further reconfigured to provide a sit-to-stand configuration, such as shown in FIGS. 4, 5, 9, 9A, and 9B. Additionally, support surface 21 may be arranged to provide a generally horizontal support surface to provide support to a patient in a supine position, such as shown in FIG. 10.

Figure 5:
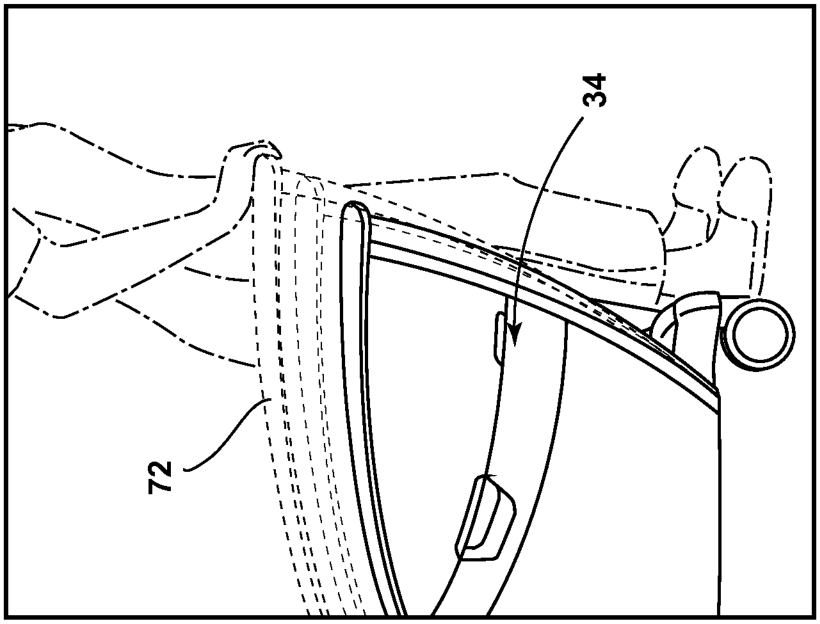
FIG. 5 is an enlarged perspective view of the arm rests of FIG. 4.
Figure 4:
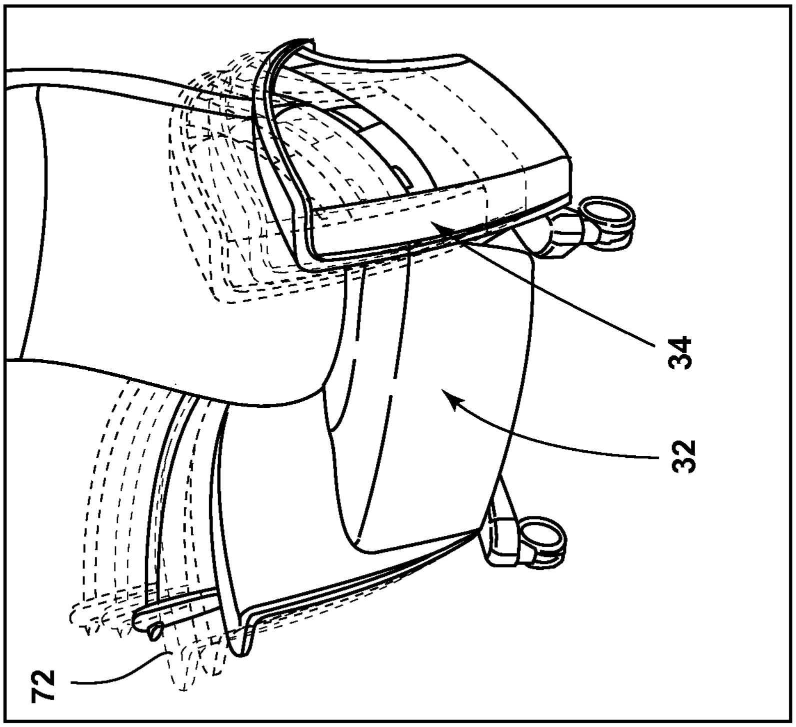
FIG. 4 is a front perspective view of the recliner chair of FIG. 1 illustrating the arm movement of the chair when providing a sit-to-stand function.
Figure 10:
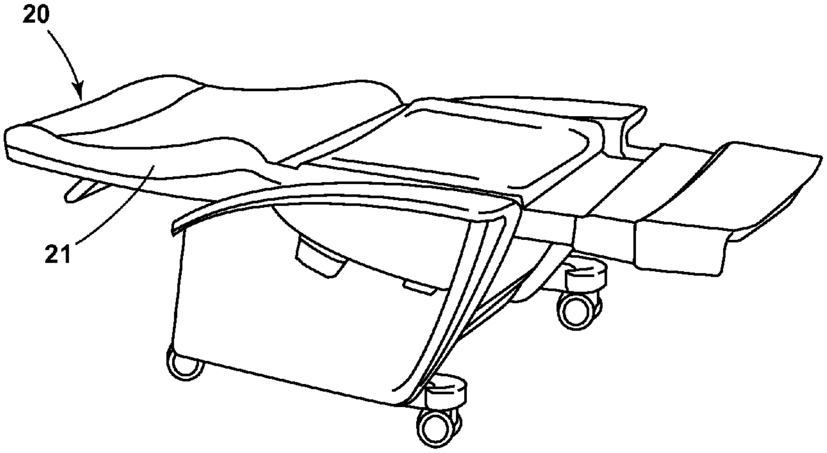
FIG. 10 is a perspective view of the recliner in a bed based configuration to support the patient in a supine position.

In addition, chair 20 includes a pair of arm rests that are moveably mounted relative to the base of the chair and further moveable in a manner to assist a person exiting the apparatus, such as shown in FIGS. 4 and 5, and further are moveable to a lowered position wherein the upper surface of the arm rests are at most planar or recessed below the support surface to allow a patient transfer such as shown in FIG. 10.

Figure 11:
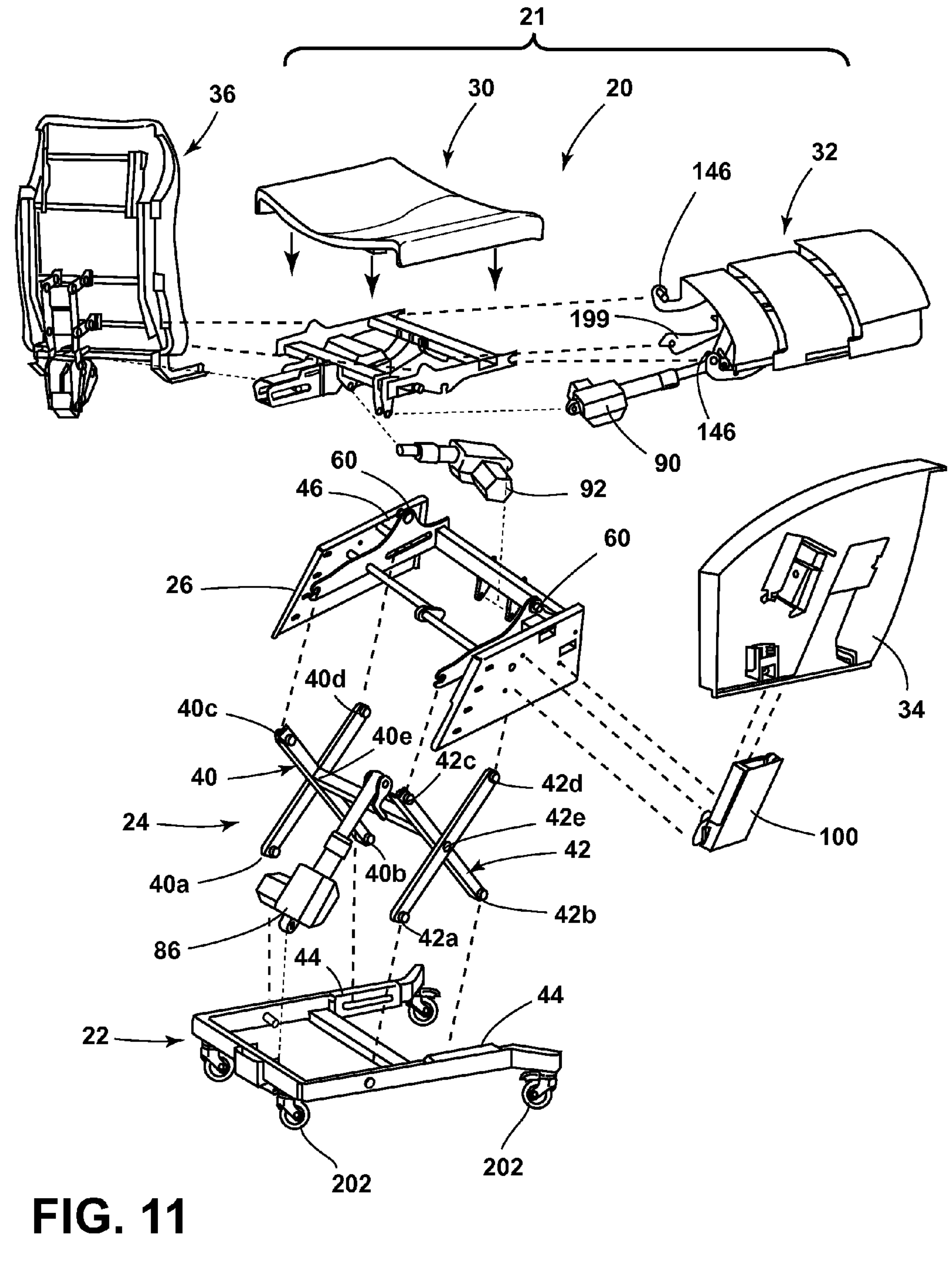
FIG. 11 is an exploded perspective view of the chairs internal components.

Referring to FIG. 11, chair 20 includes a base 22, a lift mechanism 24, which supports a chassis 26 on the base for movement between a lowered position and a raised position. Mounted to chassis 26 are a pair of arm rests 34 (only one shown in FIG. 11) and further support surface 21. Support surface 21 is formed by a seat section 30, a leg rest 32, and a backrest 36, which are respectively pivoted relative to chassis 26 to allow the respective sections to be moved, as will be more fully described below and as shown, for example, in FIGS. 19-27.

Figure 12:
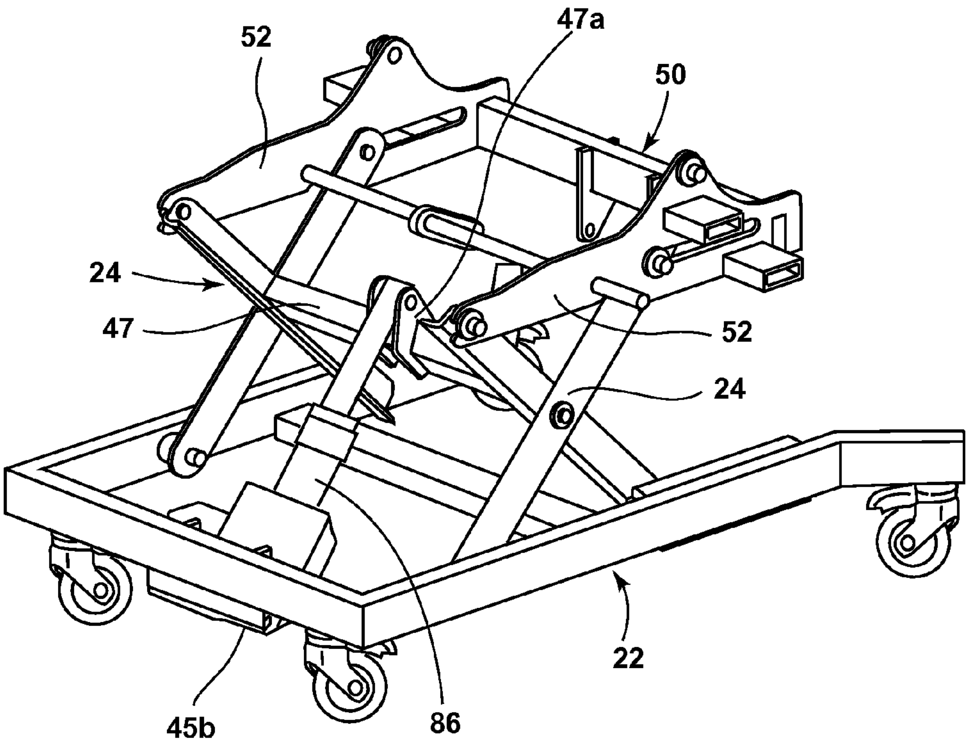
FIG. 12 is an enlarged perspective view of the base of the chair.
Figure 13:
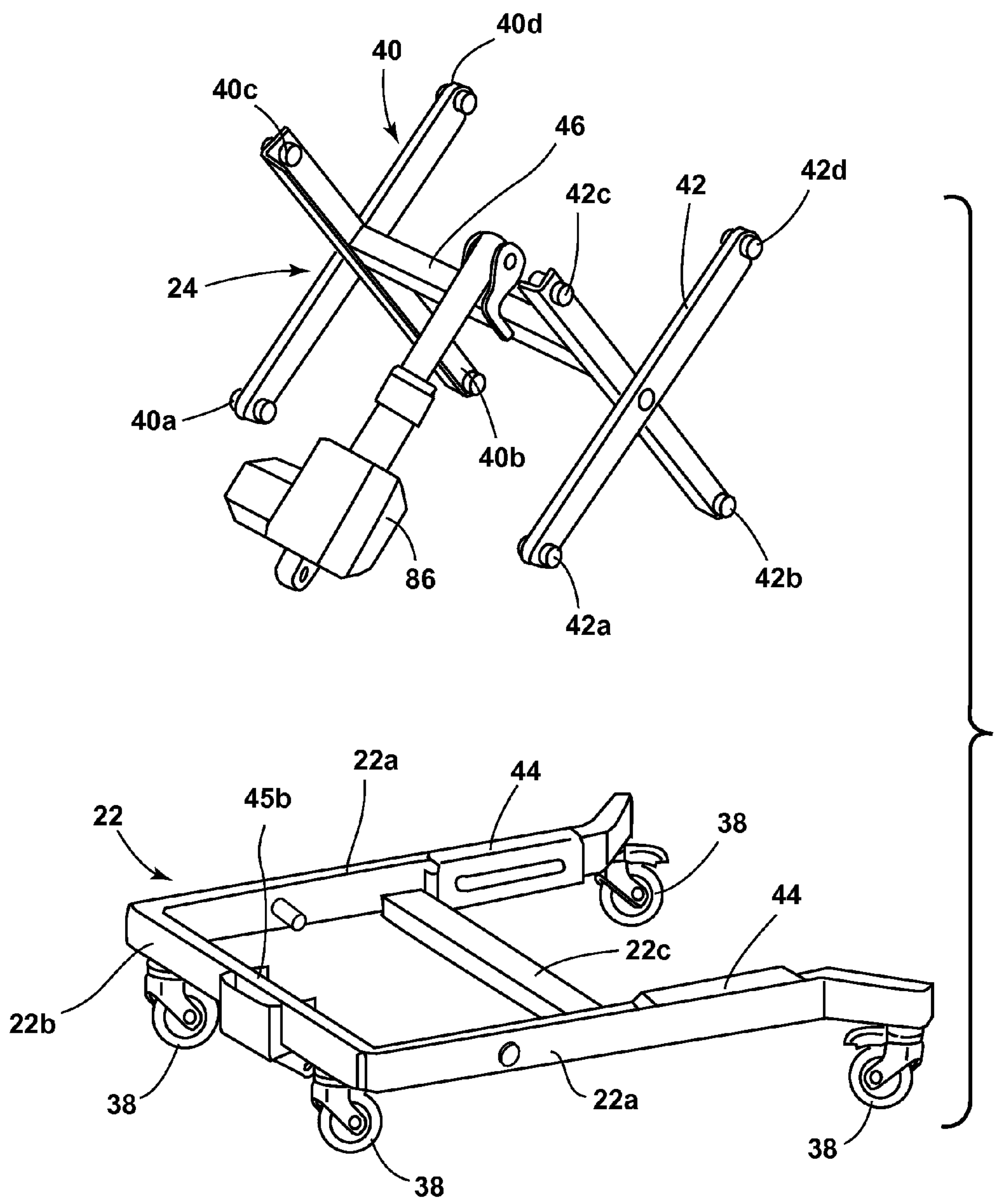
FIG. 13 is an exploded perspective view of the base and lift mechanism.

Base 22 includes a plurality of caster wheels 202 (describe below in reference to the braking system) which are mounted for rotation and swivel movement and which are braked by a braking system more fully described in reference to FIGS. 29-36. The lift mechanism comprises a pair of X-frames 40 and 42, each with lower ends 40*a* and 40*b* and 42*a* and 42*b* which are mounted to base 22 by pins or bushings, with lower ends 40*a* and 42*a* pinned to the frame of base 22 by pins or bushings, and with lower ends 40*b* and 42*b* of X-frames 40, 42 being mounted in slotted channels 44 mounted to the frame of base 22. Similarly, upper ends 40*c* and 40*d* of X-frame 40 and upper ends 42*c* and 42*d* of X-frame 42 are mounted to chassis 26 with ends 40*c* and 42*c* pinned at chassis 46 and ends 40*d* and 42*d* slidably pivotally mounted to chassis 26 in slotted openings 46 provided in chassis 26. In this manner, when X-frames 40 and 42 are collapsed or extended about their respective axis 40*e* and 42*e*, chassis 26 will be raised and lowered with their respective base 22. Further, as best seen in FIG. 13, X-frames 40 and 42 are joined by a cross bar 47 to provide a mounting surface for an actuator 86, which is mounted to cross bar 47 by a bracket 47*a* (FIG. 12), which is centrally located between X-frames 40 and 42 on one end and pivotally mounted to base 22 at its opposed end by a bracket 45*b*.

Figure 14:
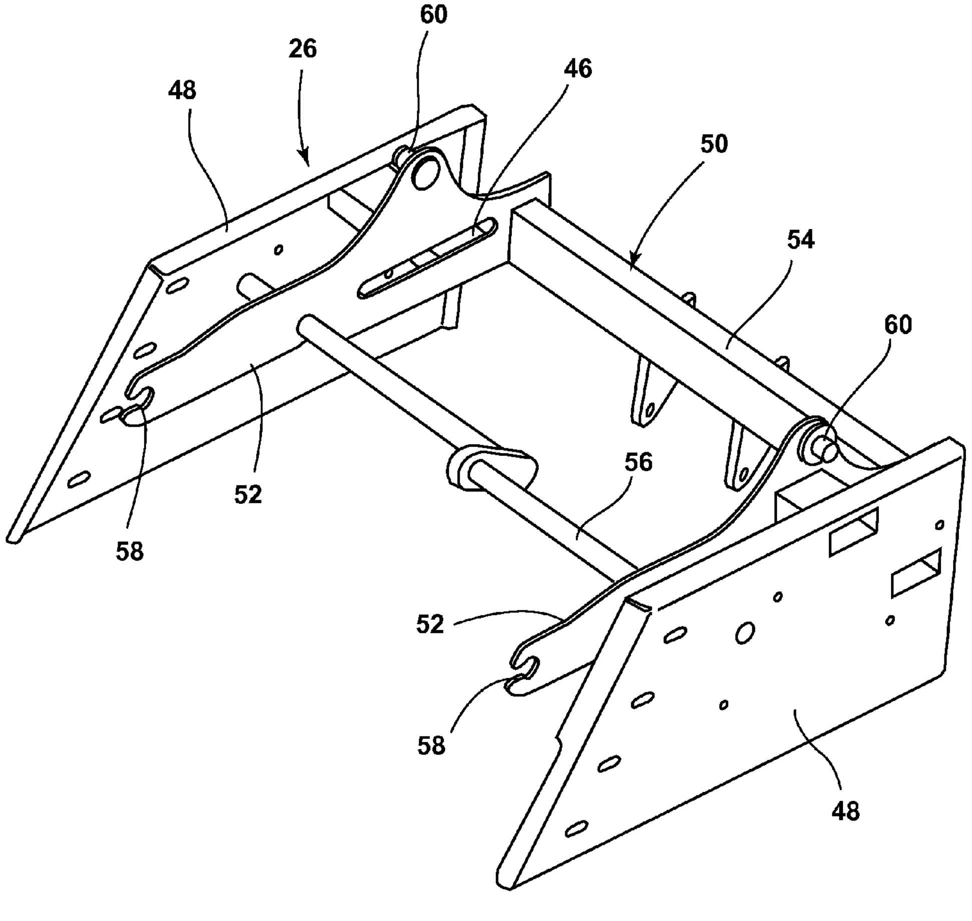
FIG. 14 is an enlarged perspective view of the chassis.

Referring to FIG. 14, chassis 26 includes pair of spaced apart side walls 48, which support a chassis frame 50 there between. Chassis frame 50 includes a pair of side frame members 52 and cross frame members 54 and 56, which together form the frame for mounting support surface 21 and for mounting a seat actuator 92 described more fully below. Member 52 includes a slotted opening 46 for receiving the pins on the upper ends 40*d* and 42*d* of X-frames 40 and 42. The distal end of the side frame members includes slotted openings 58 for receiving the pins of upper ends 40*c* and 42*c* of frames 40 and 42. Side walls 48 also provide a mounting surface for arm rests 34, which are mounted with respect to side walls 48 for linear movement, as will be more fully described below. Side members 52 further support pins 60 for pivotally mounting seat section 30 to chassis 26.

Figure 15:
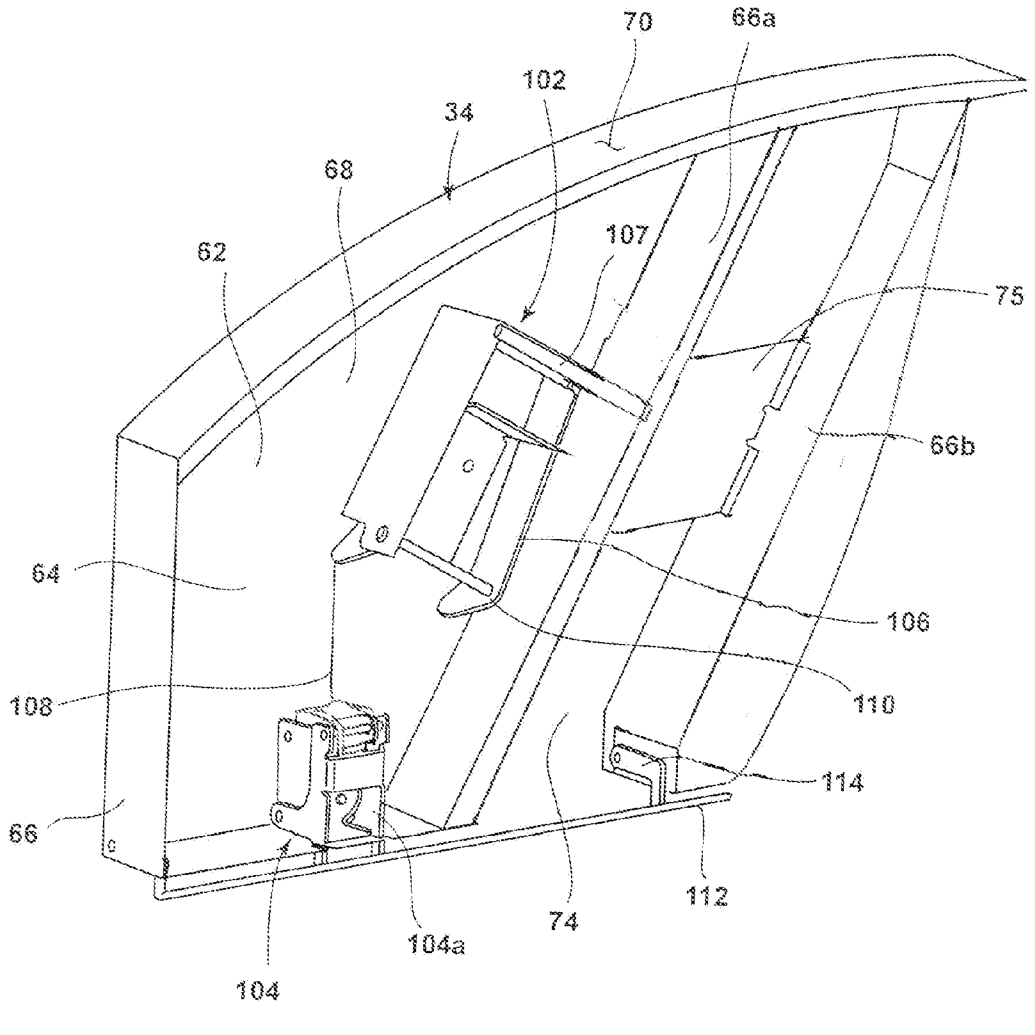
FIG. 15 is an enlarged perspective view of the arm rests.

Referring to FIG. 15, arm rests 34 include an arm rest body 62 which is formed, for example, from a web of material, such as sheet metal, which includes a central web 64 and perimeter flange 66 which provides a reinforcement to web 64 and further forms a cavity 68 for housing a locking mechanism 104 for the arm rest. The enclosure is enclosed by a shell, such as plastic shell that mounts to body 62. Flange 66 also forms a mounting surface 70 for mounting an arm rest cushion 72. Web 64 additionally includes a slotted opening 74 extending up from the lower end of the arm rest body to receive an arm rest slide mount, more fully described in reference to FIG. 16. To reinforce web 64 along both sides of slotted opening 74, arm rest 34 also includes a pair of parallel spaced flanges 66*a* and 66*b*, with flange 66*a* providing a bearing surface for an arm rest slide mount 100.

Mounted in cavity 68 is a handle 102 and locking mechanism 104 for locking the position of the side rail with respect to the arm rests slide mount. Handle 102 includes a rocker arm 106, which is pivotally mounted to flange 66*a* and also coupled to locking mechanism 104 by way of a cable 108. In this manner, when rocker arm 106 is pulled about its pivot axis 110 by pulling on an edge 107 (which is accessible at the side of the arm rest 34 as shown for example in FIGS. 1 and 3), rocker arm 106 will pull on cable 108 to release the locking mechanism.

In addition, as best seen in FIG. 15, locking mechanism 104 includes a rocker arm 104*a*, which supports a rod 112, and which is pivotally mounted by the rocker arm to locking mechanism adjacent one end and pivotally mounted at another portion (e.g. adjacent or near its opposed end) to flange 66*b* by a lever arm 114 so that when rod encounters an object with sufficient stiffness when arm rest is lowered, it will release the locking mechanism to prevent it from locking the arm rest in a lowered position. Optionally, rod may extend the full length of arm rest 34 to thereby provide a safety release for the locking mechanism.

Figure 16:
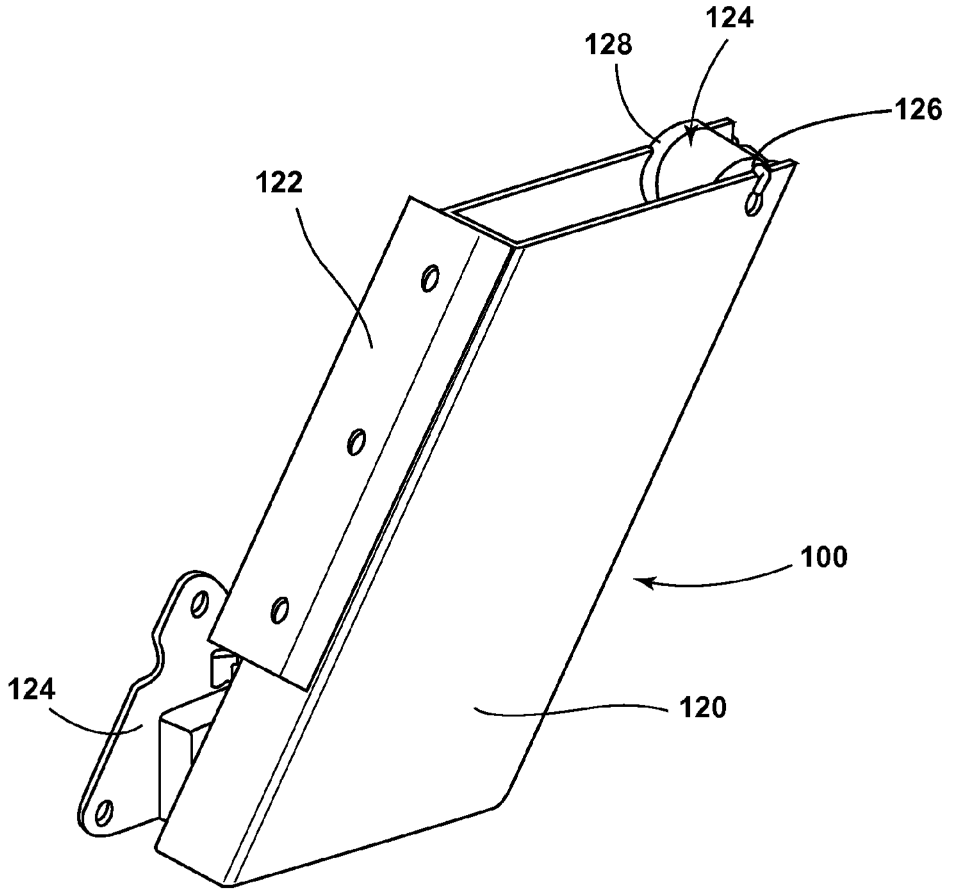
FIG. 16 is an enlarged perspective view of the arm rest slide mount.

Referring to FIG. 16, arm rest slide mount 100 includes a channel number 120 which supports a low friction pad 122 (e.g. made from plastic, such as high density polyethylene (HDPE) or the like) with a generally channel shape to provide a guide for arm rest 34 along mount 100. Optionally, flange 66*a* may support a rail on its inwardly facing surface that nests with the channel to facilitate the guiding of arm rest 34 from is lower position to its raised position. Channel number 120 includes a mounting flange 124 for mounting to chassis 26 and more specifically to chassis side wall 48. It should be understood that while one arm rest is illustrated and described, the same details may apply to the opposed arm rest. Mounted in channel 120 is a constant force spring 124. Constant force spring 124 includes a rolled ribbon of metal, typically spring steel, which is secured on one end to the arm rest body, e.g. flange 166*b*, and at its coiled upper end, as shown, in channel 120. Thus, the spring is relaxed when it is fully rolled up. As it is unrolled, a restoring force is generated from the portion of the ribbon near the roll (at the top of channel 120). Because the geometry of that region remains nearly constant as the spring unrolls, the resulting force is nearly constant. Thus when arm rest 34 is translated along mount 100, spring 124 will generate resistance to reduce the apparent weight of arm rest 34.

As best understood from FIG. 11, when arm rest 34 is mounted to arm rest mount 100 and is moved relative to arm mount 100, arm rest 34 moves in a path, for example, a linear path, which is angled with respect to base 22. As a result, when arm rest 34 is raised, arm rest 34 moves forward and upward relative to seat section 30.

Referring to FIGS. 4, 5, 9, 9A, and 9B, when arm rest 34 is raised, and arm rest 34 moves forward and upward, it allows a patient to support themselves on the forward edge of the arm rest to facilitate their transition between a sitting and standing position. Furthermore, because of the curved shape of the arm rest cushion or pad 72, arm rest pad 72 provides support for a person when seated in support apparatus 10 when in a seated configuration, and also provides similar support to the patient when the patient has been moved by the articulation of the seat to its sit-to-stand position and provides a higher support surface for the patient (which is closer to standing), again such as shown in FIG. 5.

Figure 17:
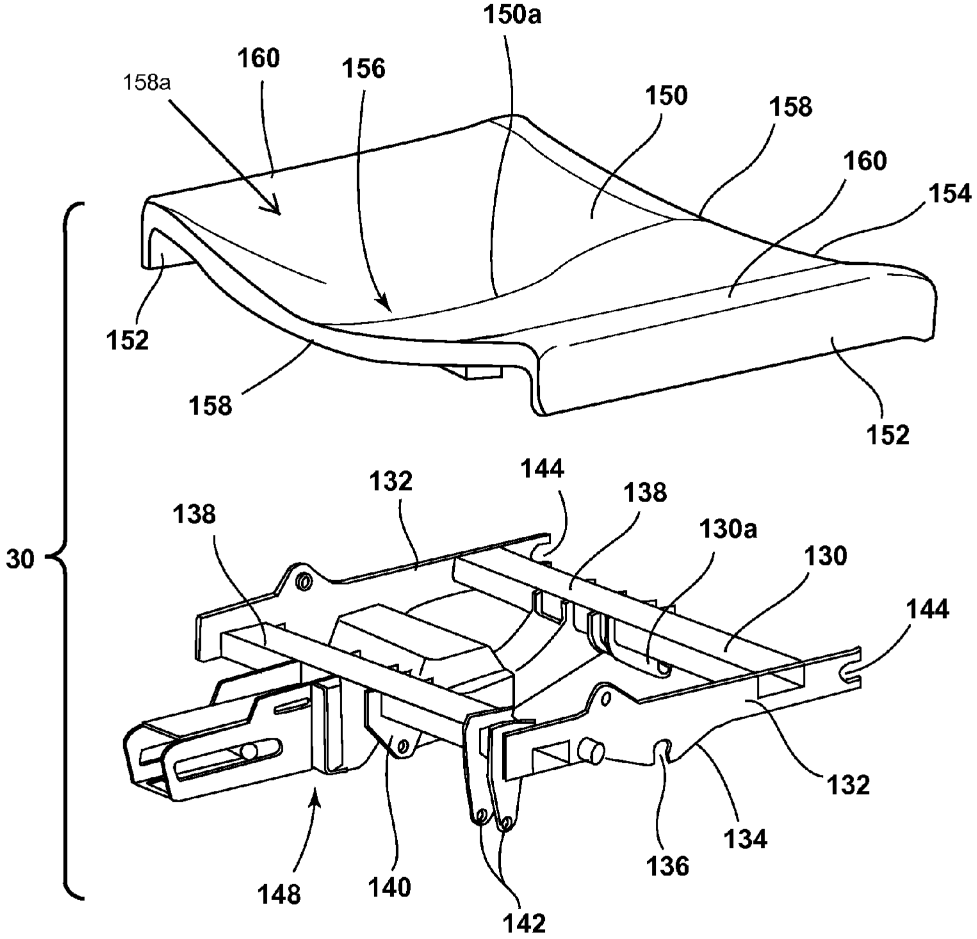
FIG. 17 is an exploded perspective view of the seat and seat frame.

Referring to FIG. 17, seat section 30 includes a seat frame 130. Frame 130 includes opposed side frame members 132 with downwardly depending flanges 134 with slotted openings 136 to provide a pivotal mount for seat frame 130 to chassis 26. As best understood from FIG. 11, seat frame 130 is mounted to chassis 26 by way of pivot pins 60, which are received in slotted openings 136, to thereby pivotally mount seat frame 130 to chassis 26. Seat frame 130 further includes cross members 138, which provide mounts for seat actuator 92 by way of bracket 140 and further provide mounts for the leg extension actuator 90. For example, seat frame 130 may include a pair of flanges 142 that form a bracket for mounting actuator 90, which is configured to extend and contract leg rest 32, described more fully below.

In addition, side frame numbers 132 include slotted openings 144 at their respective ends to receive pins 146 of leg rest 32 to thereby pivotally couple leg rest 32 to seat section 30. Additionally, seat frame 130 includes mounting structures 148 for providing a mount for backrest 38, more fully described below.

Mounted to seat frame 130 is a seat base 150, which may be formed from metal, plastic, wood shell, or the like, or a combination thereof. Base 150 forms a recess and a shelf adjacent the recess, which extends laterally under a person's thighs when seated on the seat section. Seat base 150 includes downwardly depending sides 152 which extend over frame 130 and further a forward downwardly depending flange 154, which extends over cross number 138. As best seen in FIG. 17, base 150 is contoured with a generally recessed central portion 156, as noted, which extends from the back edge 158 of base 150 and tapers upwardly to the shelf, which is also formed by rounded portion 158*a*. In this manner, opposed sides 160 of seat base 150 are raised relative to the central portion 156 but taper inwardly toward the central axis 150*a* of seat base 150 to form the central recessed region, as noted, for the pelvic area of the patient. Seat base 150 is covered by a cushioning layer, such as foam or a gel layer.

Backrest 36 is similar formed by a shell (not shown) which forms two forwardly projecting "wings" on either side of a central portion of the backrest shell. The shell is covered by a cushioning layer, such as foam, which is generally uniform in thickness except at the head end of the backrest where it is thickened to form a rounded head rest. Alternately, the cushioning layer may be formed form gel.

Suitable dry polymer gels or gelatinous elastomeric materials for forming the gel core may be formed by blending an A-B-A triblock copolymer with a plasticizer oil, such as mineral oil. The "A" component in the A-B-A triblock copolymer is a crystalline polymer like polystyrene and the "B" component is an elastomer polymer like poly(ethylene-propylene) to form a SEPS polymer, a poly (ethylene-butadyene) to form a SEBS polymer, or hydrogenated poly(isoprene+butadiene) to form a SEEPS polymer. For examples of suitable dry polymer gels or gelatinous elastomeric materials, the method of making the same, and various suitable configurations for the gel layer reference is made to U.S. Pat. Nos. 3,485,787; 3,676,387; 3,827,999; 4,259,540; 4,351,913; 4,369,284; 4,618,213; 5,262,468; 5,508,334; 5,239,723; 5,475,890; 5,334,646; 5,336,708; 4,432,607; 4,492,428; 4,497,538; 4,509,821; 4,709,982; 4,716,183; 4,798,853; 4,942,270; 5,149,736; 5,331,036; 5,881,409; 5,994,450; 5,749,111; 6,026,527; 6,197,099; 6,843,873; 6,865,759; 7,060,213; 6,413, 458; 7,730,566; 7,823,233; 7,827,636; 7,823,234; and 7,964,664, which are all incorporated herein by reference in their entireties. Other suitable configurations are described in copending application, entitled PATIENT SUPPORT, Ser. No. 61/697,010, filed Sep. 5, 2012, which has been refiled as U.S. non-provisional application Ser. No. 14/019,353, both of which are incorporated herein by reference in their entireties and are commonly owned by Stryker Corp. of Kalamazoo, Mich.

Other formulations of gels or gelatinous elastomeric materials may also be used in addition to those identified in these patents. As one example, the gelatinous elastomeric material may be formulated with a weight ratio of oil to polymer of approximately 3.1 to 1. The polymer may be Kraton 1830 available from Kraton Polymers, which has a place of business in Houston, Tex., or it may be another suitable polymer. The oil may be mineral oil, or another suitable oil. One or more stabilizers may also be added. Additional ingredients—such as, but not limited to—dye may also be added. In another example, the gelatinous elastomeric material may be formulated with a weight ratio of oil to copolymers of approximately 2.6 to 1. The copolymers may be Septon 4055 and 4044 which are available from Kuraray America, Inc., which has a place of business in Houston, Tex., or it may be other copolymers. If Septon 4055 and 4044 are used, the weight ratio may be approximately 2.3 to 1 of Septon 4055 to Septon 4044. The oil may be mineral oil and one or more stabilizers may also be used. Additional ingredients—such as, but not limited to—dye may also be added. In addition to these two examples, as well as those disclosed in the aforementioned patents, still other formulations may be used.

Figure 18:
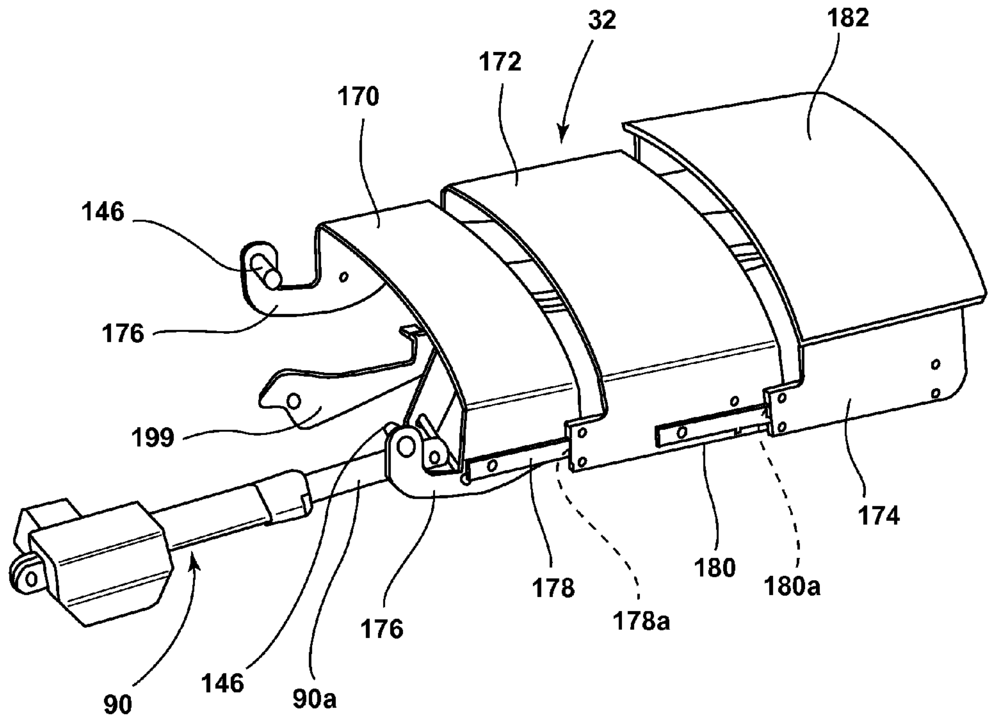
FIG. 18 is an enlarged perspective view of the leg rest shown in an extended position.
Figure 19:
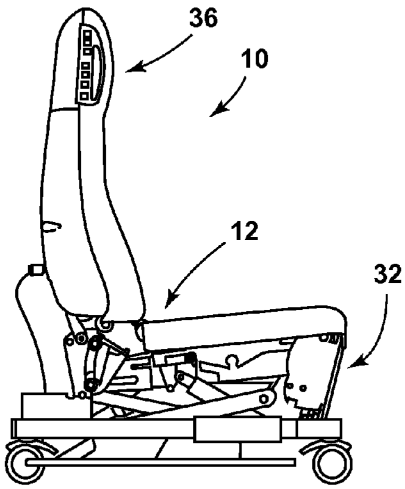
FIG. 19 is a side elevation view illustrating the leg rest extension.
Figure 20:
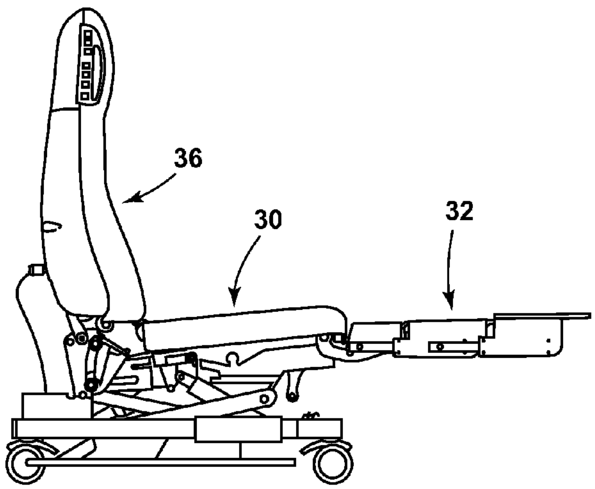
FIG. 20 is another elevation view illustrating the leg rest extension.

Referring to FIG. 18, as previously noted, apparatus 10 includes an extendable leg rest 32. The leg rest is formed by a plurality of nesting channel members 170, 172, and 174, with channel member 170 including rearwardly extending arms 176, which support pins 146 for pivotally coupling leg rest 32 to seat section 30. Channel members 172 and 174 are respectively mounted by rails 178 and 180, which extend in to corresponding channels 178*a* and 180*a* (see FIG. 21) provided or formed on the inwardly facing side of channel members 178 and 180. For example, channels 178*a* and 180*a* may be formed from low friction materials, such as plastic, including, for example, high density polyethylene (HDPE), to provide a sliding connection between the rails and the channels. In this manner, channels 170, 172 and 174 may be moved between a nested position, such as shown in FIG. 19, and a fully extended position such as shown in FIG. 20, by linear relative motion between the channel members. Additionally, outer most channel member 174 includes a cushion layer 182, such as foam, so that when the respective channel members are returned to their nested position, such as shown in FIG. 19, cushion layer 182 will extend over the full width of the leg rest and further will continue to provide the same width of support even when in its fully extended position. In this manner, when a patient is seated on apparatus chair 20, the patient's feet can be supported by the same surface as the leg extension is moved between its retracted seated position to its fully extended position shown in FIG. 20.

Figure 21:
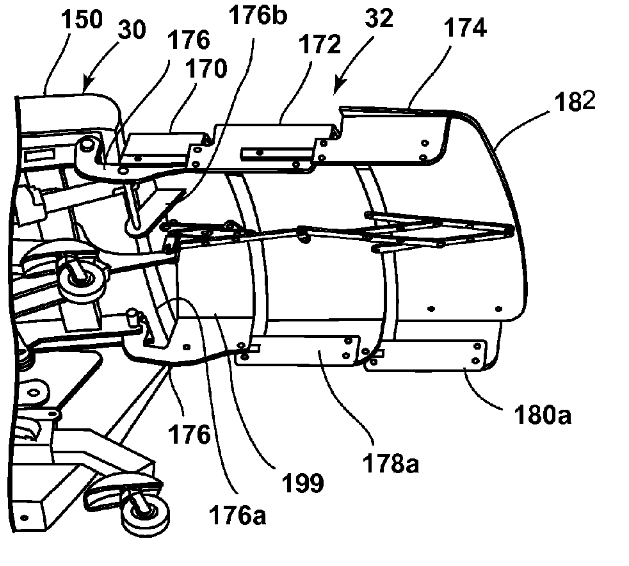
FIG. 21 is a bottom view of the foot section of the recliner in an extended configuration.
Figure 21A:
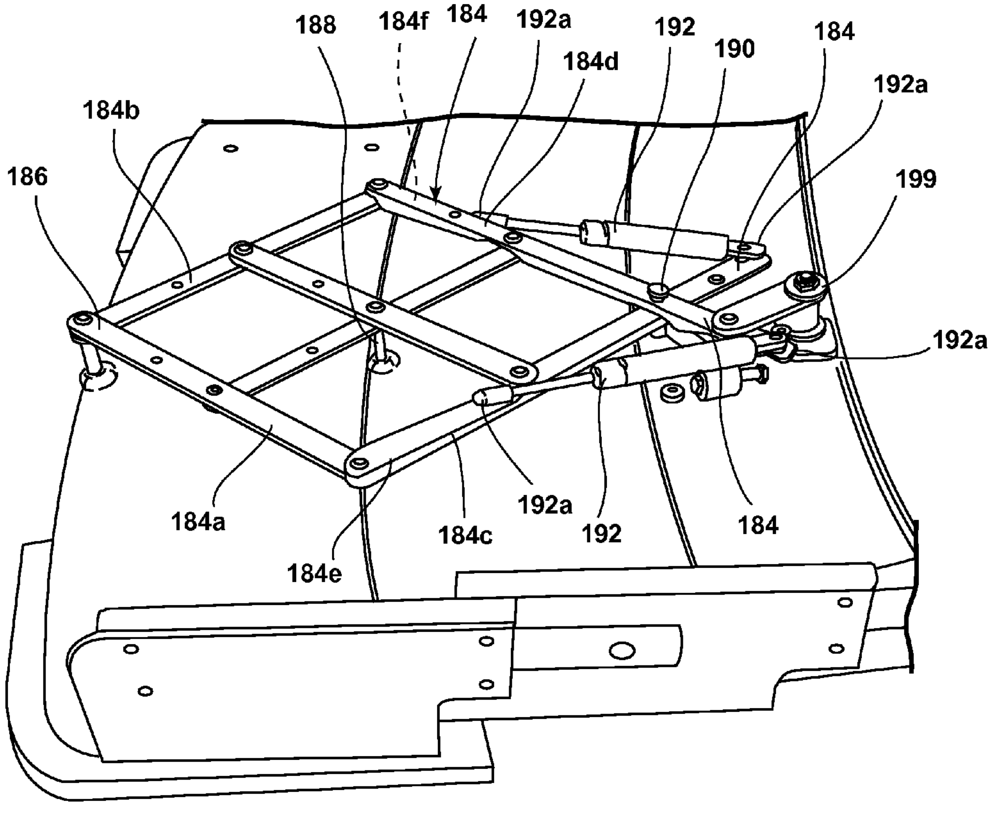
FIG. 21A is an enlarged perspective view of the scissor mechanism of the leg rest shown in an extended configuration.

Referring to FIG. 21, leg rest channel members 170, and 172, and 174 are moved from their nested seat position to their extended position by a scissor mechanism 184. Referring to FIG. 21A, scissor mechanism 184 is pinned on one end by a post 186 that mounts to the underside of outer most channel member 174. A medial portion of scissor mechanism 184 is pinned by a post 188 to the underside of intermediate channel member 172. Adjacent the opposed ends of scissor mechanism 184, scissor mechanism 184 includes a third post 190, which is secured to the inner most channel member 170. In this manner, when scissor mechanism 184 is compressed to the right as shown in FIG. 21, channel members 174, 172 and 170 will be pulled in to their nested configuration. Similarly, when the scissor mechanism 184 is extended, such as shown in FIG. 21A, the respective channel members are moved to their extended and outer most positions.

Figure 21B:
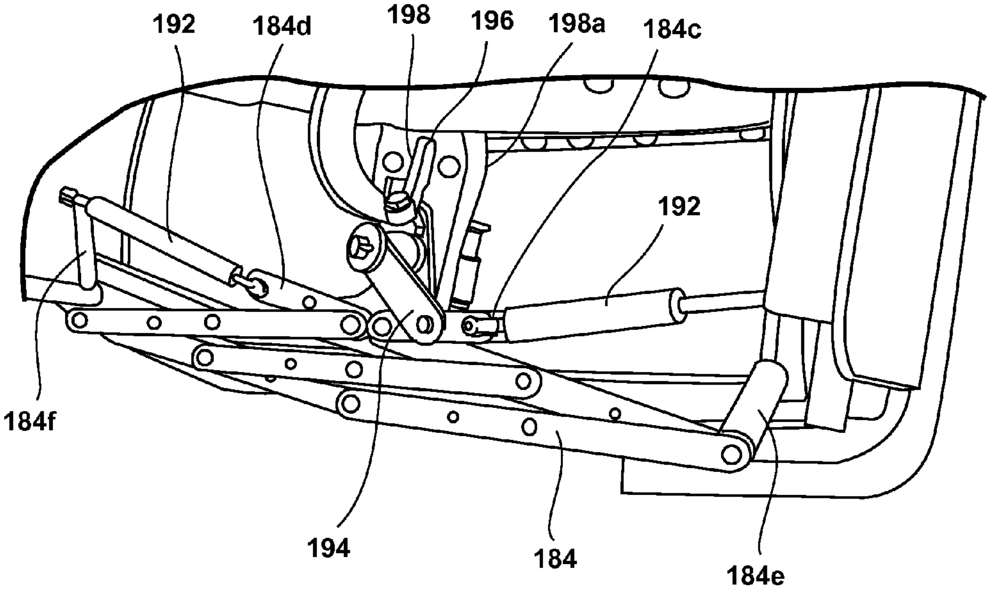
FIG. 21B is an enlarged perspective view of the scissor mechanism of the leg rest shown in a retracted configuration.
Figure 22:
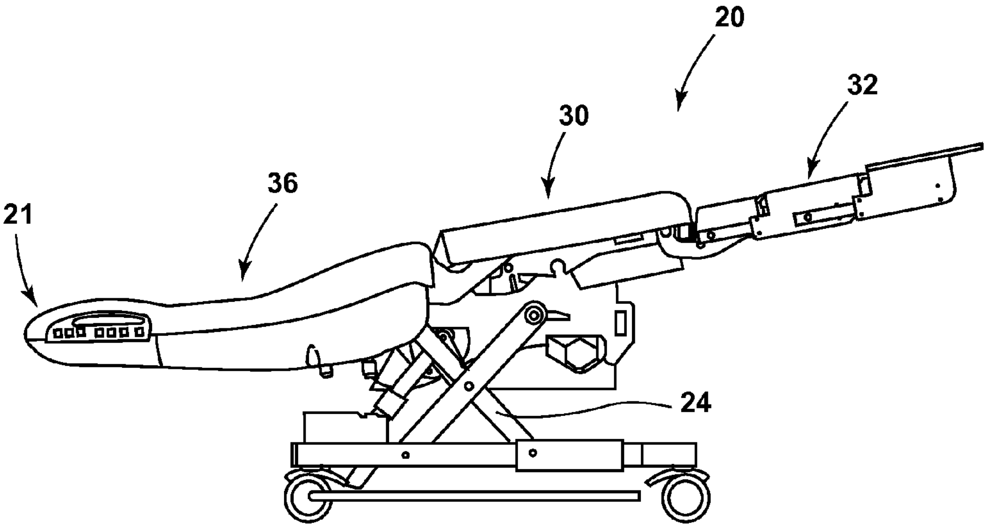
FIG. 22 is a side elevation view similar to FIG. 11 illustrating the support surface of the chair in a Trendelenburg position.

Referring to FIG. 21B, when scissor mechanism 184 is contracted, all of the nested channel members are pulled into their respective nested in overlapping configurations with channel member 174 extending straddling each of the intermediate and inner most channel members. As best seen in FIG. 21B, mounted to the inner end of scissor mechanism 184 is a link 194 which couples to a guide pin or post 196. Guide pin 196 is captured and guided along an elongated slotted opening 198 formed, for example, in a bracket 198*a*, which is mounted to the underside of inner most channel member 170. In this manner, when post 198 is pulled, scissor mechanism 184 will extend, such as shown in FIG. 21A, and when pushed to the position such as shown in FIG. 21B, scissor mechanism 184 will contract. As will be more fully described below, post 196 is pushed and pulled by a bracket 199.

Referring again to FIG. 21A, to facilitate expansion and contraction of scissor mechanism 184, scissor mechanism 184 may include a pair of gas cylinders 192 which are pinned at one end to the free ends of linkages of 184*c* and 184*d* and pinned at their opposed ends to guide linkages 184*e* and 184*f* mounted to linkages 184*c* and 184*d*. Gas cylinders 192 provide additional stiffness to the scissor mechanism 184 when moved from its contracted position, such as shown in FIG. 21B, to its fully extended position, such as shown in FIG. 21A.

As best seen in FIGS. 11 and 18, bracket or linkage 199 extends rearwardly of scissor mechanism 184 and is mounted to seat frame at bracket 130*a*, such as shown on FIG. 17. Referring again to FIG. 21, mounted between rearwardly depending arms 176 of channel member 170, is a transverse rod 176*a* to which actuator 90 is coupled. Transverse rod 176*a* is offset from the pivot connections formed by pins 146 with seat frame 130, so that when actuator 90 is extended or contracted, actuator 90 induces rotation of leg rest 32.

As best seen from FIG. 21, because the moveable end of scissor mechanism 184 is coupled to bracket 199, which is fixed to the seat frame, extension and contraction of actuator 90 will cause leg rest 152 to pivot about pivot pins 146 and further cause the respective channel members to translate with respect to each other. Thus, as pin 196 slides in the sliding joint formed by pin 196 and bracket 198, scissor mechanism 184 will extend or contract.

Figure 23A:
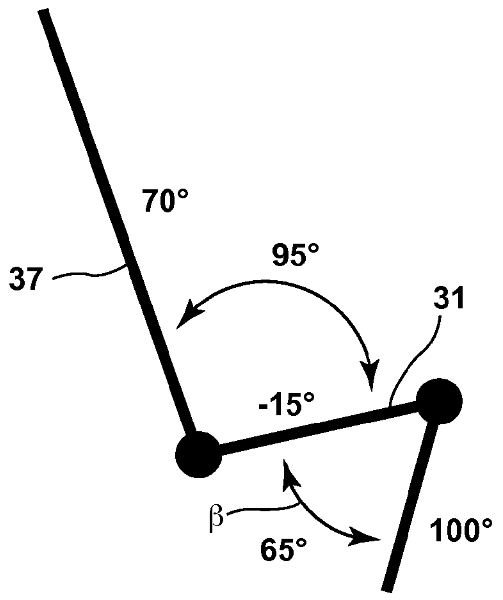
FIG. 23A is a schematic representation of the angles of the chair as shown in FIG. 23.
Figure 23:
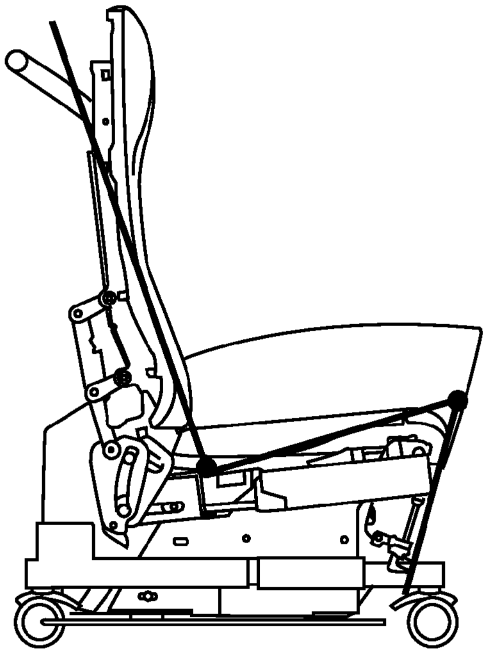
FIG. 23 is a side elevation view of a cross section through the recliner chair illustrating the upright position of the chair.
Figure 24A:
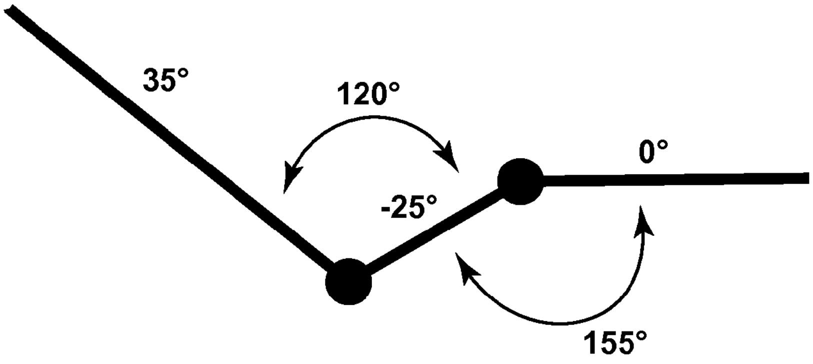
FIG. 24A is a schematic representation of the angles of the chair as shown in FIG. 24.
Figure 24:
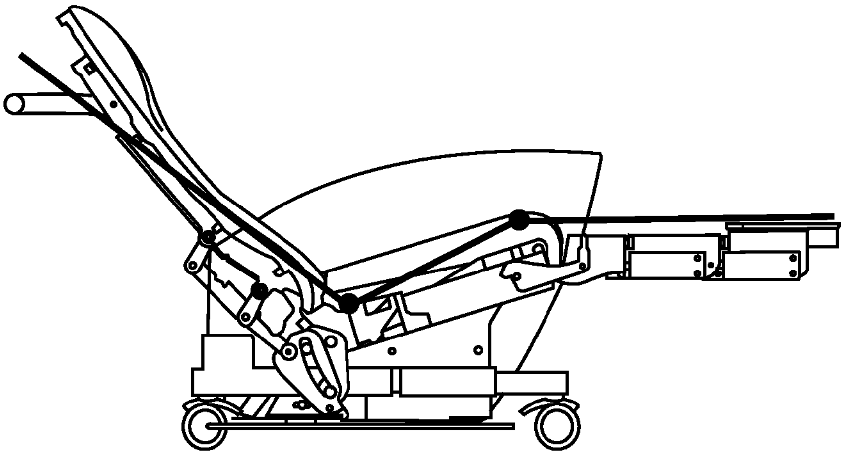
FIG. 24 is a cross section view to the chair illustrating the reclined position of the chair.
Figure 25A:
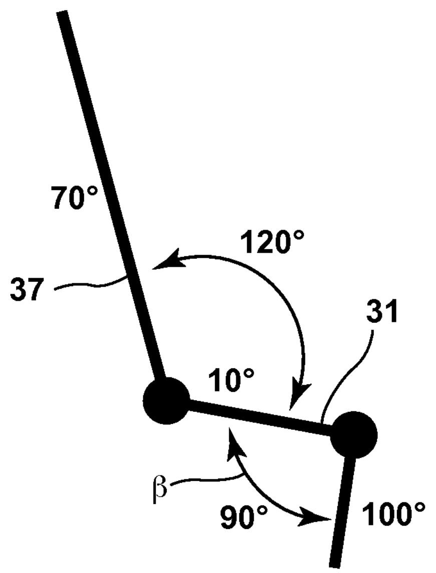
FIG. 25A is a schematic representation of the angles of the chair as shown in FIG. 25.
Figure 25:
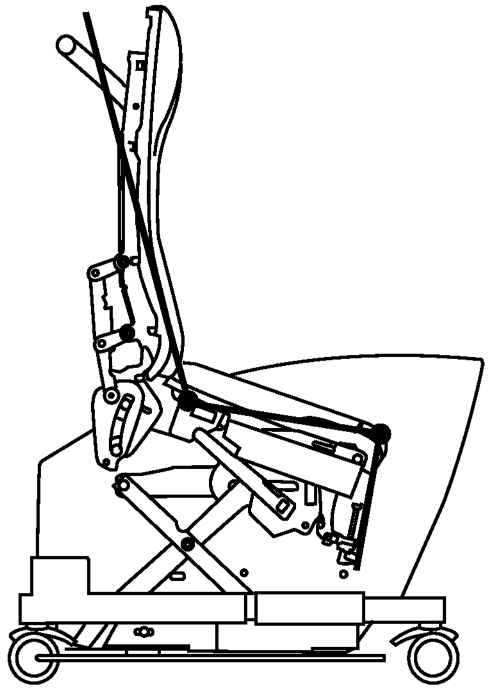
FIG. 25 is a cross section through the chair illustrating a sit-to-stand configuration.
Figure 26B:
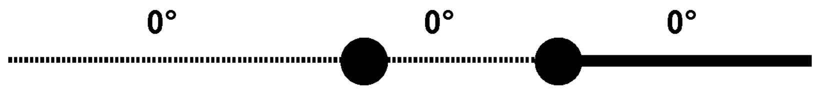
FIG. 26B is a schematic representation of the angles of the chair as shown in FIG. 26.
Figure 26A:
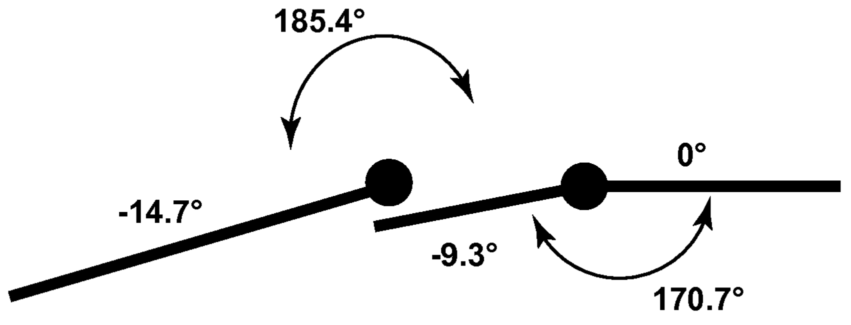
FIG. 26A is a schematic representation of the angles of the chair as shown in FIG. 26.
Figure 26:
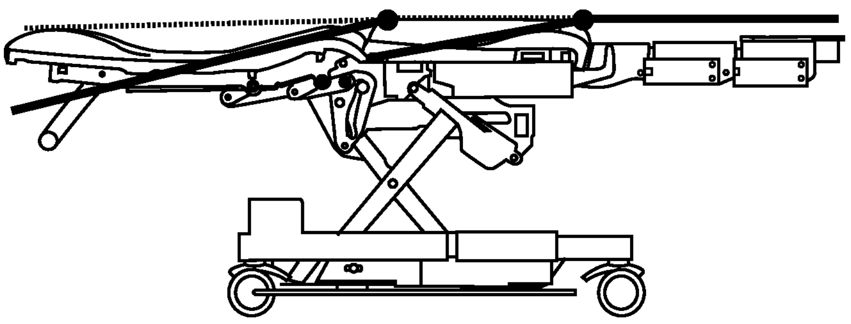
FIG. 26 is a cross section view of the chair illustrating the lateral transfer position of the chair.

Referring to FIGS. 22-27, as being more fully described below, various actuators and connections between the head section and the seat section, and the seat section and the leg rest allow the support surface 21 to move from a generally upright seated position, such as shown in FIG. 23, to a reclined position such as shown in FIG. 24. Further, the support surface 21 is configured to be reconfigured to a sit-to-stand configuration in which the seat, as described previously, is lifted and tilted forwardly to a standing position, such as shown in FIG. 25. The support surface is further configured and arranged to allow the support surface to move to a generally horizontal configuration, such as shown in FIG. 26, to thereby support a patient in a supine position. Additionally, the support surface is configured and arranged to assume a Trendelenburg position with the head section tilted downwardly while the leg rest is tilted upwardly. For example, in the seat configuration, the leg rest may be angled in a range of 95 to 100 degrees relative to the floor in which the apparatus is supported and optionally about 100 degrees, while the seat section may be tilted at an angle in a range of −20 to −10 relative to the floor. And, the backrest may be positioned at an angle in a range of 65 to 75 degrees including, for example, 70 degrees relative to the floor.

Referring to FIGS. 24 and 24A, when in the reclined position, the leg rest may be positioned generally parallel to the floor, while the seat section may be oriented with a −20 to −30 degree angle or optionally about −25 degree angle with respect to the floor, while the backrest may be oriented at an angle in a range of approximately 30 to 40 degrees, and optionally about 35 degrees.

Referring to FIGS. 25 and 25A, when the apparatus is in its sit-to-stand configuration, the leg rest may be positioned in a range of about 95 to 105 degrees relative to the floor and optionally at an angle of about 100 relative to the floor, while the seat section may be angled at an angle 5 degrees to 15 degrees, and optionally at an angle of about 10 degrees relative to the floor. Further, the backrest may be angled with respect to the floor in a range of 65 to 75 degrees and optionally at an angle of about 70 degrees.

Referring to FIGS. 26A and 26B, the angle of the seat section may be generally horizontal while the angle of the seat section may be in a range of −14 to −5 and optionally at about −9 degrees or at about −9.3 degrees. In this configuration, the head section may be tilted backwards in a range of about −9 degrees to −19 degrees and optionally at about −14.7 degrees. As shown in FIG. 26, these angles are taken at the edge of the back and seat frames. When the angles are defined in the DIOV (seat edge plane & head/lumber plane, FIG. 26B), the angles of each section are approximately zero. In other words, the sections are generally horizontal.

Figure 27B:
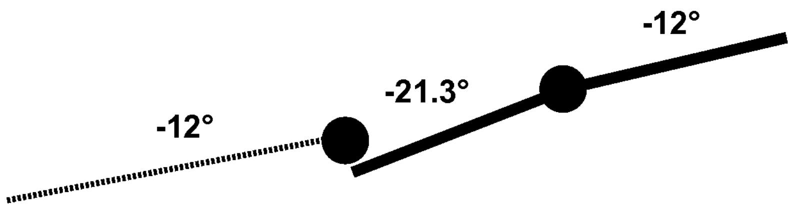
FIG. 27B is a schematic representation of the angles of the chair as shown in FIG. 27.
Figure 27A:
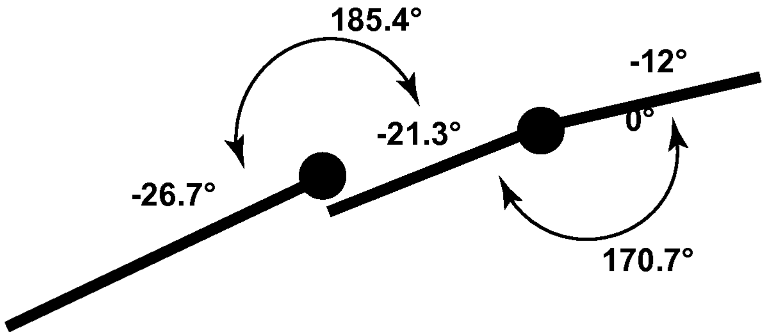
FIG. 27A is a schematic representation of the angles of the chair as shown in FIG. 27.
Figure 27:
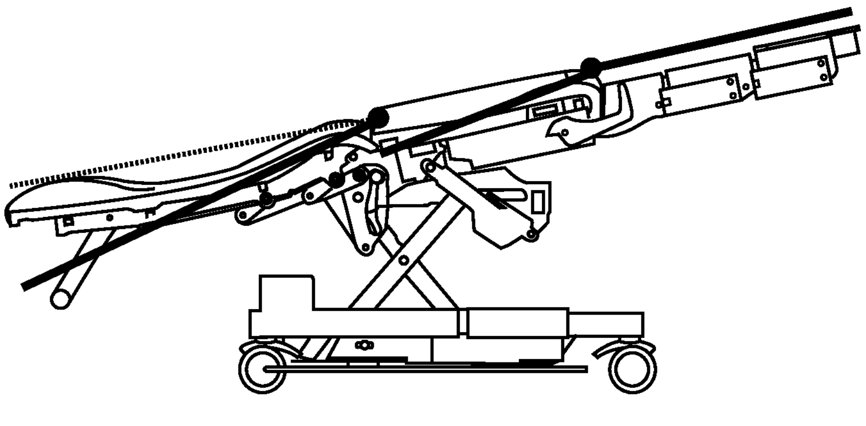
FIG. 27 is a cross section of the recliner chair of FIG. 1 illustrating the support surface of the recliner chair in a Trendelendburg position.

In a Trendelenburg position, as illustrated in FIG. 27A, the foot section may be moved to an angle in the range of −15 to −10 degrees or optionally −12 degrees from horizontal, while the seat section is moved to an angle in a range of −18 to −25 degrees and optionally about −21.3 degrees. Further, the head section may be angled at an angle in the range of −21 to −30 degrees and optionally about −26.7 degrees. When defined in DIOV, as illustrated in FIG. 27B, the angle includes the leg rest in a range of an angle from −9 to −15 degrees or approximately −12 degrees, with the seat section falling in a range of about −18 degrees to −25 degrees and optionally of about −21.3 degrees. However, in this configuration, the head section is angled in a range of about −9 to −15 degrees and optionally about −12 degrees. Note that all of these angles are in reference to the floor surface on which the apparatus is supported.

Patient support apparatus 10 includes a control system 78 (FIG. 28) that controls the electrical aspects of patient support apparatus 10. Control system 78 includes a controller 82 that is in communication with lift actuator 86, an exit detection system 96, a backrest actuator 88, right and left control panels 80, a leg rest actuator 90, a brake solenoid 308, a pendant 84, and seat actuator 92. Controller 82 is constructed of any electrical component, or group of electrical components, that are capable of carrying out the functions described herein. In many embodiments, controller 82 will be microprocessor based, although not all such embodiments need include a microprocessor. In general, controller 82 includes any one or more microprocessors, microcontrollers, field programmable gate arrays, systems on a chip, volatile or nonvolatile memory, discrete circuitry, and/or other hardware, software, or firmware that is capable of carrying out the functions described herein, as would be known to one of ordinary skill in the art. Such components can be physically configured in any suitable manner, such as by mounting them to one or more circuit boards, or arranging them in other manners, whether combined into a single unit or distributed across multiple units.

In one embodiment, controller 82 communicates with individual circuit boards contained within each control panel 80 using an I-squared-C communications protocol. It will be understood that, in alternative embodiments, controller 82 could use alternative communications protocols for communicating with control panels 80 and/or with the other components of control system 78. Such alternative communications protocols include, but are not limited to, a Controller Area Network (CAN), a Local Interconnect Network (LIN), Firewire, or other serial communications.

Figure 6:
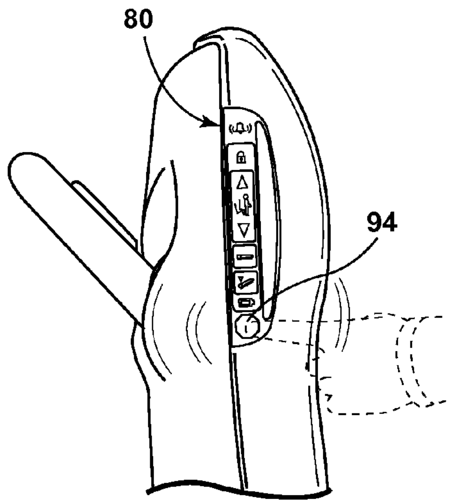
FIG. 6 is perspective view of the chair.
Figure 6A:
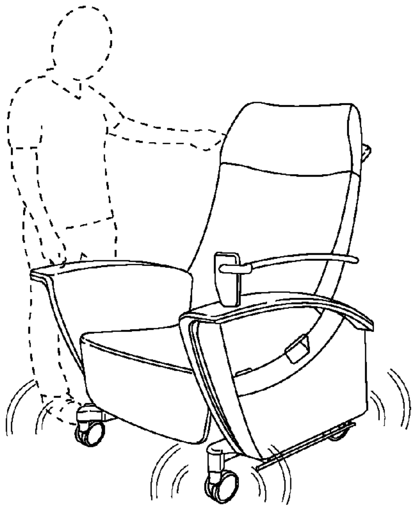
FIG. 6A is an enlarged view of the head section of the recliner illustrating one of the chair based control units.
Figure 7:
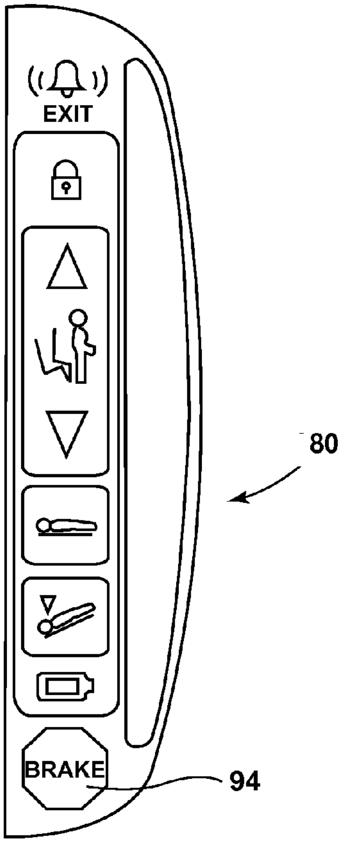
FIG. 7 is an enlarged view of the control unit of FIG. 6.

Control system 78 may be configured to generate a built in deployment delay for the leg rest, which may be handled electronically. When the chair is in the upright position and a recline button (which may be provided on control panel 80 shown in FIGS. 6, 6A, and 7 is pressed, the leg rest will not start deploying immediately to allow the patient to adjust the backrest angle a few degrees for comfort purposes while still in an "upright" chair position. Therefore, the control system does not power the actuator that moves the leg rest until after the backrest is lowered to a preselected degree.

In addition, control system 78 may be configured to drive the lift actuator and the seat actuator at the same time at a certain speed to create a virtual pivot for the seat section, which is located between a back edge of the seat section and a front edge of the seat section. Further, the virtual pivot is formed closer to a patient's knee sitting on the seat section to create a motion that essentially mimics the human body motion of standing up.

Figure 29:
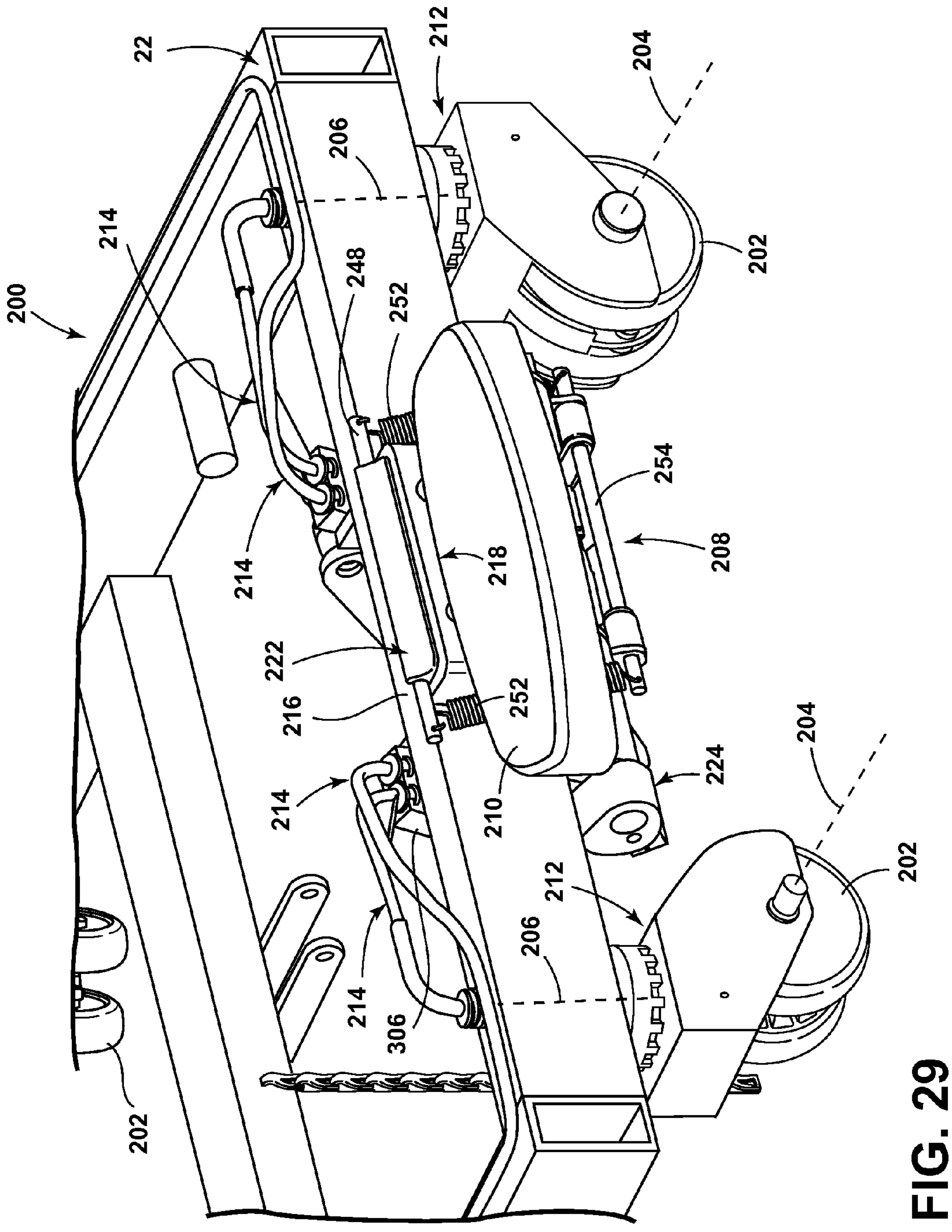
FIG. 29 is a partial, perspective view of a brake system according to one embodiment.

Control system 78 may also be configured to form an electric brake. Referring again to FIG. 11, base 22 includes a plurality of caster wheels 202 that are attached thereto (FIG. 29). Each wheel 202 is configured to be able to rotate about its generally horizontal wheel axis 204 (FIG. 29). Further, each wheel is configured to be able to swivel about a generally vertical swivel axis 206. A brake system 200 is provided with patient support apparatus 10 that, when activated, prevents all four wheels 202 from both rotating about their respective horizontal wheel axes 204 and swiveling about their respective vertical swivel axes 206. Activating brake system 200 therefore effectively immobilizes patient support apparatus 10 from movement across the floor in any direction.

As can be seen in FIG. 29, brake system 200 includes, in addition to wheel 202, a brake pedal assembly 208 having a brake pedal 210, a plurality of individual brake assemblies 212, and a plurality of mechanical cables 214 that each extend from brake pedal assembly 208 to one of the individual brake pedal assemblies 208. More specifically, patient support apparatus 10 includes four wheels 202, four individual brake assemblies 212, four mechanical cables 214, and one brake pedal assembly 208. Each mechanical cable 214 extends from brake pedal assembly 208 to one of the individual brake assemblies 212. Mechanical cables 214 may be Bowden cables, or any comparable types of cables that are capable of transferring the motion of brake pedal assembly 208 to each of the individual brake assemblies 212.

Brake pedal assembly 208 is positioned near the bottom of the rear side of patient support apparatus 10 where it does not interfere with the ingress and egress of a patient into and out of the patient support apparatus. More specifically, brake pedal assembly is attached to a rear base bar 216 (FIG. 29) that is part of base 22. Brake pedal assembly 208 is configured such that, when a user pushes down on brake pedal 210, mechanical cables 214 are allowed to move toward their respective individual brake assemblies 212, which, as will be discussed in greater detail below, activates both the braking of the wheels rotation and their swiveling. When brake pedal 210 returns upward to its unbraked position, brake assembly 208 is configured to pull on each of the mechanical cables 214—moving them away from their respective brake assemblies 212—which causes the wheels 202 to become unbraked and free to both rotate and swivel.

Brake pedal assembly 208 is configured such that, when a user pushes pedal 210 completely down to the brake position, it will automatically remain in this brake position until the user supplies additional downward force on pedal 210. When a user supplies the additional downward force, the brake pedal 210 will be released, thereby allowing it to return upward to its unbraked position. Brake pedal assembly 208 therefore automatically toggles brake pedal 210 between the braked (down) and unbraked (up) positions. Moving between these two positions is accomplished by the user applying a first downward force, and then applying a second downward force. The manner in which this function is achieved will now be described in more detail.

Figure 30:
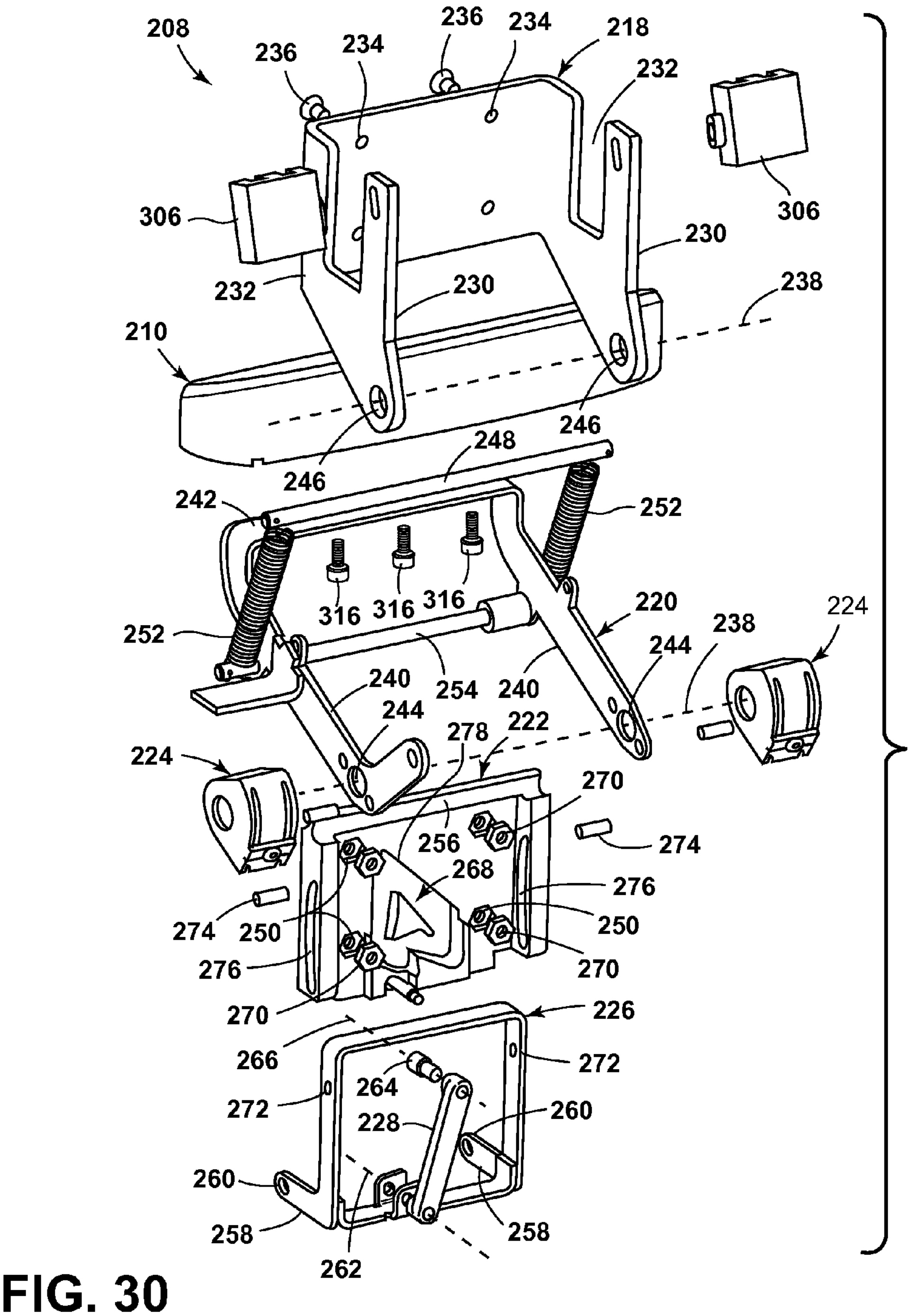
FIG. 30 is an exploded, perspective view of brake pedal assembly of the brake system.

As shown in more detail in FIG. 30, brake pedal assembly 208 includes a brake bracket 218, pedal 210, a pedal support 220, a toggle plate 222, a pair of cable attachments 224, and a toggle frame 226 having a pivotal toggle finger 228 coupled thereto. Brake bracket 218 includes a pair of flanges 230 that each have a cutout 232 defined therein. Cutout 232 is sized and positioned so as to receive, and fit around, rear base bar 216 of base 22 (FIG. 29). Brake bracket 218 further includes a plurality of apertures 234 into which respective fasteners 236 are inserted. In addition to passing through apertures 234, fasteners 236 are inserted into corresponding holes (not shown) in rear base bar 216 so that brake bracket 218 is immovably affixed to rear base bar 216. Still further, as will be described in greater detail below, fasteners 236 also fit into corresponding toggle plate apertures 250 defined in toggle plate 222 so that toggle plate 222 is rigidly attached to rear base bar 216 by way of fasteners 236, as well.

Pedal support 220 is pivotally coupled to brake bracket 218 (FIG. 30). Pedal support 220 includes a pair of spaced apart pedal support arms 240 that are connected together by a pedal support body 242. Brake pedal 210 fits over pedal support body 242 and is supported by pedal support body 242. Brake pedal 210 may be secured to pedal support 220 in any conventional manner, such as by the use of fasteners 316. Pedal support 220 is pivotally coupled to brake bracket 218 such that it is able to pivot about a generally horizontal pedal pivot axis 238. Each pedal arm 240 includes a pivot aperture 244 defined therein that aligns with a corresponding bracket aperture 246 defined in bracket 218. Pedal arms 240 are pivotally coupled to bracket 218 by way of pins (not shown), or other suitable attachment structures, that fit into both pivot apertures 244 and bracket apertures 246.

An upper horizontal bar 248 is coupled to respective top ends of a pair of pedal springs 252 (FIG. 30). The bottom end of each pedal spring 252 is coupled to a lower horizontal bar 254 that is oriented generally parallel to upper horizontal bar 248. Lower horizontal bar 254 is coupled near each of its ends to each of the pedal support arms 240. Upper horizontal bar 248 is rigidly seated in a bar channel 256 defined in a top edge of toggle plate 222. Because toggle plate 222 is rigidly mounted to rear base bar 216 of base 22, and upper horizontal bar 248 is rigidly seated in bar channel 256 of toggle plate 222, horizontal bar 248 does not move as brake pedal 210 pivots between the braked and unbraked position. However, because lower horizontal bar 254 is coupled to pedal support arms 240, which do pivot as brake pedal is pivoted between the braked and unbraked positions, lower horizontal bar 254 will move as the pedal 210 moves. That is, lower horizontal bar 254 will move further away from upper horizontal bar 248 when brake pedal 210 is pushed down to the braked position, and will move close toward upper horizontal bar 248 when brake pedal 210 is released to the unbraked position.

Pedal springs 252 are adapted to urge lower horizontal bar 254 upwards. Because lower horizontal bar 254 is also coupled to a bottom portion of toggle frame 226, pedal springs 252 will urge toggle frame 226 (and toggle finger 228) upwards. This upward force is greater when pedal 210 is in the braked positioned (down) than when pedal 210 is in the unbraked (up) position.

Turning to toggle frame 226, it can be seen that toggle frame 226 includes a pair of spaced apart lower arms 258 that are generally parallel to each other and that extend away from the body of toggle frame 226. Each lower arm 258 includes an arm aperture 260 defined adjacent its distal end. Arm apertures 260 are dimensioned to receive lower horizontal bar 254 of pedal support 220. As lower horizontal bar 254 moves up and down in conjunction with the upward and downward movement of brake pedal 210, so too will toggle frame 226 (because of the connection of lower horizontal bar 254 through arm apertures 260.

Toggle finger 228 of toggle frame 226 is pivotally coupled to toggle frame 226 such that toggle finger 228 is able to pivot about a toggle finger pivot axis 262. The end of toggle finger 228 opposite its pivotal connection to toggle frame 226 is coupled to a roller 264. Roller 264 is secured to toggle finger 228 in a manner that allows it to rotate about a rotational axis 266 that is generally parallel to toggle finger pivot axis 262, and generally orthogonal to the plane defined by toggle plate 222. Roller 264 is positioned to roll within a looped channel 268 defined in toggle plate 222. The interaction of roller 264 within looped channel 268 is what holds brake assembly 212 in the respective braked and unbraked positions, and allows brake pedal 210 to move between these two positions in response to a downward force applied thereon. The manner of this interaction is described in more detail below.

As was noted above, toggle plate 222 is fixedly secured to brake bracket 218 by way of fasteners 236, which also fixedly secure both toggle plate 222 and brake bracket 218 to rear base bar 216 of base 22. More specifically, brake bracket 218 is sandwiched between rear base bar 216 and toggle plate 222. Fasteners 236 may be any suitable fasteners. In the embodiment shown, fasteners 236 have threaded ends to which threaded nuts 270 are attached after the body of fasteners 236 have been inserted through apertures 234 and 250, and corresponding apertures (not shown) in rear base bar 216 (FIG. 30).

Figure 31:
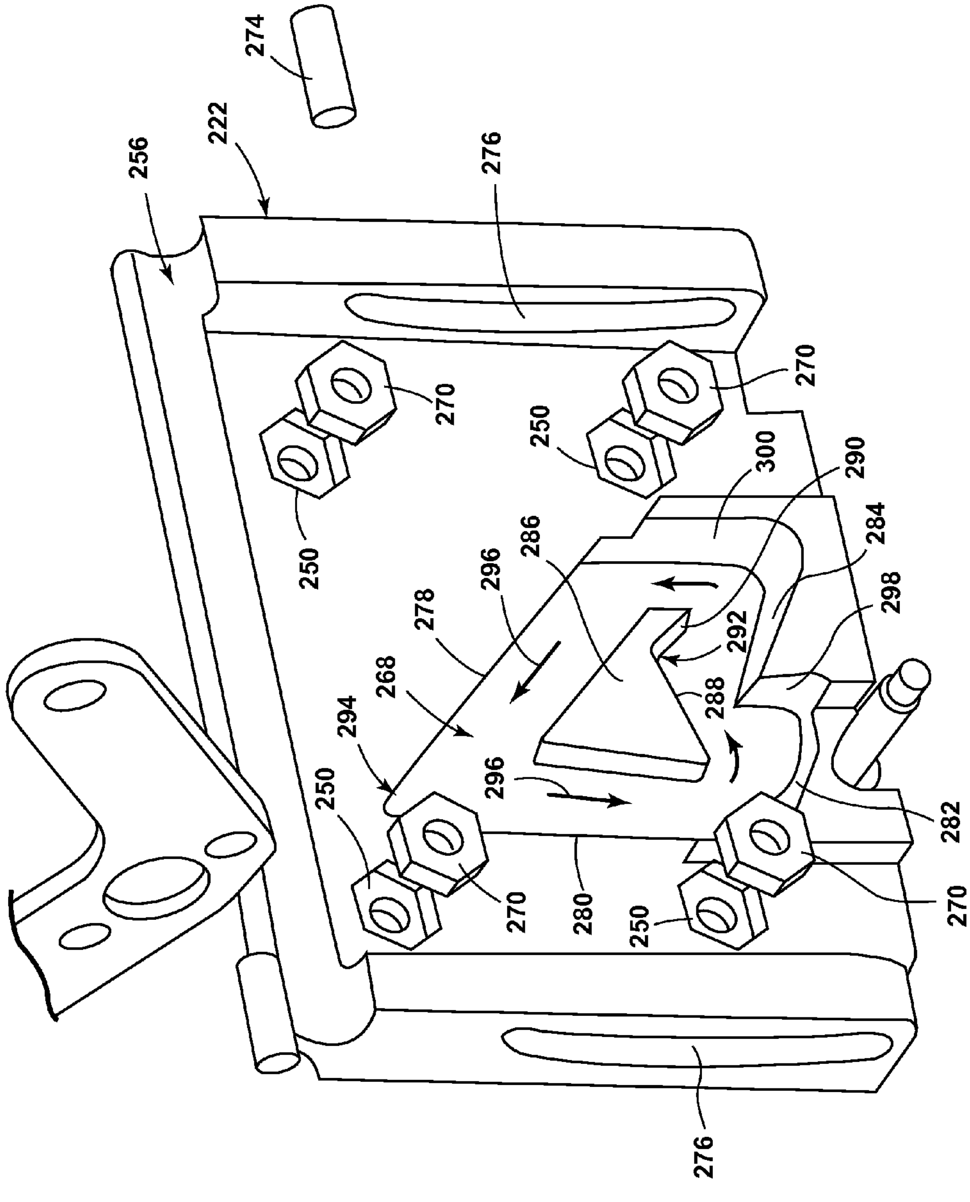
FIG. 31 is a close up perspective view of a toggle plate of the brake assembly.

Toggle frame 226 further includes a pair of upper apertures 272 defined in its respective side members. Upper apertures 272 each receive a guide pin 274. Each guide pin 274 is positioned to ride within a corresponding guide channel 276 defined in toggle plate 222 (FIG. 31). The riding of guide pins 274 within guide channel 276 maintains the close relationship between toggle frame 226 and toggle plate 222 as the brake pedal 210 moves between the up and down position. This close relationship ensures that toggle roller 264 attached to toggle finger 228 remains in looped channel 268 of toggle plate 222 at all times throughout the up and down motion of the brake pedal 210.

As was noted earlier, the interaction of roller 264 of toggle finger 228 within looped channel 268 ensures that brake pedal 210 remains in either the up or down position, and can be moved between these two positions by a user exerting a downward force on the brake pedal. The manner in which toggle finger 228, roller 264, and channel 268 accomplish this will now be described with respect to FIG. 31. As can be seen in FIG. 31, looped channel 268 includes a sloped top wall 278, a left side wall 280, a sloped bottom wall 282, and a right sloped bottom wall 284. Looped channel 268 further includes a center projection 286 that defines a center left sloped wall 288 and a center right sloped wall 290. The junction of center left sloped wall 288 and center right sloped wall 290 defines a brake seat 292 where roller 264 is seated when brake pedal 210 is in the braked position (see FIG. 33). The junction of sloped top wall 278 and left sidewall 290 defines an unbraked seat 294 where roller 264 is seated when brake pedal 210 is in the unbraked position (see FIG. 32).

During movement of brake pedal 210 between the braked and unbraked positions, roller 264 moves within looped channel 268 in a direction defined by arrows 296. Thus, as can be seen in FIG. 31, roller 264 moves in a counterclockwise direction as brake pedal 210 moves between the braked and unbraked position. More specifically, roller 264 will make one complete circuit around looped channel 268 whenever brake pedal 210 moves from its initial position (braked or unbraked) to its other position and then returns back to its initial position.

The movement of roller 264 around looped channel 268 is guided by the various walls defining looped channel 268. This can be better understood by describing the movement of roller 264 from an initial position, say, the unbraked position, to the braked position, and back, which will now be done. When brake pedal 210 is in the unbraked position (up), roller 264 is seated in unbraked seat 294. Roller 264 remains in unbraked seat 294 because pedal springs 252 urge toggle frame 226 upwardly, which in turn urges toggle finger 228 and roller 264 upwardly. This upward urging force on roller 264 causes it to remain seated in unbraked seat 294 in the absence of any external forces applied by a user. In other words, left side wall 280 prevents roller 264 from moving leftward (as viewed in FIG. 31), and sloped top wall 278 prevents roller 264 from moving rightward because any such rightward movement would—due to the sloped nature of wall 278—urge roller 264 downward, which, in the absence of external user applied forces, is prevent by springs 252.

When a user presses on brake pedal 210 and brake pedal 210 is initially in the unbraked position, brake pedal 210 moves downward, which, due to the corresponding movement of toggle frame 226 and toggle finger 228, causes roller 264 to move downward (in FIG. 31). Because there are no lateral forces acting on roller 264, roller 264 moves downward with little or no lateral movement. This downward movement continues until roller 264 reaches left sloped bottom wall 282. Because of the sloped configuration of left bottom wall 282, wall 282 will urge roller 264 rightwards (in FIG. 31) as roller 264 continues its downward journey. This rightward movement will continue until roller 264 reaches the lowermost point of left sloped bottom wall 282, at which point any further rightward movement of roller 264 will be prevented by a stop wall 298 positioned between left sloped bottom wall 282 and right sloped bottom wall 284. At the time roller 264 reaches this trough, brake pedal 210 will have reached the lowermost point in its downward movement.

When roller 264 is positioned at the lower most portion of left sloped bottom wall 282 (i.e. adjacent stop wall 298—see FIG. 31), roller 264 will remain in this position for so long as the user continues to maintain a sufficient downward force on brake pedal 210. When the user releases this downward force, roller 264 will be free to move upward (due to the urging of pedal springs 252). This upward movement will continue with little or no lateral movement until roller 264 comes into contact with left central sloped wall 288. When contact is made between roller 264 and left central sloped wall, any further upward movement of roller 264 will cause roller 264 to also move laterally to the right (from the viewpoint of FIG. 31). This is because of the angular nature of sloped wall 288. This rightward movement will continue until roller 264 encounters right middle sloped wall 290, which is downwardly sloped, and acts as a stop on further rightward movement of roller 264 (when the user has released pedal 210). Therefore, when roller 264 reaches the junction between left and right central sloped walls 288 and 290, roller 264 will be held in this position by the upward urging of springs 252. And, as noted, this position defined the brake seat 292. Pressing down on brake pedal 210 will therefore move pedal 210 downward and automatically hold the brake pedal 210 in the downward position when the user releases pedal 210. The brakes will therefore remain on.

When a user wishes to release the brakes from the braked position, the user simply pushes downwardly again on brake pedal 210. This causes roller 264 to move downward out of the brake seat 292 position. This downward movement will continue with little or no lateral movement (as viewed in FIG. 31) until roller 264 comes into contact with right sloped bottom wall 284. When contact is made with right sloped bottom wall 284, the angular nature of bottom wall 284 will impart a rightward force on roller 264. This rightward and downward movement of roller 264 will continue until roller 264 reaches the trough defined at the junction of right sloped bottom wall 284 and a right side wall 300. Further downward movement of the brake pedal 210 at this point is no longer possible, and in order for the user to complete the releasing of the brakes, the user must then release his or her downward force on brake pedal 210.

When the user releases his or her downward force on brake pedal 210, roller 264 will move upward from the trough position defined at the junction of right side wall 300 and right sloped bottom wall 284, due to the upward urging of pedal springs 252. This upward movement of roller 264 will continue with little or no lateral movement (as viewed in FIG. 31) until roller 264 contacts sloped top wall 278. At that point, the upward movement of roller 264 will include a lateral movement component as well, due to the sloped nature of wall 278. This lateral component will be generally leftward (as viewed in FIG. 31). This upward and lateral movement of roller 264 will continue until roller 264 returns to the unbraked seat 294 defined at the junction of sloped top wall 278 and left side wall 280. When roller 264 reaches this seat, brake pedal 210 will have reached its uppermost position, and roller 264 will remain in this unbraked seat position until the user decides to press down on the pedal again. When the user presses downward again, roller 264 will move in the direction already described and eventually complete another circuit around looped channel 268.

As was described above, the upward and downward movement of brake pedal 210 causes pedal support arms 240 to also pivot upwardly and downwardly. This upward and downward movement of support arms 240 causes changes in the tension applied to mechanical cables 214 in a manner that will now be described. As can be seen in FIG. 30, each cable attachment 224 is coupled to one of the two support arms 240. The upward and downward pivoting of support arms 240 therefore causes the cable attachments 224 to pivot upwardly and downwardly. As can be seen more clearly in FIGS. 32 and 33, each mechanical cable 214 is made up of an inner cable 302 that is slidably contained within an outer sleeve 304. The inner cables 302 of two of the mechanical cables 214 are attached to a first one of cable attachments 224, and the inner cables 302 of the other two mechanical cables 214 are attached to the second one of cable attachments 224. Consequently, the upward and downward movement of cable attachments 224 will cause the inner cables 302 to slide within their outer sleeves 304 (one end of each of the sleeves is fixedly attached to a cable housing 306 that does not move).

Pressing down on the brake pedal 210 to move it to the braked position causes the distance between cable attachments 224 and the cable housings 306 to decrease, thereby allowing the inner cables 302 to slide toward their respective individual brake assemblies 212. Releasing the brake pedal 210 causes the distance between the cable attachments 224 and the cable housing 306 to increase, thereby exerting a pulling force on inner cables 302 that pulls the inner cables 302 away from their respective individual brake assemblies 212. The manner in which this movement of the inner cables 302 causes the individual brake assemblies to activate and deactivate the brakes will be described in more detail below.

In addition to being able to activate and deactivate the brakes of patient support apparatus 10 by manually pushing downward on pedal 210, patient support apparatus 10 is also equipped, in at least some embodiments, with an electrical brake. The electrical brake is activated by way of a brake button 94 positioned on each of the control panels 80. In the illustrated embodiment, there are two such control panels 80, one on each side of the backrest 36. Pressing the brake button 94 once changes the brake system 200 from its current status (braked or unbraked) to its opposite status. Pressing brake button 94 again changes status of brake system 200 again. The brake button therefore acts as an electronic toggle that, upon repeated pressing, repeatedly switches the brake system 200 between being on and off.

Figure 28:
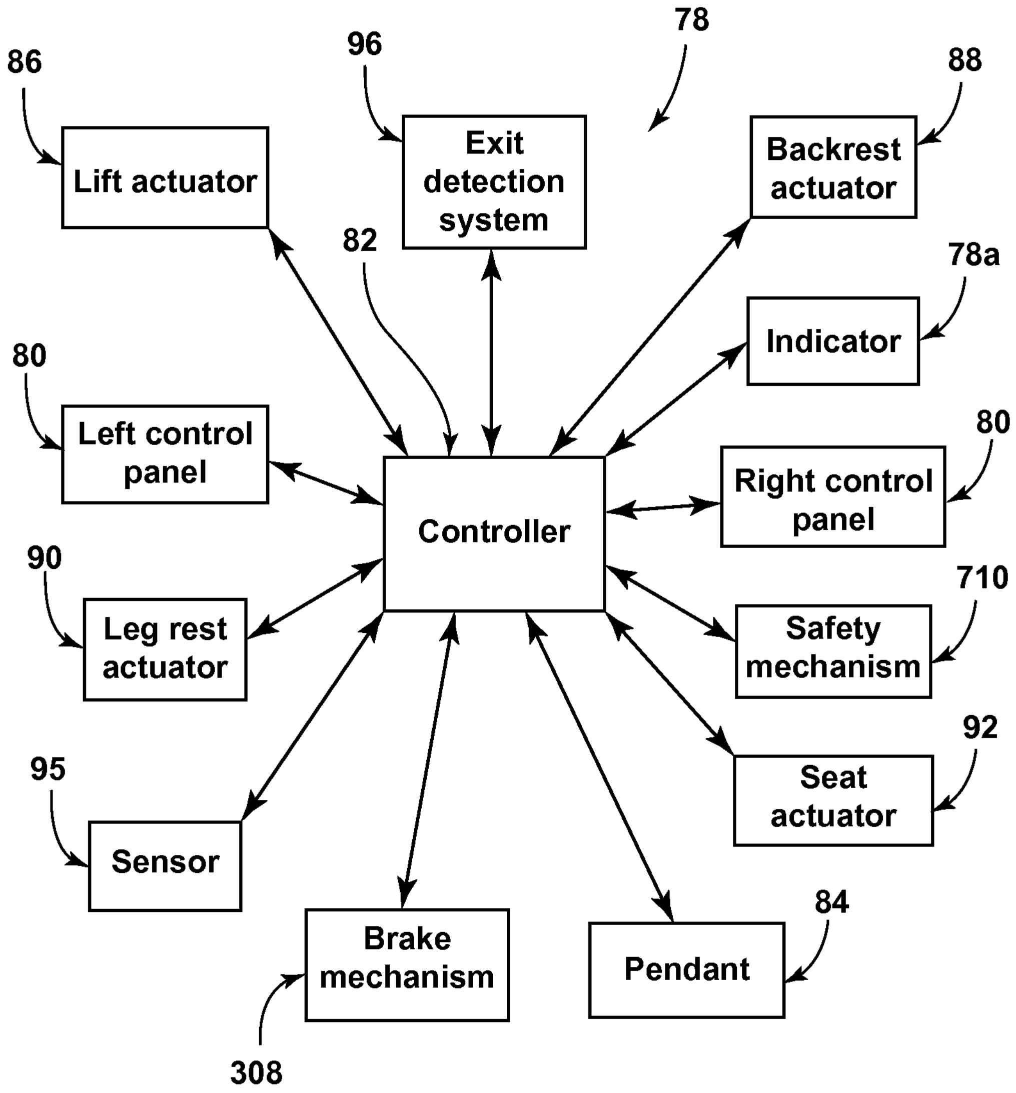
FIG. 28 is a diagram of a control system for the chair.

Each brake button 94 is in electrical communication with controller 82 (FIG. 28). Further, controller 82 is in electrical communication with a brake solenoid 308. When controller 82 detects that either of brake buttons 94 have been pressed, it changes the state of brake solenoid 308, which in turn causes the brake system 200 to change its state.

Figure 32:
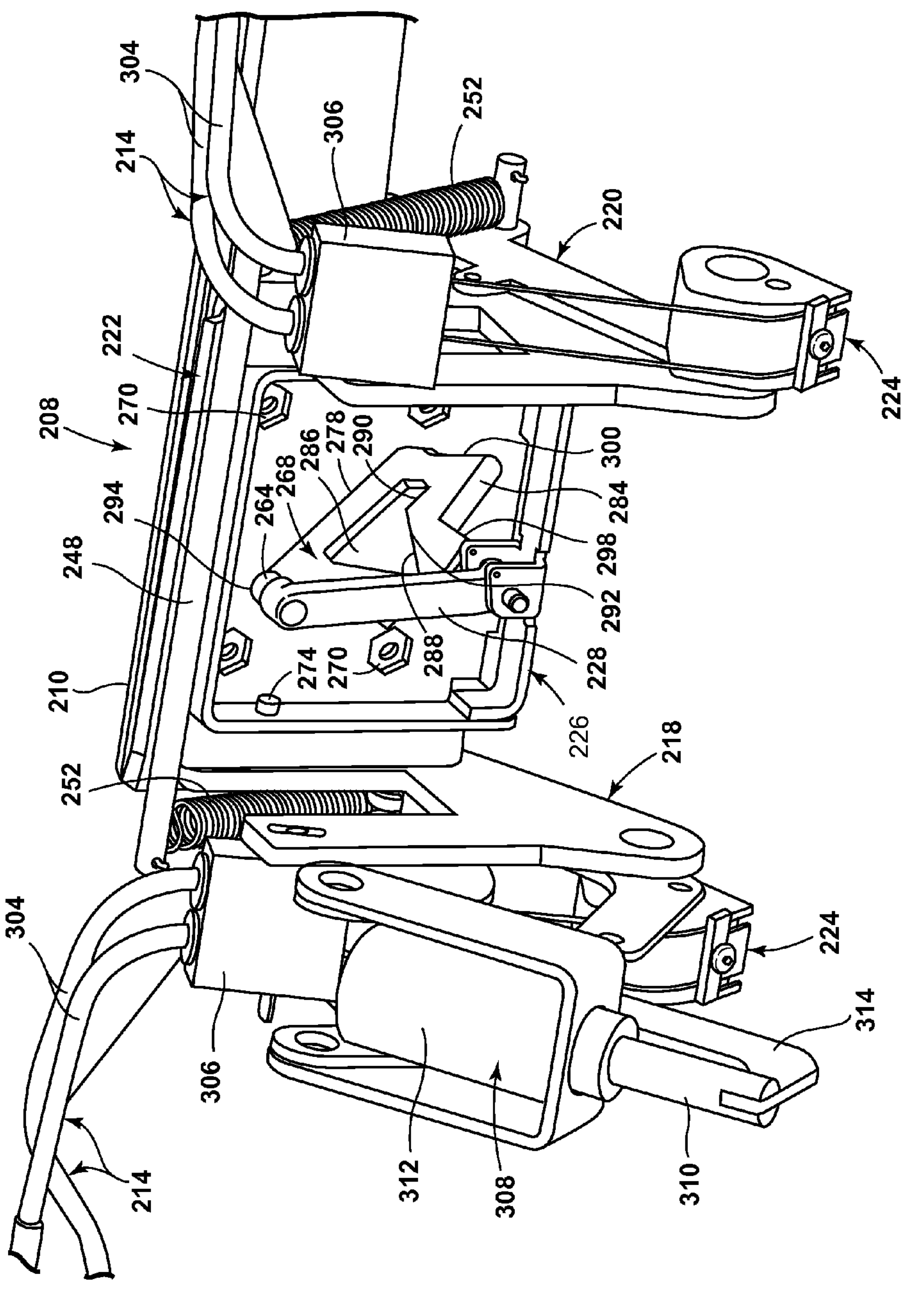
FIG. 32 is a rear, perspective view of the brake pedal assembly shown in an unbraked position.
Figure 33:
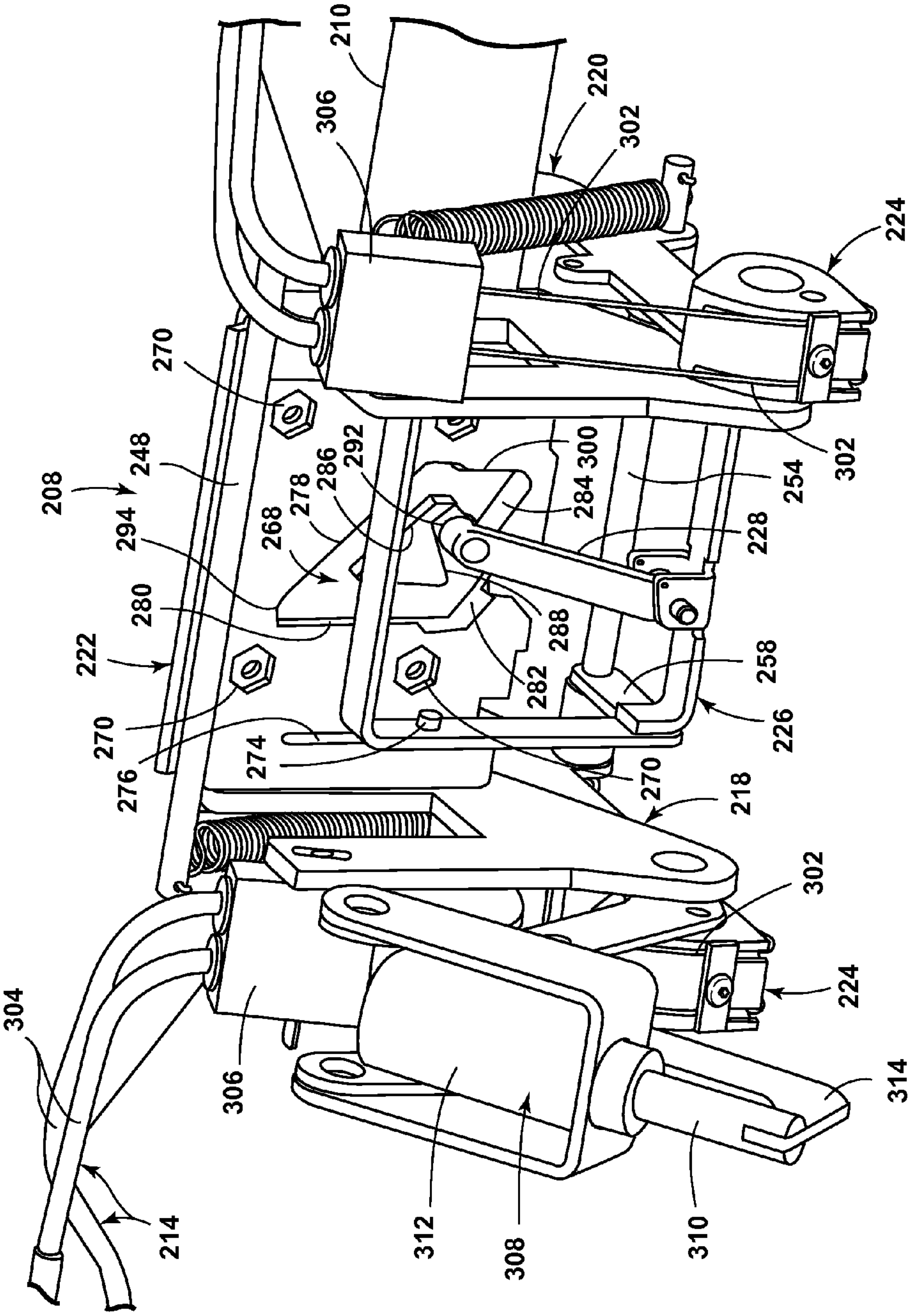
FIG. 33 is a rear, perspective view of the brake pedal assembly shown in the braked position.

FIGS. 32 and 33 illustrate the location of brake solenoid 308. Brake solenoid 308 includes an extendable and retractable shaft 310 that selectively extends out of, and retracts into, a solenoid body 312. The distal end of shaft 310 is affixed to an arm 314 that, although not visible in FIGS. 32 and 33, is connected at its opposite end to a distal end of one of pedal support arms 240 (the leftmost arm 240 in FIG. 30). When shaft 310 extends out of, and retracts into body 312, body 312 remains stationary with respect to base 22, while the movement of shaft 310 causes arm 314 to move with respect to base 22. Further, the movement of arm 314 is conveyed to one of pedal support arms 240, which in turn causes pedal support 220 to move in the same manner as if brake pedal 210 had been stepped on. Thus, pressing on one of brake buttons 94 causes solenoid 308 to move pedal support 220 (and pedal 210) in the same manner as if a user had manually stepped on pedal 210. Pressing on one of brake buttons 94 again causes solenoid 308 to once again move pedal support 220 in the same manner as if a user had manually pressed on pedal 210. Solenoid 308 therefore toggles brake system 200 between the braked and unbraked conditions in the same manner that manually pushing down on brake pedal 210 toggles system 200 between braked and unbraked conditions.

Accordingly, the braking system provides a manually operable input mechanism (e.g. brake pedal) and a user interface (e.g. solenoid) that can actuate the brake system actuator and further allows either of the manually operable input mechanism and the user interface to actuate the brake system actuator to thereby lock at least one of the caster wheels and to allow either one to release or disengage the actuator to thereby unlock the caster wheels.

Figure 34:
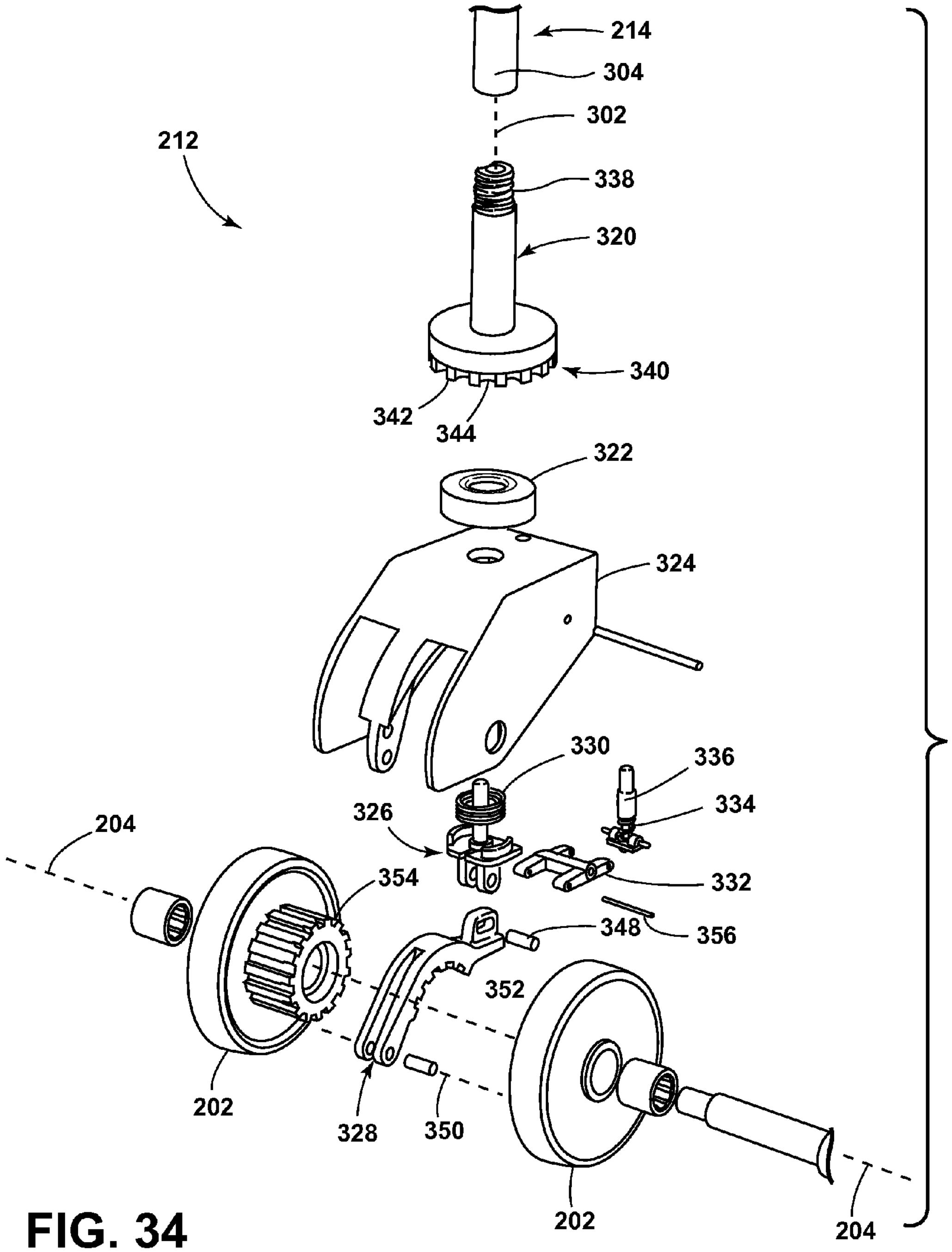
FIG. 34 is an exploded perspective view of an individual brake assembly.
Figure 35:
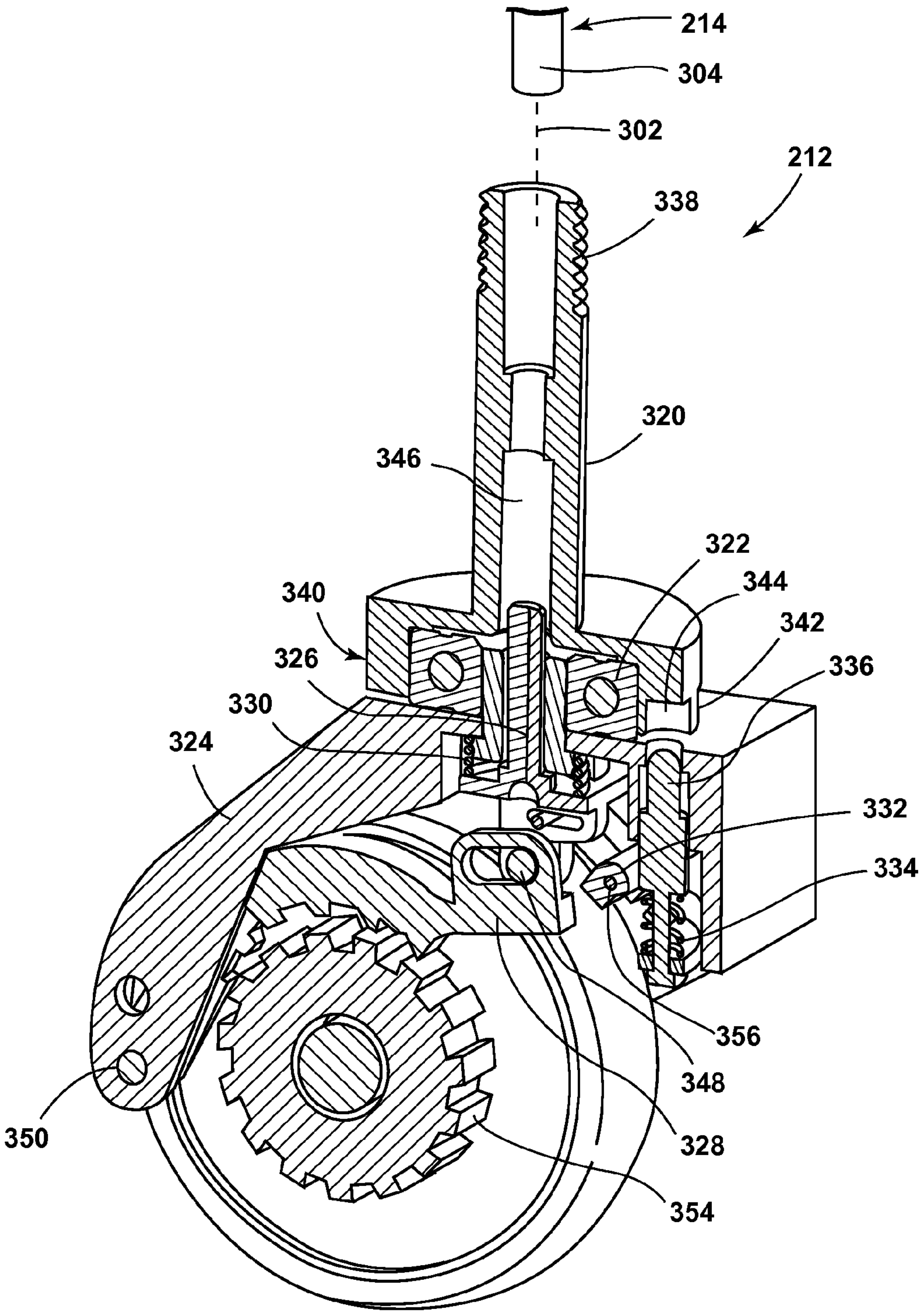
FIG. 35 is a perspective view of the individual brake assembly shown in the unbraked position.
Figure 36:
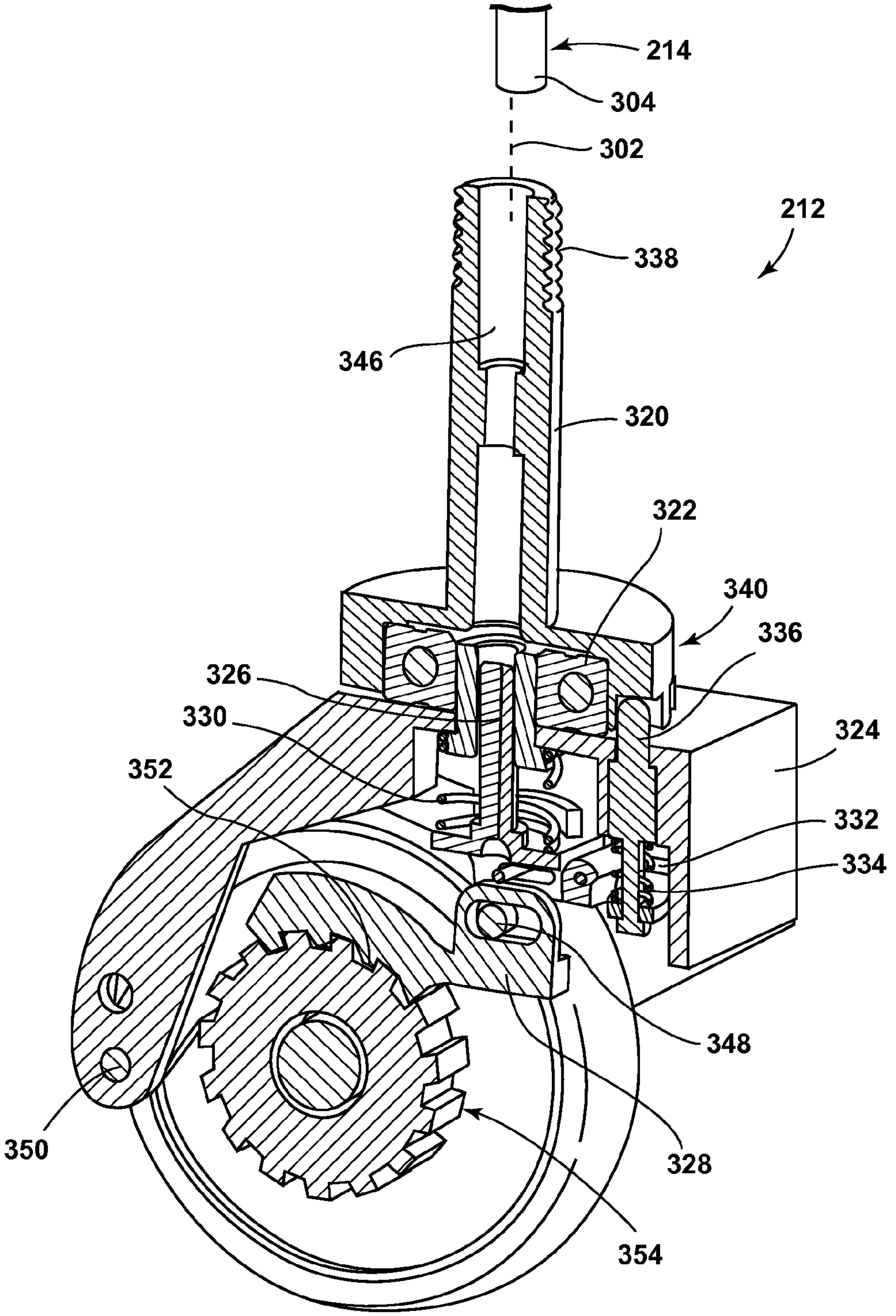
FIG. 36 is a perspective view of the individual brake assembly shown in the braked position.

The effect on the individual brake assemblies 212 of inner cables 302 being pulled and released by brake pedal 210 can be better understood with respect to FIGS. 34-35 which illustrate the components of each individual brake assembly 212. Each brake assembly 212 includes a brake mount 320, a swivel bearing 322, a brake housing 324, a reciprocating member 326, a brake pivot 328, a brake spring 330, a swivel lever 332, a swivel spring 334, a swivel lock pin 336, and a pair of wheels 202. Brake mount 320 includes a plurality of external threads 338 defined at its top end that enable brake mount 320 to be fixedly attached to base 22. Brake mount 320 further includes an annular castle member 340 defined on the underside of its bottom that includes an alternating set of projections 342 and slots 344. Still further, brake mount 320 includes a vertical bore 346 (FIGS. 35 and 36).

Vertical bore 346 provides a space for internal cable 302 of the corresponding mechanical cable 214 to run. The end of internal cable 302 is attached to reciprocating member 326. Consequently, when cable 302 is pulled away from brake assembly 212 by the releasing of pedal 210, reciprocating member 326 moves upwardly. This upward movement of reciprocating member 326 causes brake pivot 328, which is coupled to reciprocating member 326 by way of a pin 348, to also pivot upwardly about a brake pivot axis 350. Brake pivot 328 includes a plurality of teeth 352 defined on its underside that selectively engage and disengage from a toothed gear 354 that is fixedly, or integrally, coupled to wheels 202. More specifically, when internal cable 302 is pulled away from brake assembly 212 (upwardly in FIGS. 34-36), brake pivot 328 pivots upwardly about pivot axis 350, which causes teeth 352 to disengage from toothed gear 354. This allows wheels 202 to rotate about their wheel axis 204.

When a user pushes down on brake pedal 210 to engage brake system 200, the downward movement of pedal 210—as explained above-allows internal cables 302 to move toward brake assemblies 212. More specifically, the downward movement of pedal 210 allows the force of each brake spring 330 to push down its respective reciprocating member 326, which pulls the connected internal cable 302 downward. The downward pushing of spring 330 on reciprocating member 326 also pushes brake pivot 328, causing it to pivot downwardly about pivot axis 350, which brings teeth 352 into engagement with toothed gear 354, and thereby prevents rotation of wheels 202 about their axis 204. Spring 330 therefore stores a greater amount of potential energy when the brakes are disengaged than when the brakes are engaged. The release of this potential energy when brake system 200 is activated is what provides the motive force for pushing brake pivot 328 into engagement with toothed gear 354.

Swivel bearing 322 enables housing 324 and all of the brake assembly components beneath brake mount 320 to swivel about generally vertical swivel axis 206 (FIG. 29). As mentioned earlier, this swiveling movement is also prevented when brake system 200 is activated, and enabled when brake system 200 is deactivated. The manner in which this swiveling is selectively enabled and disabled will now be described.

Swivel lever 332 is also coupled to reciprocating member 326 (FIG. 34). This means that the end of swivel lever 332 coupled to reciprocating member 326 will move upward and downward in unison with reciprocating member. Further, because swivel lever 332 has a center portion pivotally coupled to a pivot pin 356, the opposite end of swivel lever 332 will move upward when the end coupled to reciprocating member 326 moves downward, and vice versa. Swivel lock pin 336, and swivel spring 334, which are both coupled to the end of swivel lever 332 opposite reciprocating member 326, will therefore move upward and downward in a manner that is opposite to the upward and downward movement of reciprocating member 326. In other words, when reciprocating member 326 moves upward, swivel lock pin 336 and swivel spring 334 will move downward, and vice versa.

The upward movement of swivel lock pin 336 will drive pin 336 into engagement with annular castle member 340. If pin 336 is aligned with one of the slots 344 defined in castle member 340, the engagement of pin 336 in the slot 344 will prevent the swiveling of the wheel assembly about the vertical swivel axis 206. If pin 336 is not aligned with one of the slots 344, but instead engages all or a portion of one of the projections 342 on annular castle member 340, then swivel spring 334 will be compressed due to the upward movement of the adjacent end of swivel lever 332. While spring 334 remains compressed due to engagement with a projection 342, that particular wheel 202 is not locked against swivel movement. However, as soon as a slight swiveling of that wheel occurs, this will rotate pin 336 with respect annular castle member 340 and will almost immediately cause pin 336 to become aligned with a slot 344. As soon as alignment with a slot 344 occurs, swivel spring 334 will decompress and force pin 336 into the slot 344. That particular wheel 202 will then be locked against swiveling movement. When a user releases brake pedal 210, swivel lock pin 336 will be pulled downward and out of engagement with castle member 340, thereby allowing that particular wheel 202 to swivel again.

Figure 38:
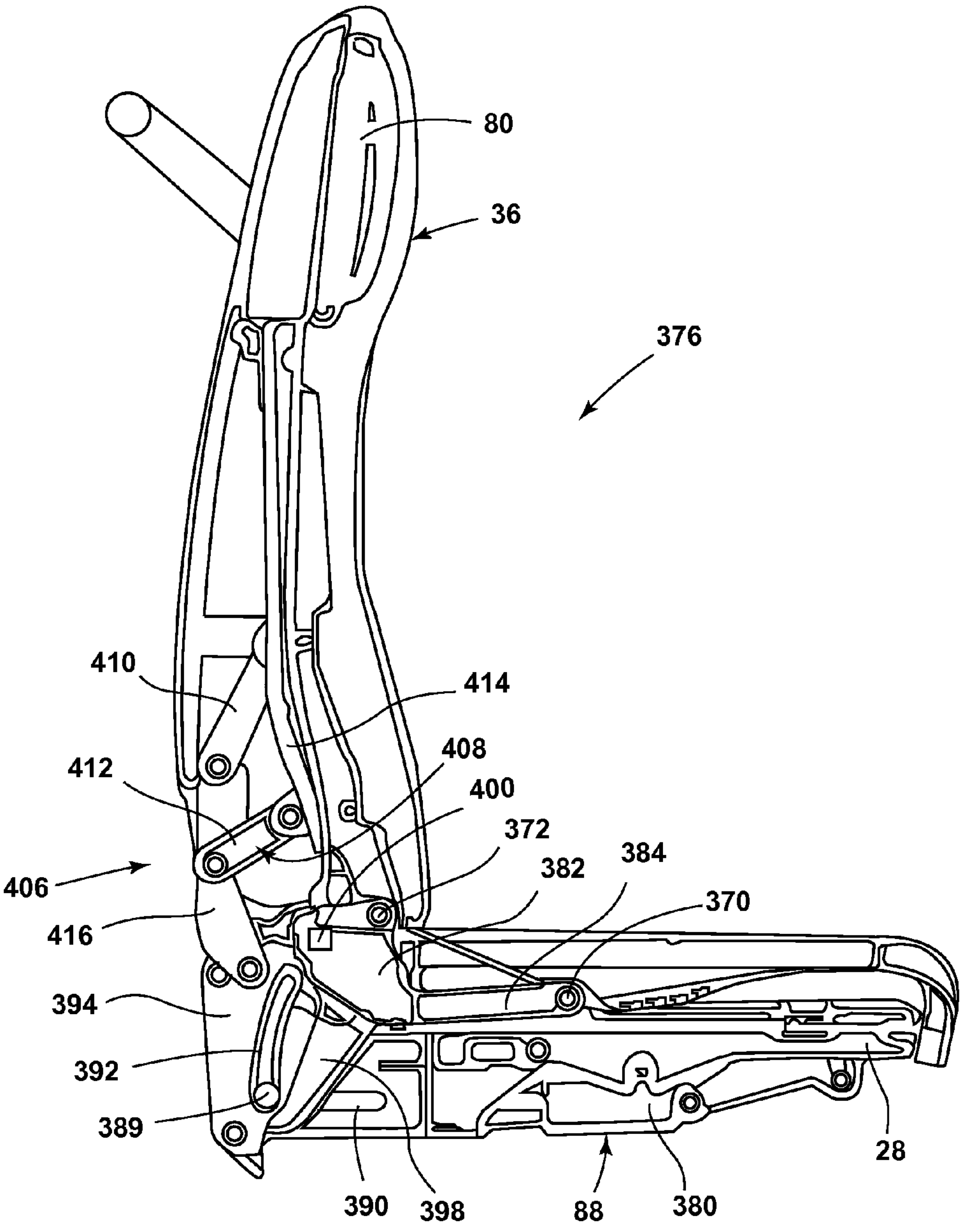
FIG. 38 is a side, elevational view of the backrest, seat frame, backrest bracket, and backrest linkage assembly shown with the backrest in a fully upright position.
Figure 39:
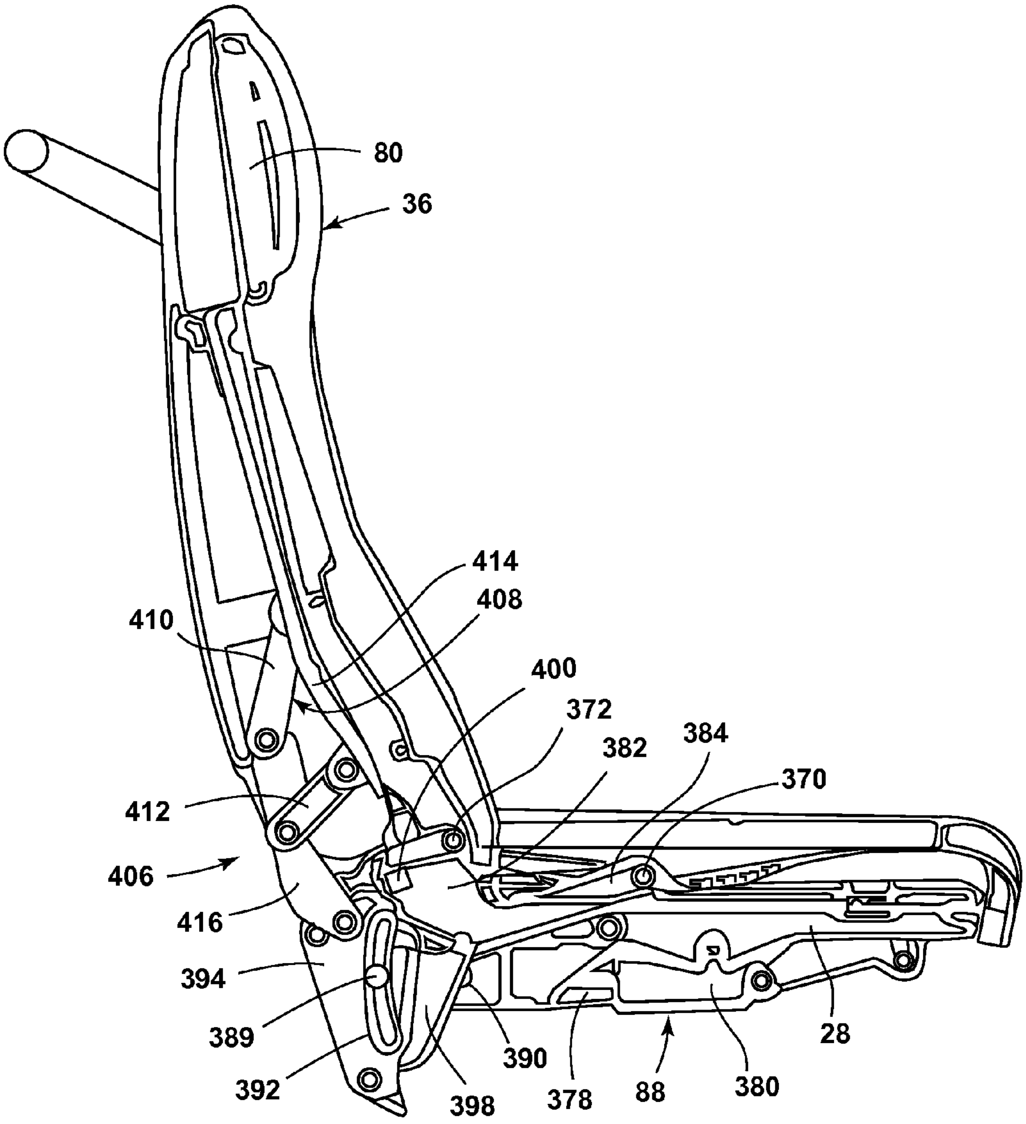
FIG. 39 is a side, elevational view of the backrest, seat frame, backrest bracket, and backrest linkage assembly shown with the backrest in a position tilted slightly backwards from the fully upright position.
Figure 40:
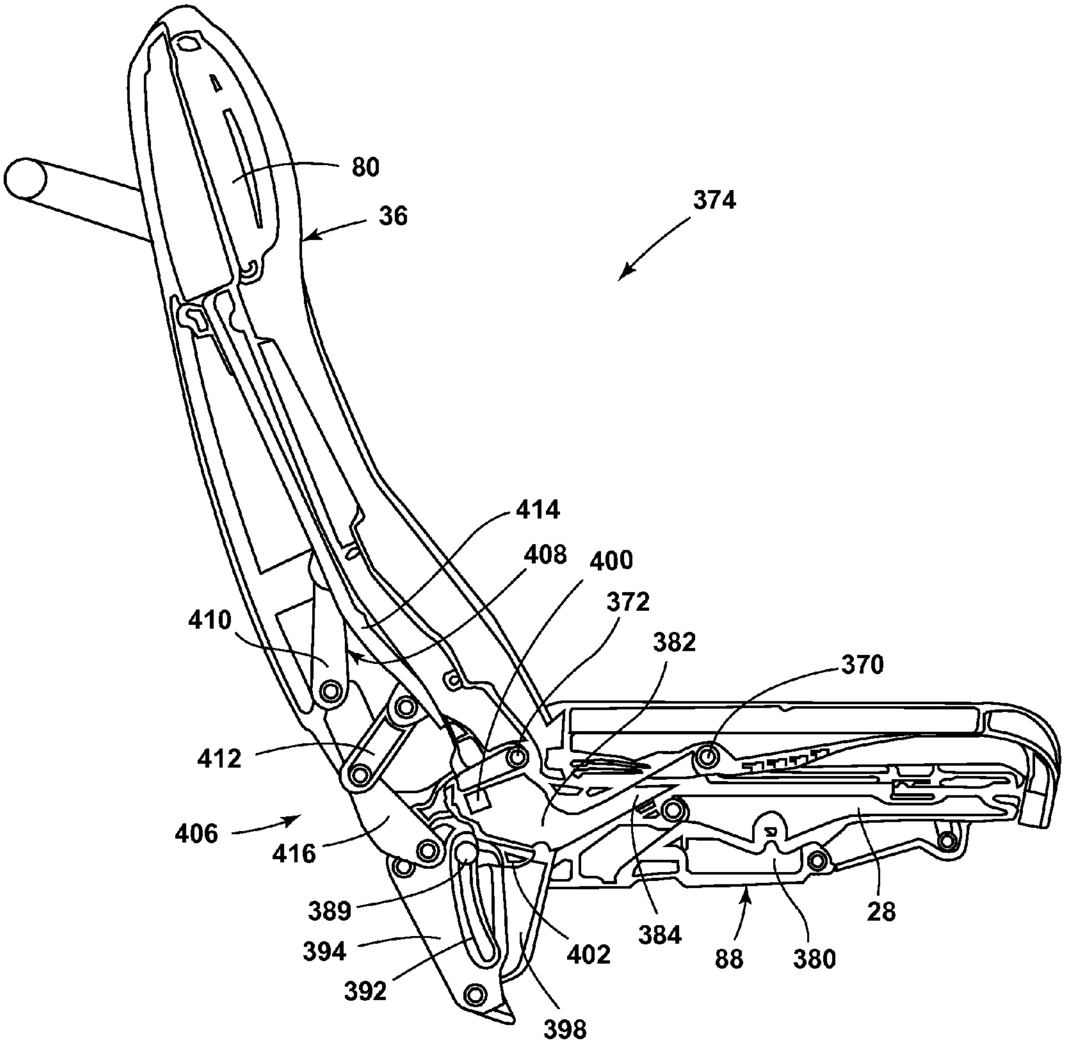
FIG. 40 is a side, elevational view of the backrest, seat frame, backrest bracket, and backrest linkage assembly shown with the backrest tilted back to an intermediate position.
Figure 41:
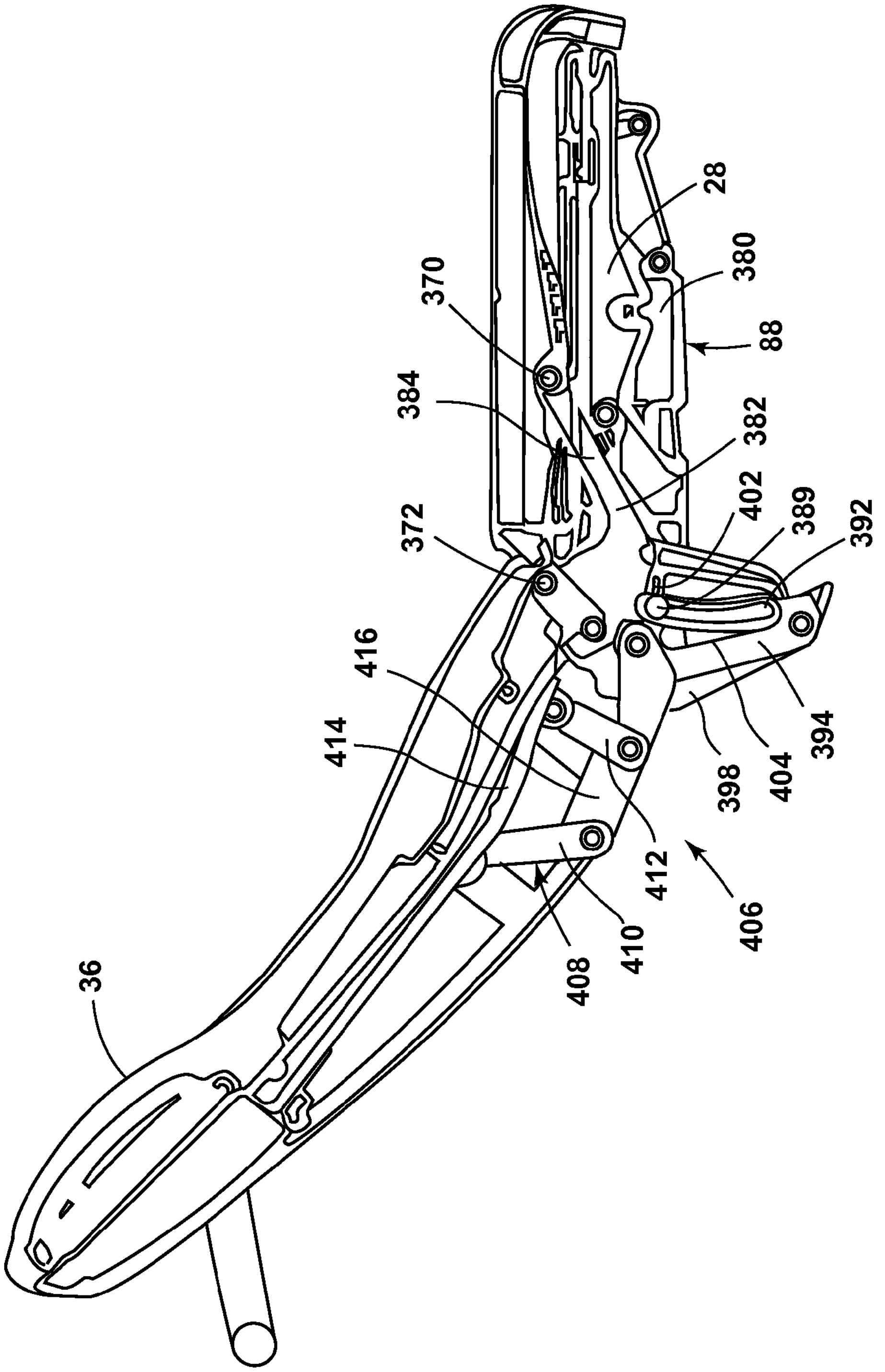
FIG. 41 is a side, elevational view of the backrest, seat frame, backrest bracket, and backrest linkage assembly shown with the backrest tilted backward to a lower position than that of FIG. 40.

Backrest 36 is adapted to move between a fully upright position 376 (FIG. 38) and any user selected reclined position (e.g. FIG. 39, 40, or 41). In order to provide more comfort to the user of patient support apparatus 10, backrest 36 is adapted to initially pivot backwards from the fully upright position about a first pivot axis 370 (FIGS. 38-44), and subsequently, after backrest 36 reaches an intermediate position 374 (FIGS. 40 and 43), cease to pivot about first pivot axis 370, and instead commence pivoting about a second pivot axis 372. Pivoting about the second pivot axis 372 then occurs throughout the rest of the downward pivoting of backrest 36 to the fully reclined position. Backrest 36 therefore pivots between the upright position 376 and the intermediate position 374 about first pivot axis 370, and pivots about second pivot axis 372 during pivoting between intermediate position 374 and any more fully reclined position. Backrest 36 thus pivots about two pivot axes 372 and 374 during the reclining movement of backrest 36. This double pivoting provides more comfort to the user of patient support apparatus 10.

First pivot axis 370 is located at a height that is slightly lower than a top side of seat 30. First pivot axis 370 is also located in a forward-rearward direction at a location that is in line with where a patient's buttocks would normally rest when the patient is seated in seat 30. This location provides a more comfortable feeling when pivoting the backrest 36 than when a pivot axis is positioned in line with the patient's hips. Second pivot axis 372 is positioned rearwardly of a front end of backrest 36. Second pivot axis 372 is also positioned at a higher elevation than first pivot axis 370 (when backrest 36 is in the fully upright position). During pivoting about first pivot axis 370, second pivot axis 372 initially starts at this higher height, but then pivots to a height that is substantially the same as the height of second pivot axis 372.

Figure 8:
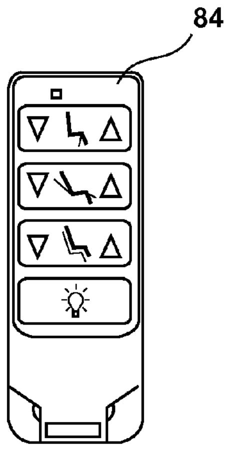
FIG. 8 is an elevation view of a remote control unit that may be used to control the chair.
Figures 9, 9A, 9B:
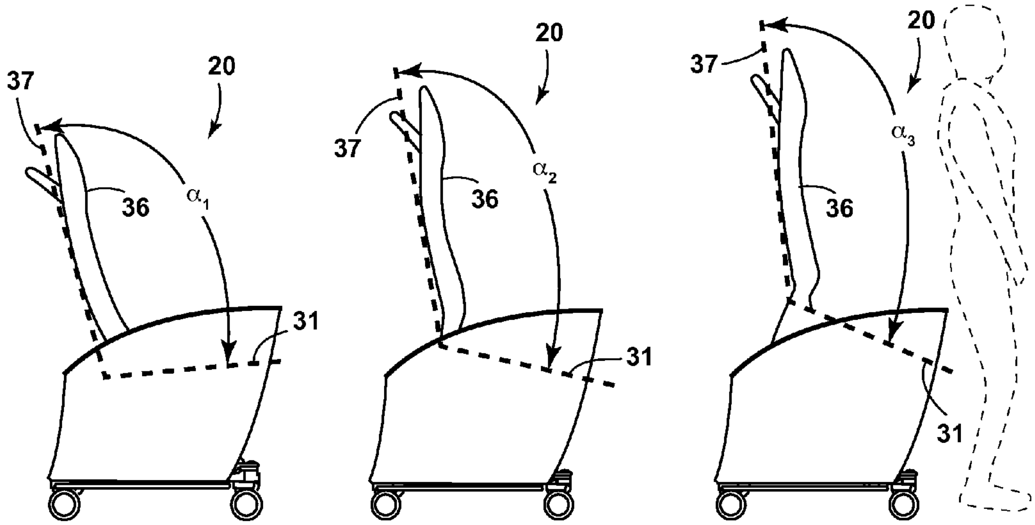
FIG. 9 is a side elevation view illustrating the sequence of the sit-to-stand function of the recliner.
FIG. 9A is a similar view to FIG. 9 illustrating the sequence of the sit-to-stand function of the recliner.
FIG. 9B is a similar view to FIG. 9 illustrating the sequence of the sit-to-stand function of the recliner.

The control of the pivoting of backrest 36 is carried out by control system 78 and controller 82 in response to commands received from either of the control panels 80 or the user pendant 84. For example, as shown in FIG. 7, control panels 80 (and/or pendant 84) may have user actuatable devices, such buttons or a key pad, or the like to actuate the respective actuators to move the various sections of the support surface (seat section, backrest and leg rest) to several positions, such as described above, including the sit-to-stand configuration, the recline configuration, the upright configuration, the lateral transfer configuration, the Trendelenburg configuration. In addition, user actuatable devices may be provided to control other functions, such as the brake function at button 94. Similar buttons or key pads with similar or a reduced set of functions or other functions may be provided at pendant 84, such as illustrated in FIG. 8.

Figure 2:
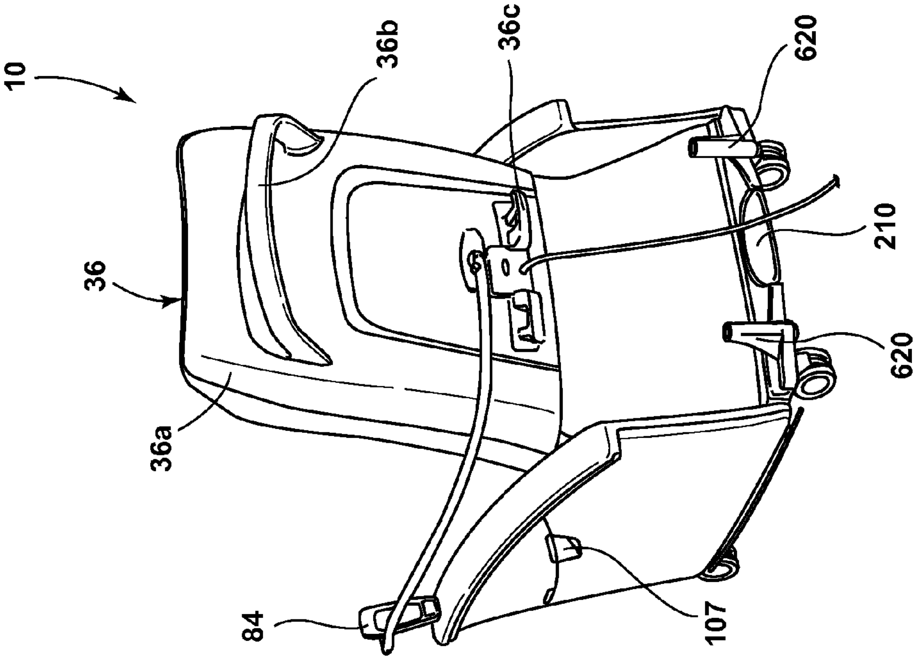
FIG. 2 is a rear perspective view of a chair of FIG. 1.

Further, to ease access to pendant 84, pendant 84 may be mounted on a flexible arm (see e.g. FIG. 2), which allows the pendant to be lifted, lowered, rotated or moved to the other side for use by a right handed person (currently shown on the left side).

In response to those commands, controller 82 sends the appropriate control signals to backrest actuator 88 that is responsible for pivoting backrest 36 up and down. Backrest actuator 88 carries out the pivoting of backrest 36 for the pivoting that occurs about both pivot axes 370 and 372. This pivoting is carried out by the linear extension and retraction of an actuator arm 378 into and out of an actuator body 380 of backrest actuator 88. No other motion of actuator 88 is required to carry out the double pivoting of backrest 36 because, as will be explained in greater detail below, the mechanical design of backrest 36 and its connecting structure to seat frame 28 converts the linear movement of actuator 88 into the appropriate motion for carrying out the double pivoting.

Backrest actuator 88 may be any conventional electrical actuator adapted to extend and retract its arm 378. In the illustrated embodiments, backrest actuator 88 is constructed such that it will automatically retain its current extension or retraction after it is done moving. That is, backrest actuator 88 includes an automatic internal brake that locks it into whatever position it ends up in. This locking feature holds backrest 36 in any of the virtually infinite number of reclined positions between the fully upright position 376 and the fully reclined position.

Figure 37:
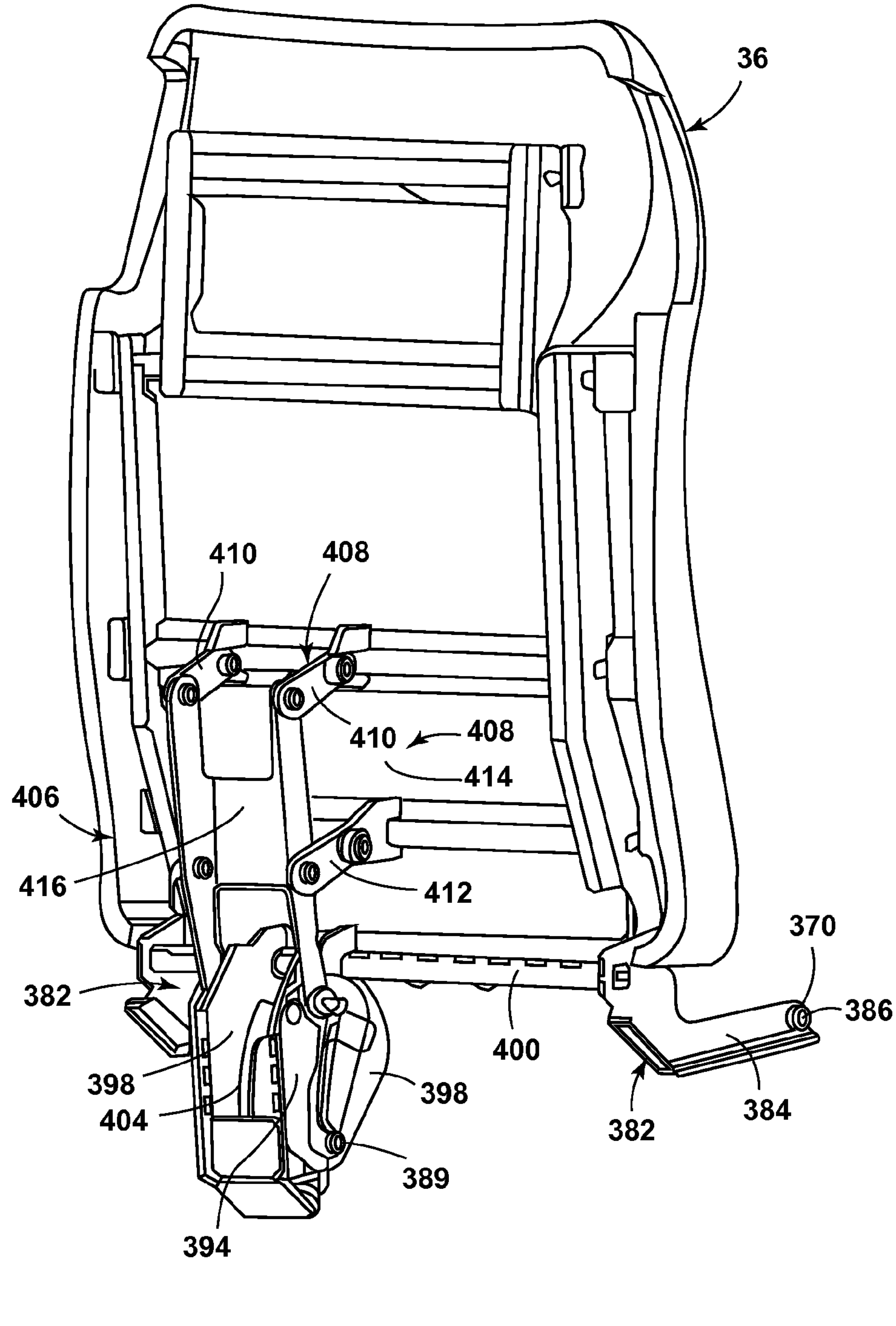
FIG. 37 is a rear perspective view of the backrest, backrest bracket, and backrest linkage assembly.
Figure 42:
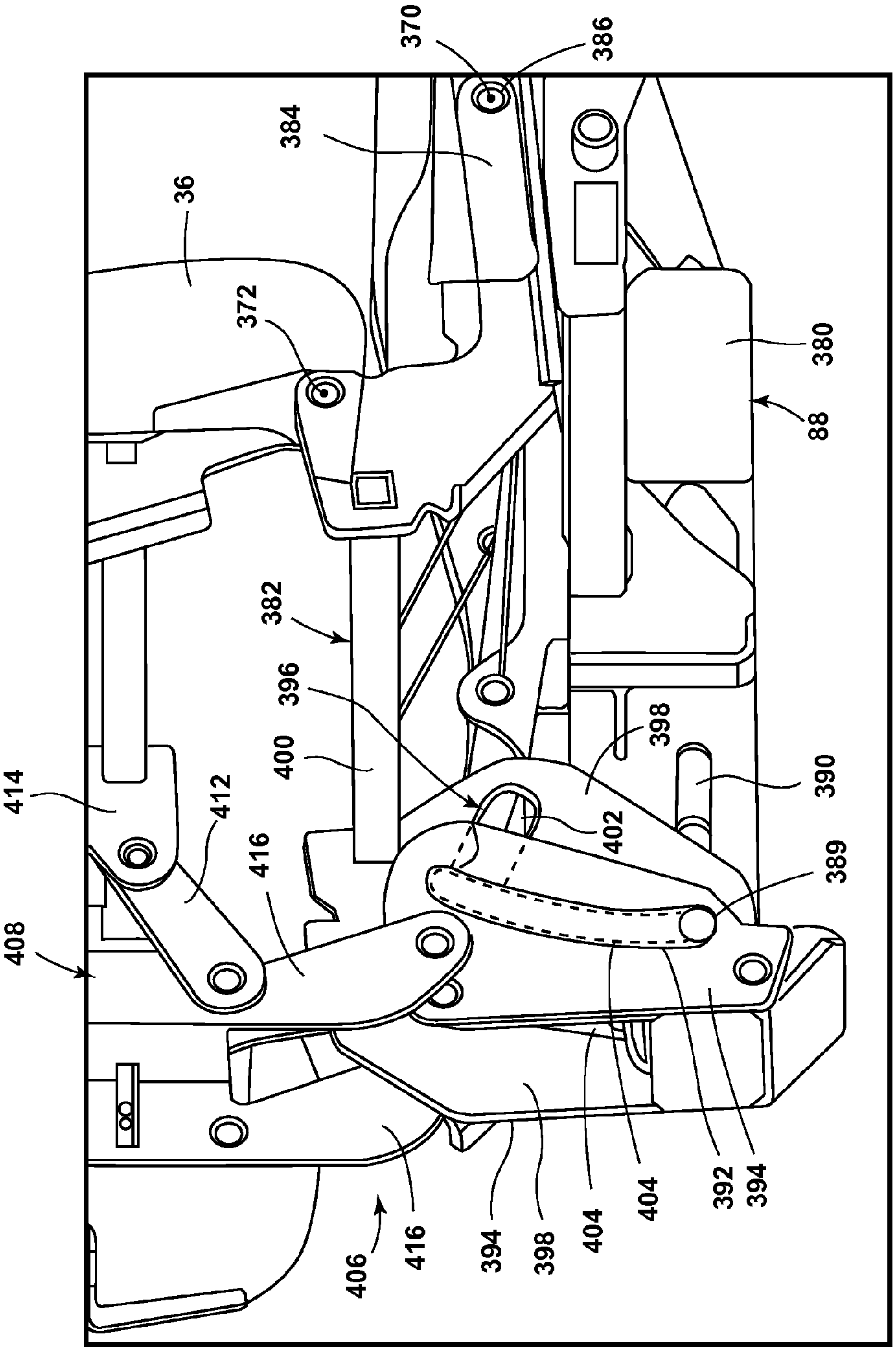
FIG. 42 is a partial perspective view of the backrest, backrest bracket, backrest linkage assembly, and seat frame shown with the backrest in the fully upright position.
Figure 45:
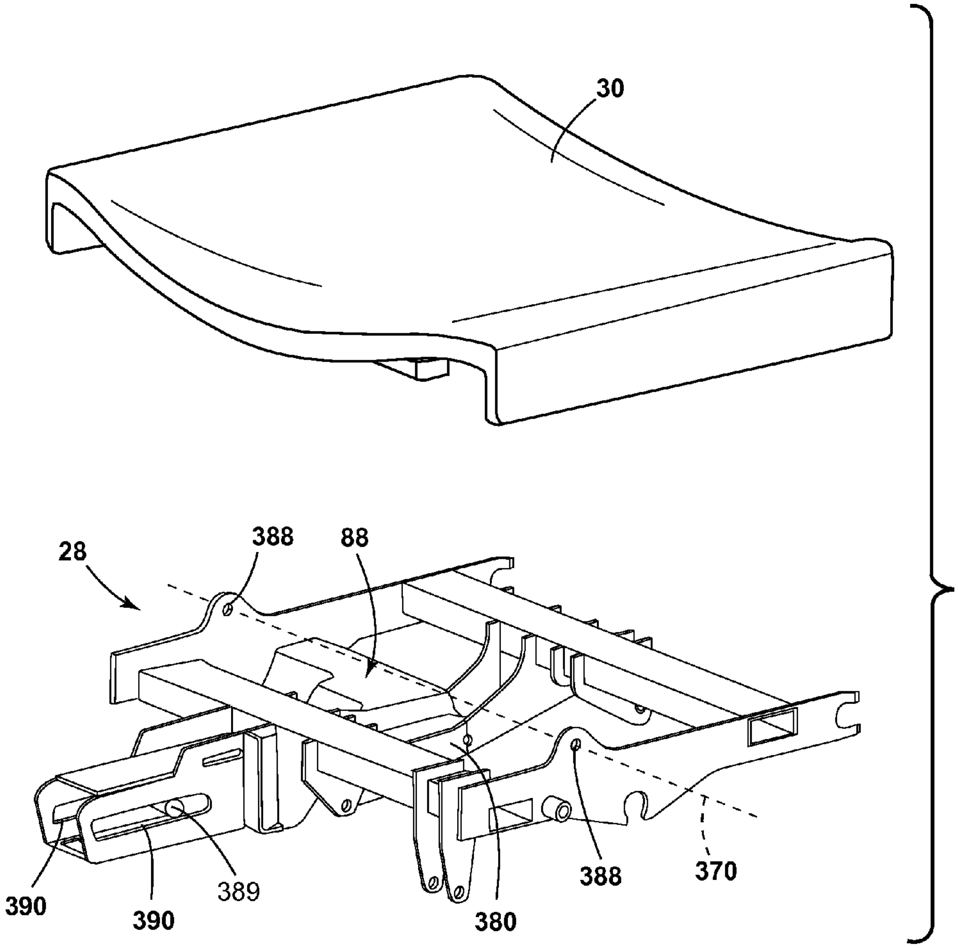
FIG. 45 is a perspective view of the seat frame and seat.

Backrest 36 is pivotally coupled to seat frame 28 by way of a backrest bracket 382 (FIG. 37). More specifically, backrest bracket 382 includes a pair of spaced apart parallel arms 384, with each arm having a pivot aperture 386 defined at the distal end (FIG. 37). A pivot pin, or the like (not shown), fits through each pivot aperture 386 into a corresponding pin aperture 388 defined on the top side of seat frame 28 (FIG. 45). Backrest bracket 382 further includes a cross bar section 400 that extends between each arm 384. Backrest 36 is pivotally coupled to backrest bracket 382 about second pivot axis 372 (FIG. 42). Backrest bracket 382 is therefore pivotal with respect to seat frame 28 about first pivot axis 370, and backrest 36 is pivotal with respect to backrest bracket 382 about second pivot axis 372. Backrest bracket 382 remains stationary when backrest 36 is pivoting about second pivot axis 372.

Figure 43:
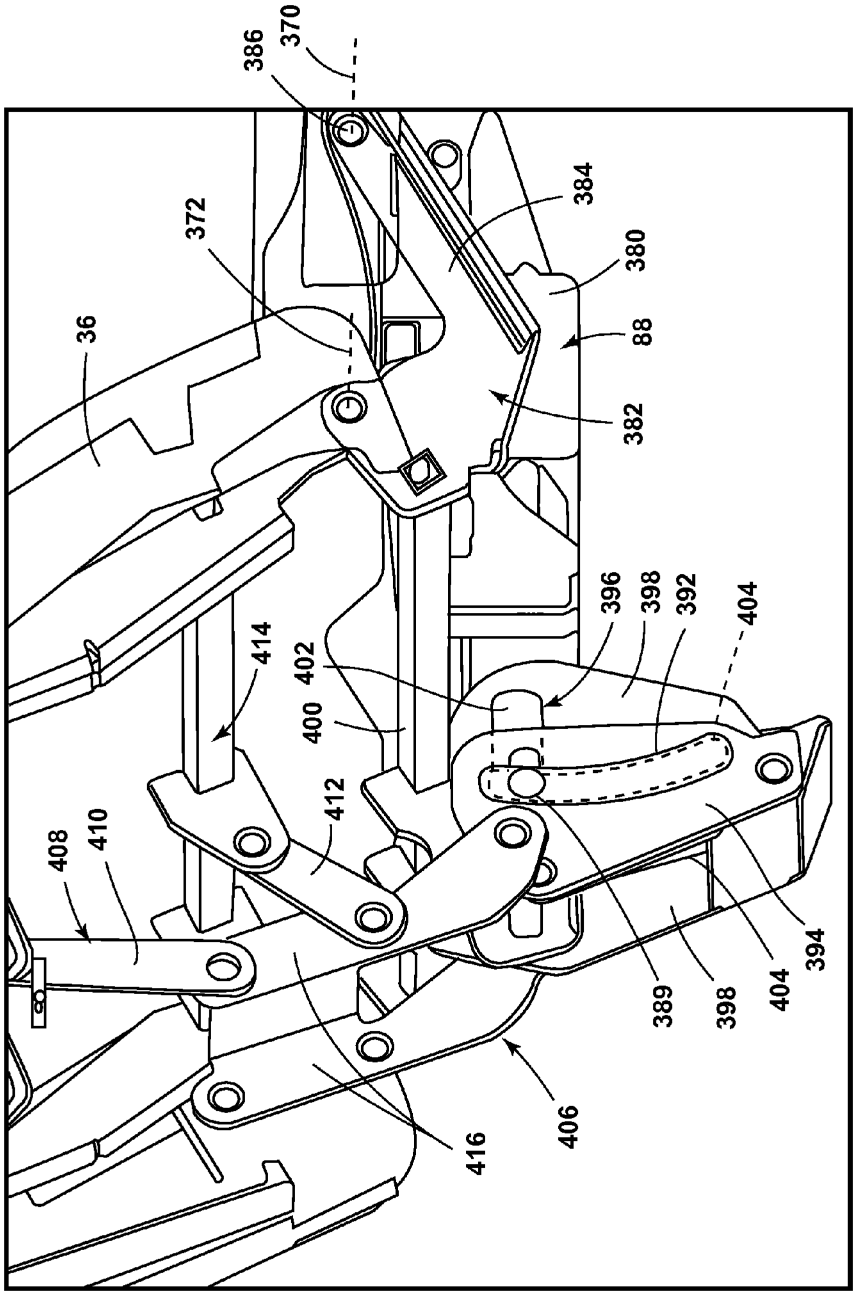
FIG. 43 is a partial perspective view of the backrest, backrest bracket, backrest linkage assembly, and seat frame shown with the backrest in the intermediate position.
Figure 44:
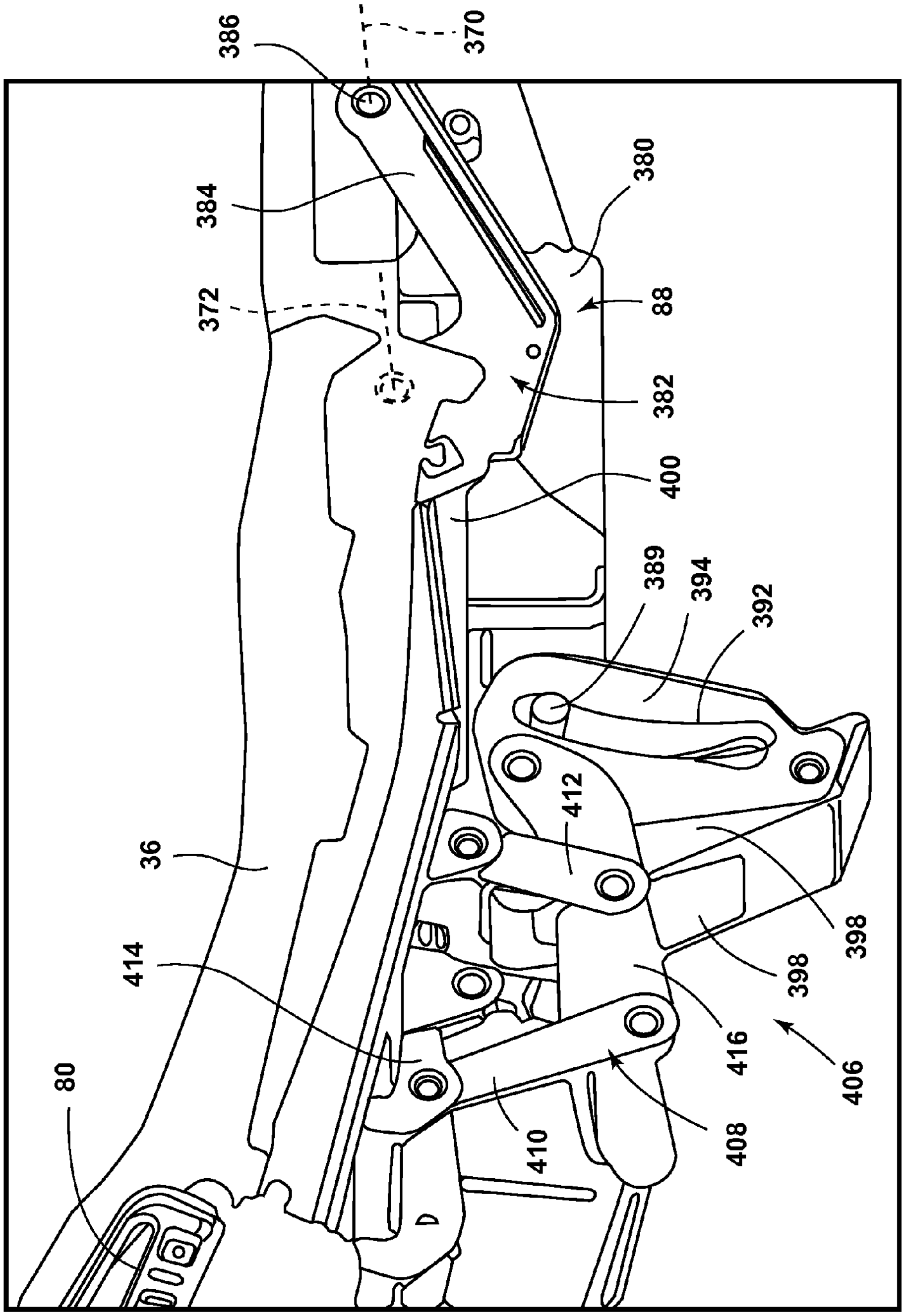
FIG. 44 is a partial perspective view of the backrest, backrest bracket, backrest linkage assembly, and seat frame shown with the backrest in a reclined position.

The distal end of backrest actuator 88 is connected to a guide pin 389 that rides in three pairs of different channels that, in combination, effectuate the double pivoting characteristics of backrest 36. More specifically, guide pin 389 rides in a pair of elongated channels 390 defined at a back end of seat frame 28 (FIG. 45). Guide pin 389 also rides in a pair of arcuate channels 392 defined in a pair of channel link members 394 (FIG. 43). That is, each channel link member 394 defines a single arcuate channel 392. Still further, guide pin 389 rides in a pair of pin channels 396 that are defined in a pair of pin guide members 398.

Each pin guide member 398 is fixedly attached to cross bar section 400 of backrest bracket 382. Pin guide members 398 therefore pivot with backrest bracket 384 between the upright position 376 and the intermediate position 374, but remain stationary during pivoting between the intermediate position 374 and the fully reclined position. Each pin channel 396 defined in each pin guide member 398 has two different sections: a straight section 402 and an arcuately shaped section 404 (FIGS. 42 and 43). Straight section 402 is aligned with elongated channels 390 defined in seat frame 28. Arcuately shaped section 404 has the same arcuate shape as arcuate channels 392 defined in channel link members 394. When backrest 36 pivots between the fully upright position 376 and the intermediate position 374, arcuately shaped channels 404 and arcuate channels 392 are aligned with each other, and straight section 402 and elongated channels 390 are misaligned with respect to each other. However, when backrest 36 pivots between the intermediate position and any of the more reclined positions, arcuately shaped channels 404 and arcuate channels 392 become misaligned with each other while straight section 402 and elongated channels 390 are aligned with each other.

Figure 41A:
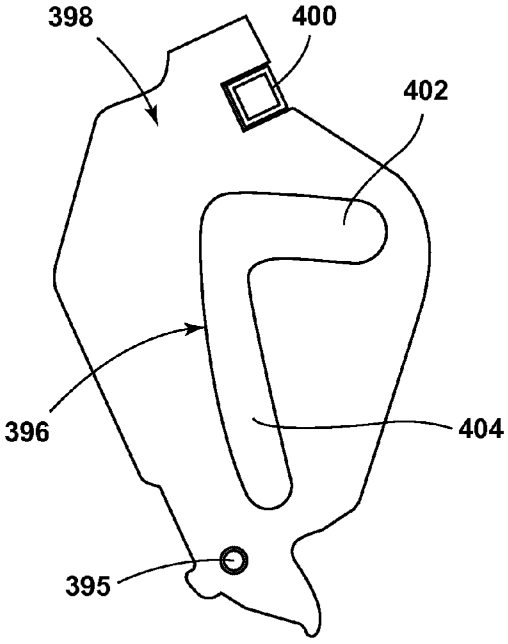
FIG. 41A is a plan view of a pin guide member attacked to a cross bar of the backrest bracket.
Figure 41B:
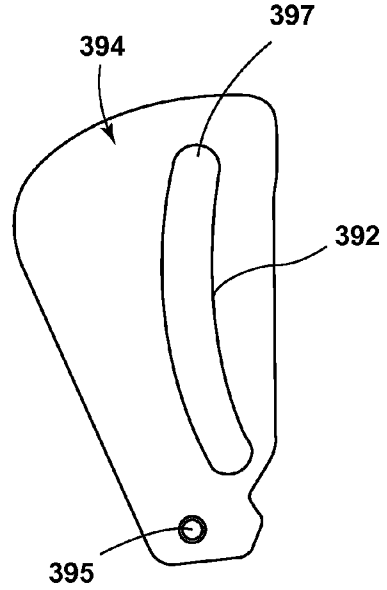
FIG. 41B is a plan view of a channel link member of the backrest linkage assembly.

FIGS. 41A and 41B illustrate in greater detail the shapes of arcuate channels 392 and pin channels 396. Both pin guide member 398 and channel link member 394 are generally flat and planar elements. There are two sets of channel link members 394 and pin guide members 398 in patient support apparatus 10. A first set is positioned on one side of the apparatus 10 and the other set is positioned on the other side of the apparatus. For each set, the channel link member 394 and the guide member 398 are positioned side by side and pivotally connected together. The pivoting of a guide member 398 with respect to its attached channel link member 394 occurs about a pivot axis 395. Each channel link member 394 is positioned on the outside of guide member 398. In other words, when viewing apparatus 10 from behind, channel link members 394 will be positioned farther away from the center line of the apparatus 10 than pin guide members 398.

As was noted, for each pairing of a pin guide member 398 with a channel link member 394, pin guide member 398 is pivotal with respect to its attached channel link about pivot axis 395 (which extends perpendicularly out of the plane of FIGS. 41A and 41B). When guide pin 389 is positioned in arcuately shaped section of channel 396, pin guide member 398 and channel link member 394 will not be able to pivot with respect to each other because arcuate channel 392 and arcuately shaped section 404 of channel 396 have generally the same shape and width. However, when guide pin 389 moves up to a top end 397 of channel 392, the guide pin 389 will be in the straight section 402 of channel 396, where it will be able move laterally within straight section 402. This lateral movement allows channel link member 394 to pivot with respect to pin guide 398 (about axis 395). This area of lateral movability in straight section 402 corresponds to the movement of backrest 36 between the intermediate position and the fully reclined position.

From a study of FIGS. 38 to 44, it can also be seen that guide pin 389 reciprocates back and forth within elongated channels 390 during movement between the fully upright position and fully reclined position of backrest 36. Guide pin 389 moves between opposite ends of arcuate channels 392 defined within channel link member 394 during pivoting between the fully upright position and the intermediate position. Guide pin 389 remains at the upper end 397 of arcuate channels 392 during pivoting of backrest 36 between the intermediate position and the fully reclined position. Further, guide pin 389 moves up and down within arcuately shaped section 404 of pin channel 396 during pivoting of backrest 36 between the fully upright and intermediate positions. And still further, guide pin 389 moves between opposite ends of the straight section 402 during pivoting of backrest 36 between the intermediate position and fully reclined position.

It can also be seen from a study of FIGS. 38 to 44 that backrest actuator arm 378 is in its fully extended position when backrest 36 is in the fully upright position, and backrest actuator arm 378 is in its fully retracted position when backrest 36 is in its fully reclined position. Still further, it can be seen that the engagement of guide pin 389 with the arcuate shaped edges of pin channels 396 and arcuate channels 392 creates upward and downward forces (depending on the direction of movement of pin 389) on backrest 36 and backrest bracket 382. These upward and downward forces are responsible for urging backrest 36 and/or backrest bracket 382 in the corresponding upward and downward direction, thereby causing backrest 36 and/or backrest bracket 382 to pivot accordingly. It should be noted that the intermediate position 374 is the position at which the pivoting of backrest 36 switches between first and second pivot axes 370 and 372.

Each channel link member 394 is pivotally coupled to a linkage assembly 406. Linkage assembly 406 includes a four-bar linkage 408 that includes an upper link 410, a lower link 412, a backrest frame link 414, and a rear link 416 (FIGS. 38-40). This four bar linkage 408 provides support to backrest 36 during pivoting and couples backrest 36 to channel link members 394.

As noted above, patient support apparatus 10 includes, in some embodiments, exit detection system 96. Exit detection system 96 is adapted to issue an alert when it is armed and a patient on the patient support apparatus 10 is about to exit, or has exited, from seat 30. Exit detection system 96 includes a plurality of binary sensors (not shown) that are arranged in a selected pattern and positioned underneath the cushioning on seat 30. Each sensor is adapted to open or close based upon the presence or absence of sufficient pressure exerted by the weight of the patient on seat 30. The outputs from the individual sensors are fed to controller 82 which, in one embodiment, issues an alert if any of the multiple sensors detects an absence of sufficient pressure. In other embodiments, controller 82 is programmed to only issue an alert if a threshold number of sensors detect an absence of pressure, or if one or more specific patterns of sensors detect an absence of patient pressure.

Exit detection system 96 is controlled by a caregiver through the use of control panels 80. Each control panel 80 includes a button that, when pressed, toggles between arming and disarming exit detection system 96. When disarmed, no alerts are issued by exit detection system 96. When armed, exit detection system issues alerts when controller 82 senses that one or more of the binary pressure sensors under seat 30 have detected an absence of patient pressure.

In an alternative embodiment, control system 78 can be modified to include a wireless or wired transceiver that transmits a signal to a healthcare network, or server on the healthcare network, when a patient exit condition is alerted. When so equipped, patient support apparatus 10 includes a control for enabling the caregiver to select whether the exit alert should remain local, or be transmitted remotely to the network or server.

Referring to FIGS. 46-49, apparatus 10 includes a plurality of accessories to facilitate line management, providing mounting surfaces for devices, such as the Foley bag, and further to enhance the comfort of a patient seated in apparatus 10. Additionally, apparatus 10 may incorporate IV mounting poles to facilitate movement of IV equipment along with apparatus 10.

Figure 46:
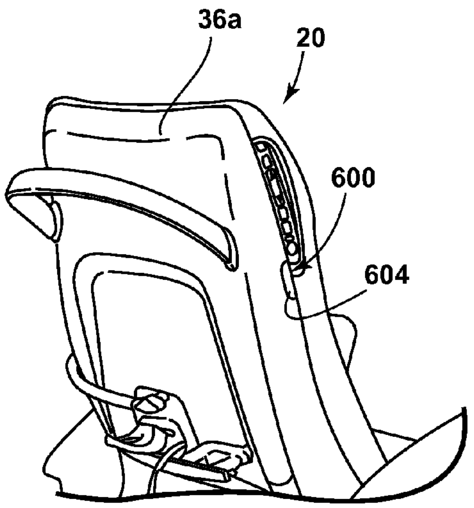
FIG. 46 is a rear perspective view of the recliner chair illustrating a line management hook shown in a stowed position and further a cord wrap integrated in to the back seat section of the chair.
Figure 46A:
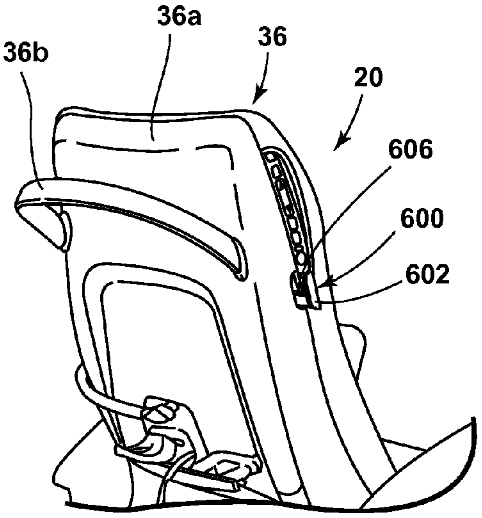
FIG. 46A is similar view to FIG. 46 illustrating the line management hook shown in an extended position and further a cord wrap integrated in to the back seat section of the chair.

Referring to FIGS. 46 and 46A, backrest 36 includes a back shell 36*a*, for example, formed from a plastic material that forms the back facing side of the backrest, and which abuts the cushioning later as shown. Backrest 36 may include a line management device 600 in the form of a retractable bracket 602. As best understood from FIG. 46, bracket 602 is mounted in an opening 604 provided in the backrest shell and further in a manner to be recessed within the opening so that the outer arm 606 of bracket 602 may be generally flush with the outer surface of back cover 36*a*. Optionally, bracket 602 may be spring mounted, for example by a push-push mechanism, so that when pushed into the opening, it may be latched in place but then subsequently released when pressed again. Alternately, bracket 602 may simply be manually pivoted from its stowed position to its extended position, and may include an engagement surface to allow a user to grab the edge of the bracket to facilitate the movement between the stowed and operative position.

Figure 47:
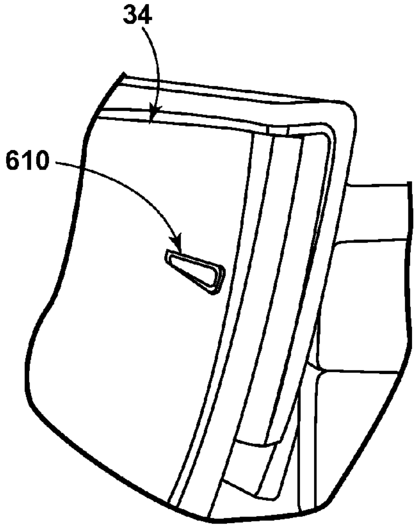
FIG. 47 is an enlarged view of a Foley hook incorporated in to the side rail of the chair showing the Foley hook in a stowed position.
Figure 47A:
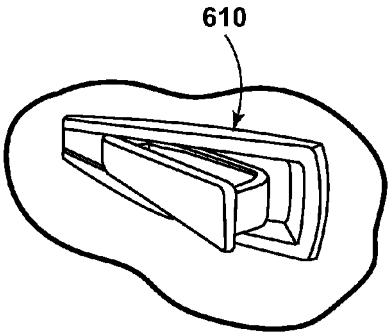
FIG. 47A is an enlarged view of the Foley in an extended operative position.

Referring to FIGS. 47 and 47A, recliner chair 20 may also include a Foley bag hook 610 which may be mounted in arm rest 34 and further positioned adjacent to the forward edge of arm rest. Hook 610 may comprise a spring mounted hook that when pressed or released and moved to an open position, such as shown in FIG. 10, and then returned to its stowed position, such as shown on the left in FIG. 10, when pressed again. For example, hook 610 may include an over center spring or a push-push mechanism to allow it to be easily moved between retracted position and its operative position such as shown in FIG. 47 on the right.

Figure 48:
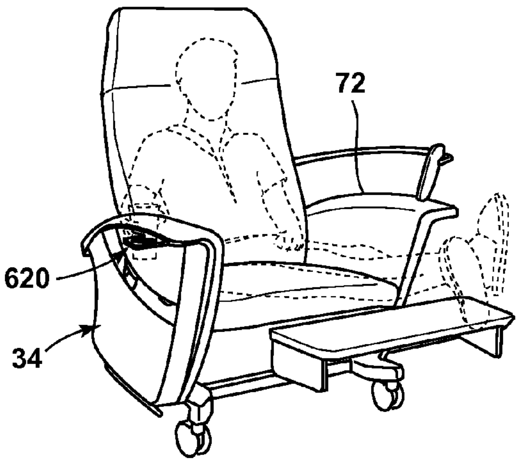
FIG. 48 is a perspective view of the chair illustrating a cup holder integrated to the arm rest.
Figure 48A:
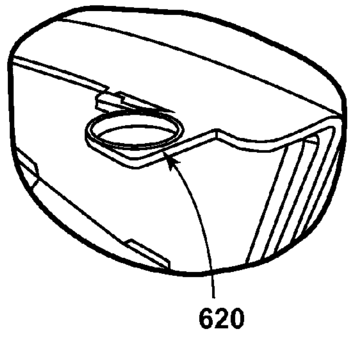
FIG. 48A is a is an enlarged perspective view of the cup holder in an extended position.

Referring to FIGS. 48 and 48A, arm rests 34 may incorporate a cup holder 620 which is pivotally mounted in arm rest 34 and optionally similarly mounted beneath arm rest cushion 72. Optionally, as shown in FIG. 48, cup holder 620 may be positioned between cushion 72 and mounting surface 70 and further may be mounted between an operative position, such as shown in FIG. 48A, and a stowed position underneath cushion 72. For example, cup holder 620 may also incorporate over center spring mechanism to bias it between its stowed position and its operative position.

Figure 49:
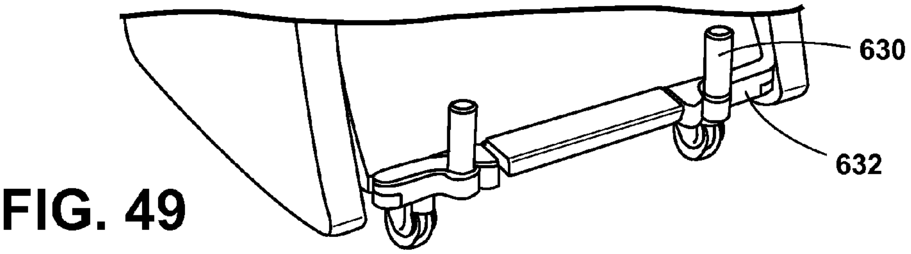
FIG. 49 is a rear perspective view of the base of the chair illustrating the brake bar and the IV pole mounts shown in retracted positions.
Figure 49A:
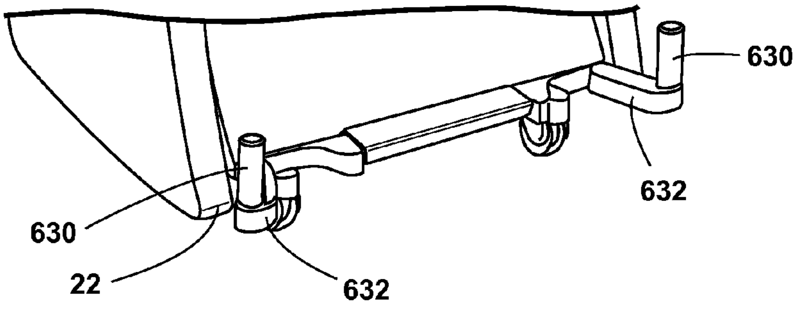
FIG. 49A is a similar view to FIG. 49 illustrating the brake bar and the IV pole mounts shown in extended positions.

Referring to FIG. 49, base 22 of apparatus 10 may incorporate one or more IV supports 630 with the back side of apparatus 10 adjacent to the brake pedal or bar such as shown in FIGS. 49 and 49A. Furthermore, apparatus 10 may incorporate a pair of IV poles 630, which are pivotally mounted to base 22 by arms 632 to allow the IV pole holders 630 to move between the extended position, such as shown in FIG. 49A, and a folded or contracted position, such as shown in FIG. 49. For example, each arm 632 may incorporate an over center spring which defines the fully retracted position and the stowed position.

Back shell 36*a* of backrest 36 may also have molded therein or joined therewith a handle 36*b* to facilitate movement of apparatus, and also a cord wrap structure to manage wires and or cabling.

While several embodiments have been shown and described, the above description is that of current embodiments of the invention. Various alterations and changes can be made without departing from the spirit and broader aspects of the invention as defined in the appended claims, which are to be interpreted in accordance with the principles of patent law including the doctrine of equivalents. This disclosure is presented for illustrative purposes and should not be interpreted as an exhaustive description of all embodiments of the invention or to limit the scope of the claims to the specific elements illustrated or described in connection with these embodiments. For example, and without limitation, any individual element(s) of the described invention may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Further, the disclosed embodiments include a plurality of features that are described in concert but which can be used independently and/or combined with other features. The present invention is not limited to only those embodiments that include all of these features or that provide all of the stated benefits, except to the extent otherwise expressly set forth in the issued claims. Any reference to claim elements in the singular, for example, using the articles “a,” “an,” “the” or “said,” is not to be construed as limiting the element to the singular.

Therefore, it will be understood that the embodiments shown in the drawings and described above are merely for illustrative purposes, and are not intended to limit the scope of the invention which is defined by the claims which follow as interpreted under the principles of patent law including the doctrine of equivalents.

What is claimed is:

1. A medical chair comprising:

a back section;

a base supporting the back section; and an arm rest supported by the base independent of said back section for movement between a raised position and a lowered position relative to the base and being independent of the back section, the lowered position of the arm providing support for a patient’s arm when seated in the chair and the raised position of the arm rest being upward and forward of the lowered position to provide support to a patient when exiting the chair from a seated position to a standing position.

2. The medical chair according to claim 1, wherein the arm rest is configured to move between the raised position and the lowered position along a linear path.

3. The medical chair according to claim 1 wherein the arm rest has an arm rest cushion, the arm rest cushion having an orientation, the orientation of the arm rest cushion remaining generally constant when the arm rest is moved between the lowered and raised positions to thereby provide for continuing support to a patient when exiting the chair.

4. The medical chair according to claim 1, further comprising a locking mechanism for the arm rest wherein the arm rest is lockable in at least one position.

5. The medical chair according to claim 4, wherein the arm rest is lockable in a plurality of positions between the lowered and raised positions, including in the raised position.

6. The medical chair according to claim 4, further comprising a manual release to release the locking mechanism.

7. The medical chair according to claim 4, wherein the arm rest comprises a safety release, the safety release being configured to release the locking mechanism when the arm rest is lowered and encounters an object of sufficient stiffness to trigger the safety release.

8. The medical chair according to claim 7, wherein the safety release comprises a mechanical mechanism supported at a lower end of the arm rest.

9. The medical chair according to claim 1, wherein the arm rest includes a spring assist to lower the apparent weight of the arm rest to facilitate movement.

10. The medical chair according to claim 9, wherein the spring comprises a constant force spring.

11. The medical chair according to claim 1 further including:

a lift supported at the base;

a chassis supported by the lift, wherein the lift is operable to raise and lower the chassis with respect to the base; and the chassis supporting the arm rest, the back section, and a seat section.

12. The medical chair according to claim 1 wherein the base includes a base frame.

13. A medical chair comprising:

a base;

a back section supported by the base;

an arm rest supported by the base independent of the back section for movement between a raised position and a lowered position relative to the base and being independent of the back section;

a locking mechanism operable to lock the arm rest in at least one of the raised and lowered positions; and a safety release mechanism to prevent the locking mechanism from locking when the arm rest encounters an object while it is being lowered.

14. The medical chair according to claim 13, wherein the safety release mechanism comprises a rod at a lower end of the arm rest.

15. The medical chair according to claim 14, wherein the rod extends along the lower end of the arm rest.

16. The medical chair according to claim 13, wherein the locking mechanism selectively locks the arm rest in a plurality of positions between the lowered and raised positions.

17. The medical chair according to claim 16, further comprising a manual release to release the locking mechanism.

18. The medical chair according to claim 17, wherein the safety release mechanism is coupled to the manual release mechanism and actuates the manual release mechanism to release the locking mechanism.

19. A medical chair comprising:

a seat frame, the seat frame having a back edge and a forward edge; and a backrest pivotally coupled to the seat frame such that the backrest is operable to pivot with respect to the seat frame about a first pivot axis closer to the back edge than the forward edge during reclining movement of the backrest between an upright position and an intermediate reclining position, and the backrest is operable to pivot with respect to the seat frame about a second pivot axis adjacent the back edge spaced from the first pivot axis during reclining movement of the backrest between the intermediate reclining position and a lowered reclining position.

20. The medical chair of claim 19 further including:

a user interface; and an actuator coupled to the backrest and adapted to automatically pivot the backrest between the upright position and the lowered reclining position based on input from the user interface.

21. The medical chair of claim 19 wherein the first pivot axis is positioned at a location along the seat frame where a patient's buttocks typically are positioned when a patient is seated on the medical chair.

22. The medical chair of claim 19 wherein the backrest is configured to pivot exclusively about the first pivot axis during reclining movement between the upright position and the intermediate reclining position, and the backrest is configured to pivot exclusively about the second pivot axis during reclining movement between the intermediate reclining position and the lowered reclining position.

23. The medical chair of claim 19 wherein the first pivot axis is positioned forward of a front end of the backrest, and the second pivot axis is positioned at a higher height than the first pivot axis and rearwardly of the first pivot axis.

24. The medical chair of claim 19 further including:

a seat actuator adapted to pivot the seat frame; and a controller adapted to electrically control both the actuator and the seat actuator, the controller further adapted to pivot a rear end of the seat frame initially downwardly and then subsequently upwardly as the backrest pivots downwardly from the upright position to the lowered position.

25. The medical chair of claim 19 further including:

a base;

a lift supported on the base;

a chassis supported by the lift, wherein the chassis is adapted to be raised and lowered by the lift with respect to the base; and a seat actuator adapted to pivot the seat frame with respect to the chassis about a third pivot axis.

* * * * *